United States Patent
Mammen et al.

(10) Patent No.: US 9,936,066 B1
(45) Date of Patent: Apr. 3, 2018

(54) REVIEWING PORTIONS OF TELEPHONE CALL RECORDINGS IN A CONTACT CENTER USING TOPIC META-DATA RECORDS

(71) Applicant: Noble Systems Corporation, Atlanta, GA (US)

(72) Inventors: Steven K. Mammen, Woodstock, GA (US); Karl H. Koster, Sandy Springs, GA (US); Ellwood I. Neuer, III, Newnan, GA (US); Jason P. Ouimette, Berkeley Lake, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 112 days.

(21) Appl. No.: 15/071,325

(22) Filed: Mar. 16, 2016

(51) Int. Cl.
*H04M 3/22* (2006.01)
*H04M 3/51* (2006.01)
*G10L 15/26* (2006.01)

(52) U.S. Cl.
CPC ........... *H04M 3/2218* (2013.01); *G10L 15/26* (2013.01); *H04M 3/5175* (2013.01)

(58) Field of Classification Search
CPC ...... G10L 25/51; G10L 15/26; H04M 3/2281; H04M 3/5175; H04M 3/2218
See application file for complete search history.

(56) References Cited

U.S. PATENT DOCUMENTS

| | | | |
|---|---|---|---|
| 5,267,305 A | 11/1993 | Prohs et al. | |
| 5,270,920 A | 12/1993 | Pearse et al. | |
| 5,850,433 A | 12/1998 | Rondeau | |
| 6,157,808 A | 12/2000 | Hollingsworth et al. | |
| 6,198,814 B1 | 3/2001 | Gill | |
| 6,356,634 B1 | 3/2002 | Noble, Jr. | |
| 6,370,574 B1 | 4/2002 | House et al. | |
| 6,621,900 B1 | 9/2003 | Rice | |
| 6,651,042 B1 * | 11/2003 | Field | H04M 1/6505 379/100.05 |
| 6,694,298 B1 | 2/2004 | Teagarden et al. | |
| 6,810,260 B1 | 10/2004 | Morales | |
| 6,988,205 B2 | 1/2006 | Walker et al. | |
| 7,051,098 B2 | 5/2006 | Masters et al. | |
| 7,076,427 B2 | 7/2006 | Scarano et al. | |

(Continued)

OTHER PUBLICATIONS

U.S. Appl. No. 61/7753,641, filed Dec. 1899, Watson et al.

*Primary Examiner* — Lisa Hashem

(57) ABSTRACT

A real-time speech analytics system ("RSTA system") detects speech during a call involving a contact center agent and a remote party. Upon detecting the speech, an event message is generated by the RTSA system and transmitted to a module, which is configured to generate a topic meta-data record stored in a topic meta-data file. A real-time topic dashboard indication may be presented on a graphical user interface to a user based on analysis of a plurality of topic meta-data records. Selection of the topic dashboard indicator may result in presentation to the user of further text-based information about detection of the speech event for one or more calls. Selection of the further information for a particular call may result in a corresponding portion of recorded audio of that call associated with the speech event to be retrieved using the corresponding topic meta-data record and played to the user.

21 Claims, 41 Drawing Sheets

(56) References Cited

U.S. PATENT DOCUMENTS

| | | |
|---|---|---|
| 7,133,828 B2 | 11/2006 | Scarano et al. |
| 7,227,930 B1 | 6/2007 | Othmer et al. |
| 7,457,404 B1 | 11/2008 | Hessian et al. |
| 7,542,902 B2 | 6/2009 | Scahill et al. |
| 7,548,539 B2 | 6/2009 | Kouretas et al. |
| 7,561,677 B2 | 7/2009 | Flynt et al. |
| 7,574,000 B2 | 8/2009 | Blair |
| 7,599,475 B2 | 10/2009 | Eilam et al. |
| 7,672,845 B2 | 3/2010 | Beranek et al. |
| 7,752,043 B2 | 7/2010 | Watson |
| 7,783,290 B2 | 8/2010 | Kim |
| 7,860,722 B1 | 12/2010 | Chow |
| 7,903,807 B2 | 3/2011 | Neyman et al. |
| 7,916,846 B1 | 3/2011 | Farah |
| 7,930,179 B1 | 4/2011 | Gorin et al. |
| 7,974,411 B2 | 7/2011 | Krishnapuram et al. |
| 8,059,790 B1 | 11/2011 | Paterik et al. |
| 8,065,618 B2 | 11/2011 | Kumar et al. |
| 8,077,832 B2 | 12/2011 | Othmer et al. |
| 8,078,470 B2 | 12/2011 | Levanon |
| 8,094,790 B2 | 1/2012 | Conway et al. |
| 8,094,803 B2 | 1/2012 | Danson et al. |
| 8,103,722 B2 | 1/2012 | Lee |
| 8,136,026 B2 | 3/2012 | Commarford et al. |
| 8,175,007 B2 | 5/2012 | Jain et al. |
| 8,180,643 B1 | 5/2012 | Pettay et al. |
| 8,209,182 B2 | 6/2012 | Narayanan |
| 8,209,348 B2 * | 6/2012 | Takagi .............. G06F 17/30796 |
| | | 707/769 |
| 8,219,401 B1 | 7/2012 | Pettay et al. |
| 8,249,875 B2 | 8/2012 | Levanon et al. |
| 8,279,779 B2 | 10/2012 | Singh et al. |
| 8,280,031 B2 | 10/2012 | Segall et al. |
| 8,315,374 B2 | 11/2012 | Perlmutter |
| 8,326,643 B1 | 12/2012 | Eshkenazi et al. |
| 8,358,771 B1 | 1/2013 | Moore et al. |
| 8,374,915 B2 | 2/2013 | Hayes, Jr. et al. |
| 8,396,205 B1 | 3/2013 | Lowry et al. |
| 8,401,155 B1 | 3/2013 | Barnes et al. |
| 8,403,222 B2 | 3/2013 | Kindberg et al. |
| 8,422,641 B2 | 4/2013 | Martin, II |
| 8,463,606 B2 | 6/2013 | Scott et al. |
| 8,477,915 B1 | 7/2013 | Vasquez et al. |
| 8,537,983 B1 | 9/2013 | Haggerty et al. |
| 8,606,245 B1 | 12/2013 | Eccelston et al. |
| 8,666,822 B1 | 3/2014 | Kaliss |
| 8,693,644 B1 * | 4/2014 | Hodges, Jr. .......... H04M 3/5175 |
| | | 379/265.06 |
| 8,712,032 B1 | 4/2014 | Leary, II et al. |
| 8,761,376 B2 | 6/2014 | Pande et al. |
| 9,049,418 B2 * | 6/2015 | Asano .................... G11B 27/28 |
| 9,160,854 B1 * | 10/2015 | Daddi ................. H04M 3/5175 |
| 9,560,206 B2 * | 1/2017 | Jones ..................... H04M 3/56 |
| 9,674,358 B1 * | 6/2017 | Daddi ................. H04M 3/5175 |
| 9,742,915 B1 * | 8/2017 | Daddi ................. H04M 3/5175 |
| 2002/0164006 A1 | 11/2002 | Weiss |
| 2002/0176405 A1 | 11/2002 | Aijala |
| 2003/0002651 A1 | 1/2003 | Shires |
| 2003/0032409 A1 | 2/2003 | Hutcheson et al. |
| 2003/0231750 A1 | 12/2003 | Janveja et al. |
| 2004/0008828 A1 | 1/2004 | Coles et al. |
| 2004/0028213 A1 | 2/2004 | Goss |
| 2004/0042611 A1 | 3/2004 | Power et al. |
| 2004/0170258 A1 | 9/2004 | Levin et al. |
| 2004/0179672 A1 | 10/2004 | Pagel et al. |
| 2005/0048967 A1 | 3/2005 | Hoglander et al. |
| 2005/0149399 A1 | 7/2005 | Fukunaga et al. |
| 2005/0226395 A1 | 10/2005 | Benco et al. |
| 2005/0232410 A1 | 10/2005 | Gonzalez |
| 2005/0265322 A1 | 12/2005 | Hester |
| 2006/0036487 A1 | 2/2006 | Mann |
| 2006/0050658 A1 | 3/2006 | Shaffer et al. |
| 2006/0111953 A1 | 5/2006 | Setya |
| 2006/0233346 A1 | 10/2006 | McIlwaine et al. |
| 2006/0256954 A1 | 11/2006 | Patel et al. |
| 2006/0256957 A1 | 11/2006 | Fain et al. |
| 2006/0262919 A1 | 11/2006 | Danson et al. |
| 2006/0265090 A1 | 11/2006 | Conway et al. |
| 2007/0015553 A1 | 1/2007 | Siddiqui |
| 2007/0088563 A1 | 4/2007 | Nardotti, Jr. et al. |
| 2007/0094073 A1 | 4/2007 | Dhawan et al. |
| 2007/0111180 A1 | 5/2007 | Sperle et al. |
| 2007/0201646 A1 | 8/2007 | Metcalf |
| 2007/0280460 A1 | 12/2007 | Harris et al. |
| 2008/0142599 A1 | 6/2008 | Benillouche et al. |
| 2008/0240376 A1 | 10/2008 | Conway et al. |
| 2008/0270123 A1 | 10/2008 | Levanon et al. |
| 2008/0270279 A1 | 10/2008 | Rowe |
| 2009/0003316 A1 | 1/2009 | Lee et al. |
| 2009/0029725 A1 | 1/2009 | Kindberg |
| 2009/0082044 A1 | 3/2009 | Okuyama et al. |
| 2009/0306981 A1 * | 12/2009 | Cromack .......... G06F 17/30743 |
| | | 704/235 |
| 2010/0075634 A1 | 3/2010 | Miller |
| 2010/0104086 A1 | 4/2010 | Park |
| 2010/0128862 A1 | 5/2010 | Vendrow |
| 2010/0138411 A1 | 6/2010 | Judy et al. |
| 2010/0158237 A1 | 6/2010 | McCormack et al. |
| 2010/0161990 A1 | 6/2010 | Statham et al. |
| 2011/0010173 A1 | 1/2011 | Scott et al. |
| 2011/0026688 A1 | 2/2011 | Simpson |
| 2011/0029380 A1 | 2/2011 | Moukas et al. |
| 2011/0033036 A1 | 2/2011 | Edwards et al. |
| 2011/0125499 A1 | 5/2011 | Griggs et al. |
| 2011/0153398 A1 | 6/2011 | Tjhai et al. |
| 2011/0165858 A1 | 7/2011 | Gisby et al. |
| 2011/0173040 A1 | 7/2011 | Curtis et al. |
| 2011/0182283 A1 | 7/2011 | Van Buren et al. |
| 2011/0208578 A1 | 8/2011 | Bergh et al. |
| 2011/0218798 A1 | 9/2011 | Gavalda |
| 2011/0222679 A1 | 9/2011 | Tal et al. |
| 2011/0228919 A1 | 9/2011 | Tew et al. |
| 2011/0258156 A1 | 10/2011 | Fitzpatrick et al. |
| 2011/0287748 A1 | 11/2011 | Angel et al. |
| 2011/0307258 A1 | 12/2011 | Liberman et al. |
| 2012/0088475 A1 | 4/2012 | Portman et al. |
| 2012/0124227 A1 | 5/2012 | Al-Khowaiter |
| 2012/0128267 A1 | 5/2012 | Dugan et al. |
| 2012/0140911 A1 | 6/2012 | Johansen et al. |
| 2012/0261465 A1 | 10/2012 | Vasquez et al. |
| 2013/0003943 A1 | 1/2013 | Munns et al. |
| 2013/0065558 A1 | 3/2013 | Oneil et al. |
| 2013/0143539 A1 | 6/2013 | Baccy et al. |
| 2013/0202101 A1 | 8/2013 | LaBoyteaux et al. |
| 2013/0316677 A1 | 11/2013 | Aharon |
| 2014/0115486 A1 | 4/2014 | Benson et al. |
| 2014/0133643 A1 | 5/2014 | Claudatos et al. |
| 2014/0140496 A1 | 5/2014 | Ripa et al. |
| 2014/0140497 A1 | 5/2014 | Ripa et al. |
| 2014/0181676 A1 | 6/2014 | Samborskyy et al. |
| 2014/0211933 A1 * | 7/2014 | Vymenets ........... H04M 3/5183 |
| | | 379/265.06 |
| 2014/0241519 A1 | 8/2014 | Watson et al. |
| 2015/0098561 A1 * | 4/2015 | Etison ................. H04M 3/5175 |
| | | 379/265.06 |
| 2016/0277577 A1 * | 9/2016 | Yentis .................. G06Q 10/063 |
| 2016/0357749 A1 * | 12/2016 | Fan ........................ G06Q 50/01 |
| 2017/0277672 A1 * | 9/2017 | Cho .................... G06F 3/04845 |

\* cited by examiner

Agent Stations – Icon View

<<first <prev (1 of 3) next> last>>

Sort... [Ascending] Filter: [Active] and [ ]

Thompson, ...
- Unread  All
- Positivity Score: 100  Compliance Score: 5
- 2014-07-11 14:02:56.4446624
  Time: 4:32
  Topic: Thank you closing detected
- 2014-07-11 14:22:46.4446632
  Time: 0:34
  Topic: No Inquiry of Legal Name
  Status: Escalation Initiated

875

Graham, Jane
Cust Svc
Connected
00:08:30
[Select Option ▽]

McDaniel, Chris
Tech Support
Connected
00:01:02
[Select Option ▽]

Smith, Joe
Cust Svc
Paused: Break
00:03:23
[Select Option ▽]

Doe, Tom
Cust Svc
Connected
00:14:06
[Select Option ▽]

Hardy, Dawn
Tech Support
Paused: After Call Work
00:00:34
[Select Option ▽]

FIG. 8C

| Station Number | Agent ID | Group Number | Agent Name | Campaign | Agent State | Call Duration | Current RTSA Alerts | Cumulative RTSA Alerts |
|---|---|---|---|---|---|---|---|---|
| 32 | 930 | 2 | Thompson, Mary | Cust Svc | Conn. | 2:34 | 2 ⚠ | 16 |
| 12 | 628 | 1 | Hardy, Dawn | Tech Support | Paused | N.A. | N.A. | 8 |
| 33 | 906 | 2 | Smith, Joe | Cust Svc | Conn. | 3:23 | 0 | 3 |

FIG. 11A

| Station Number | Agent ID | Group Number | Agent Name | Campaign | Agent State | Call Duration | Current RTSA Alerts | Cummulative RTSA Alerts |
|---|---|---|---|---|---|---|---|---|
| 32 | 930 | 2 | Thompson, Mary | Cust Svc | Conn. | 2:34 | 2 | 16 |
| 12 | 628 | 1 | Hardy, Dawn | | | | | |
| 33 | 906 | 2 | Smith, Joe | | | | | |

Thompson, Mary
Positivity Score: 100   Compliance Score: -5

2014-07-11:14:02:56.4446624
Time: 4:32
Topic: Thank you closing detected. Positivity Score:100

2014-07-11:14:22:46.4446632
Time: 0:34
Topic: No Inquiry of Legal Name. Compliance Score: -5
Status: Escalation Initiated

FIG. 11B

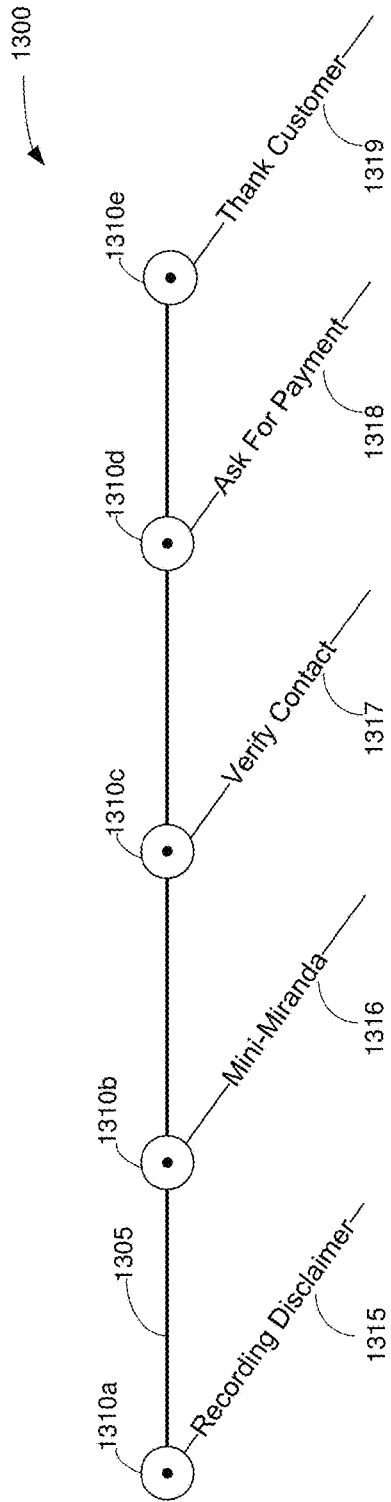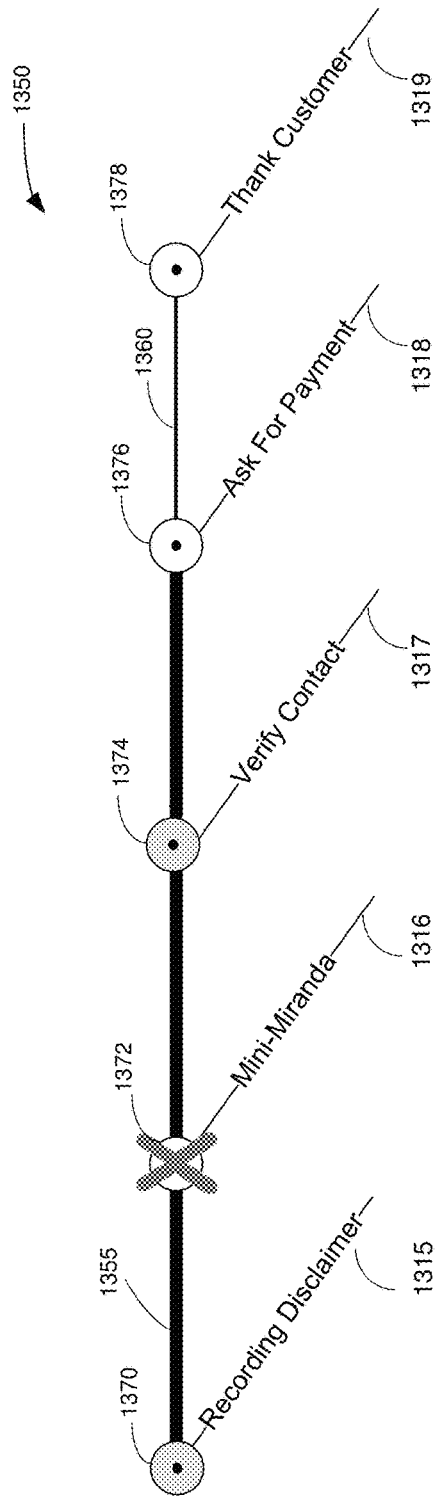
FIG. 13A
FIG. 13B

Topic Detection Details — 2700

Agent: Mary Thompson — 2705
Topic: Curse Words — 2710
Trigger Basis: Detection of Curseword by Agent — 2715

| Instance — 2720 | Call # — 2725 | Time Detected — 2730 | Click to Play — 2735 |
|---|---|---|---|
| 1 | 1 | 2:35 pm 14 sec. | ◎ |
| 2 | 1 | 2:35 pm 23 sec. | ◎ |
| 3 | 2 | 4:12 pm 45 sec. | ◎ |

FIG. 27A

Topic Detection Details — 2750

Agent: Mary Thompson
Topic: Mini-Miranda
Trigger Basis: Detection of Missing or Incorrect Usage

| Instance | Call # | Time Detected | Click to Play |
|---|---|---|---|
| 1 — 2755 | 1 | 14 sec. | ◎ |
| 2 — 2760 | 2 | 23 sec. | ◎ |
| 3 — 2765 | 3 | 35 sec. | ◎ |

FIG. 27B

REVIEWING PORTIONS OF TELEPHONE CALL RECORDINGS IN A CONTACT CENTER USING TOPIC META-DATA RECORDS

FIELD OF INVENTION

The field of the invention generally pertains to analyzing telephone calls in a contact center using a real time speech analytics system, tagging where speech events are detected in those calls, and visually and aurally reviewing information of those calls where the speech events were reported.

BACKGROUND

Contact centers employ agents to interact with called parties for a variety of purposes, such as debt collection, telemarketing, soliciting donations, or providing customer service. For a variety of applications, there may be various state or federal regulations governing how the interaction may occur. In addition, the contact center may have various policies that govern how the agent is to conduct the call. The agent is expected to comply with the appropriate regulations and policies, but in fact, this may be difficult depending on the particular circumstances. This is because the agent may be involved in various campaigns governed by different regulations and policies. The agent may be temporarily distracted during a call and may not recall all the applicable regulations.

For example, depending on the particular circumstances, the agent may be required to ensure that the certain information is provided to the remote party or respond in a certain way when provided with information by the remote party. In the past, one way of ensuring that the agent complied with the applicable regulations or policies was to record the call involving the agent. The call would then be reviewed by an experienced agent who would identify or rank the agent's performance. It is not uncommon for a very small sample of such calls involving the agent to be reviewed, i.e., perhaps a fraction of 1% of the agent's calls. Further, such a review may occur days or weeks after the call was initially recorded. This approach could only identify a deficiency in an agent's performance long after the call was completed. There may have been hundreds of calls made by the agent before any feedback is provided to the agent. Thus, any errors in the agent's call handling practice may go uncorrected for some time.

Agents may have a genuine desire to improve their performance, but they may not be aware that they have made a mistake. They may be distracted, nervous, or simply unaware that they overlooked an opportunity to improve their performance or were non-compliant in a particular circumstance. Real-time feedback is typically more effective in modifying human behavior, and delayed review of the agent's performance may serve to entrench undesirable agent habits.

One technology that can be applied to monitor and identify an agent's non-compliance involves the use of real-time speech analytics. This technology can monitor and "understand" the speech and the context of the speech as it occurs in conversation between the agent and remote party. Unlike speech recognition, the speech is analyzed for a particular conversation relative to a particular framework or context. In other words, in order for the speech analysis to detect a non-compliance condition, there must be first a framework defined to compare the speech against. This may be complicated in that the particular framework to use may depend on various factors, and may not be deduced from the speech itself. For example, an agent providing customer service may respond to a called party by saying "I cannot tell you that." This may be an appropriate answer if the called party enquires about the agent's email address for personal correspondence, but the same response may not be an appropriate answer if the called party seeks the email address for directing a customer complaint. Thus, analyzing the speech during a call is highly dependent on the context in which the speech occurs. That is, merely recognizing a word(s) may not be sufficient.

Once an agent's performance is determined for a call, it may be desirable to quickly review the agent's performance for a number of calls during a time period. In different contexts, this review may occur in different formats. One such format could be visual and another format could be aural. Further, mechanisms need to be defined to allow easily and quickly switching from one format to another.

Thus, systems and methods required to be defined to effectively and quickly review whether an agent is compliance with various regulations and contact center policies. A flexible approach for providing both visual and aural review methods is needed. It is with respect to these and other considerations that the disclosure herein is presented.

BRIEF SUMMARY

Technologies are generally presented herein pertaining to systems, methods, and non-transitory computer readable media for presenting information pertaining to a keyword detected by a speech analytics system during a voice call handled by an agent in a contact center. This information may be displayed visually and also reviewed aurally by a user, where the user may be the agent or a supervisor of the agent. Aural review may occur by the user selecting an icon associated with the keyword, allowing the user to aurally review a particular portion of the call recording associated with the keyword.

BRIEF DESCRIPTION OF THE DRAWINGS

Reference will now be made to the accompanying drawings, which are not necessarily drawn to scale, and wherein:

FIGS. 8A-8C illustrates embodiments of a user interacting with a real-time speech analytics alert overlaid on an agent icon on a display.

FIGS. 11A-11B illustrate an embodiment of a tabular real-time speech analytics display with a real-time speech analytics alert overlaid thereupon.

FIGS. 13A, 13B, 14A, 14B, and 14C illustrate various embodiments of checkpoint widgets capable of indicating the status of checkpoints during a call.

FIGS. 27A and 27B represent embodiments of providing topic detection information to a user on a graphical user interface.

DETAILED DESCRIPTION

Figure 1:
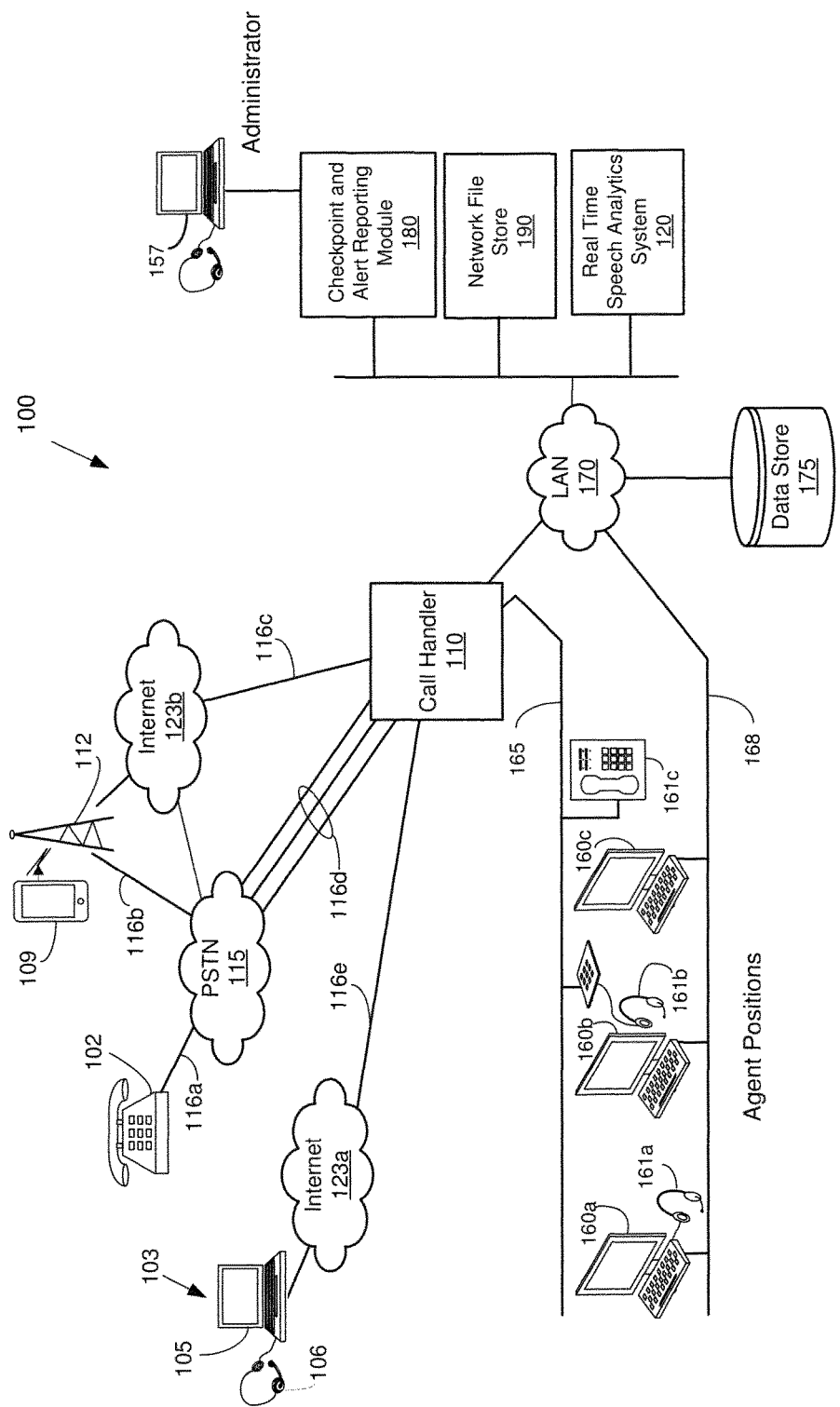
FIG. 1 shows one embodiment of a contact center used in conjunction with the concepts and technologies presented herein.

Various embodiments for practicing the technologies disclosed herein are described more fully hereinafter with reference to the accompanying drawings, in which some, but not all embodiments of the technologies are shown. Indeed, the embodiments disclosed herein are provided so that this disclosure will satisfy applicable legal requirements and should not be construed as limiting or precluding other embodiments applying the teachings and concepts disclosed herein. As will be evident, there are a number of variations on the embodiments disclosed herein, but which are based on similar concepts and goals. Like numbers in the drawings refer to like elements throughout.

Glossary

The following terms are to be given the following meanings in this specification only, when used in the appropriate context. The meanings provided herein supersedes any meaning provided in any of the aforementioned patent applications to which priority is claimed or patents incorporated by reference. Further, the terms defined herein are not applicable to any parent patent application(s) from which priority is claimed or which are incorporated by reference. Any examples included in a definition are not intended to be exclusive or limiting, but merely illustrative.

Alert (a.k.a. "alert indication")—information related to a condition detected during a call between an agent and remote party. In most contexts herein, reference to an "alert" involves a "RTSA alert" which is a particular form of an alert that reports information in real-time related to a speech condition occurring during the call. An RTSA alert is typically related to detecting unexpected speech or failing to detect expected speech. If reference is made to an "alert" that is not an RTSA alert, then this will be clear from the context.

Alert Bubble—an icon displaying a numerical value representing the number of alerts reported during a current call for a particular agent. Typically, the alert bubble icon is displayed once an alert is reported and remains displayed for the duration of the call. The numerical value indicated by an alert bubble may be incremented during the call if another alert is reported.

Alert Details—information that provides additional details about one or more alerts. This may be displayed in a message box ("alert details box"), usually comprising only text, but which may incorporate icons and/or colors. The Alert Details are usually displayed in response to a user selecting a particular Alert Bubble. In such cases, the Alert Details may be displayed until explicitly closed, or may be displayed for a set time.

Alert Overlay—a message box, which may incorporate various icons and different colors that indicate information about a currently reported alert. The icons and/or colors may be used to report a type or severity of the alert. The alert overlay typically is displayed in a transient manner, e.g., for a few seconds before disappearing.

Agent Icon—an icon used on a graphical user interface comprising text information identifying an agent and possibly their status, typically along with an image of that agent. The image may be a picture, drawing, or other symbol of that agent.

Call Handler System ("CHS")—one or more components in a contact center that processes communications and functions in a coordinated manner to provide communications between an agent and remote party. The communications may include communications that are inbound or outbound (relative to the contact center) and may encompass a variety of communication technologies. A call handler system frequently handles voice oriented calls, but may handle other types of communications in addition. The "call handler" is the primary component in the call handler system and its functions it to originate calls or receive calls at the contact center and coordinate communication between the remote party and the agent. It also bridges a call leg to a RTSA system, if required.

Call Leg—a portion of a call, typically between two pieces of equipment. Call legs may be concatenated or joined to form an end-to-end call between two or more individuals or entities. Call legs are typically bi-directional in their capability to convey voice, but not necessarily, as a call leg may convey voice in a unidirectional manner from one party to another, but not in the reverse direction.

Campaign—a set of calls processed in a contact center by a call handler in a common manner or for a common purpose.

Checkpoint—a point during a voice call that is associated with the expected or possible occurrence of a speech event.

Checkpoint and Alert Reporting Module ("CARM")—code executing on a processor that receives event messages and processes the event related data for various purposes, including, such as, to cause alerts to be generated or updating the status of checkpoint indicators. The CARM may only provide checkpoint related processing functions, alert related processing functions, or both. In addition, other functions related to checkpoint widgets may be performed. The CARM may also refer to the code and the processor executing the code.

Checkpoint Occurrence—the occurrence of an expected or possible speech event that is identified as corresponding to a checkpoint. Not all occurring speech events are necessarily checkpoints.

Checkpoint Indicator (a.k.a. "checkpoint status indicator")—one or more visual elements of a checkpoint widget representing a checkpoint of a voice call.

Checkpoint Indicator Text—text associated with a checkpoint indicator on a checkpoint widget that informs the reader of the nature of the checkpoint.

Checkpoint Indicator Status—a particular state of a checkpoint indicator, which typically reflects whether or not the checkpoint has been detected or occurred.

Checkpoint Chronological Order—the relative order in time when checkpoints are expected to occur during a call. This is not necessarily the same as when the checkpoints actually occur, since not all checkpoints may actually occur during a call, may occur in an unexpected order, or may occur in an order which cannot be accurately predicted. A checkpoint widget may illustrate checkpoints in an explicit or implied chronological order. Other widgets may not have an explicit or implied chronological order of checkpoints.

Compliance Score—a numerical score allocated in conjunction with one or more detected speech conditions that is associated with a compliance requirement. This could be allocated on a per-instance basis or on a cumulative basis for a particular agent.

Event (a.k.a. "speech event")—detection by an RTSA system of a keyword uttered in the speech, typically involving one of an agent or remote party in a voice call. Events are typically reported, and hence reporting an event is indicating the occurrence of the event as detected by the RTSA system.

Event Configuration—providing information necessary for the RTSA system to detect an event—e.g., the context for detecting the keyword. This would include, e.g., indicating the keywords that the RTSA is to detect and report-out as an event message along with other configuration data. Various labels could be defined and associated with reporting an event, and defining such labels could be part of the event configuration process.

Event Message—the message sent by the RTSA system reporting detection of an event. This may also called an "alert message" when referring to reporting a speech condition associated with an alert. Event messages also report out occurrence of a speech condition associated with a checkpoint.

Filter Information—information used to potentially exclude or limit some information from a larger set of information. For example, filter information may be used to limit selection of some checkpoint widget from a larger set, allowing a user to, e.g., see only some of the checkpoint widgets associated with a number of calls.

File Store (a.k.a. "File")—components or systems for storing records or files. This could be a file server, network file storage, database, redundant array of interchangeable disk systems, shared disk systems, virtual file system, etc.

Keyword—a word, set of words, or phrase and its associated context, in which the detection thereof is reported as an event by an RTSA system. For example, "Yes, I can" and "Yup" could be defined as keywords.

Keyword Indicator—a visual indication on a timeline corresponding to detection and reporting of a keyword. A label may identify the keyword itself or the keyword set that the keyword is associated with.

Keyword Set—a set of keywords having a common meaning. Also called a "topic." Thus, the set of "Yes, I can"; "Yep"; and "Okay" could be a keyword set, which could be given a name, such as the "yes" keyword set. (It is common, as in this example that the name of the keyword set may also correlate to an individual keyword in the keyword set.)

NPA-NXX—A portion of a telephone number, where the NPA represents the numbering plan area, commonly called the area code, and the NXX represents the central office code. The NPX-NXX was historically associated with a geographic location, but since the NPA NXX may be associated with a wireless number or may have been ported, the geographical location of a particular NPA-NXX may not be readily ascertained without requiring additional information.

Positivity Score—a numerical score allocated in conjunction with a detected speech condition where the score reflects the extent of an agent's favorable or desirable behavior (or potentially undesirable behavior). This could be allocated on a per-instance basis or on a cumulative basis for a particular agent.

Real-Time Speech Analytics ("RTSA")—the processing of speech, in real time, to determine a context and the words spoken. RTSA is distinguished from speech recognition, which only recognizes a spoken word, and does not determine a context in which the word occurs.

Real Time Speech Analytics System ("RTSA System")—a speech analytics system capable of providing real-time analysis of speech in a defined context. This may be employed in a contact center to detect and report on various speech conditions between an agent and a remote party that may occur during a call.

Score—points associated with an event. The score may be categorized for a certain type of events (e.g., positivity or compliance related). The score may be positive or negative. A score may be defined for events that are checkpoints separate from events that are alerts.

Speech Condition—a condition involving the occurrence of speech on a call between two parties pertaining to either 1) the detected presence of specific speech or 2) the absence of specific speech. Typically, though not always, this involves speech spoken by the agent. Typically, this is also associated with a particular context, e.g., other information associated with the speech.

Transient Alert Indication—an alert indication that is provided in a transient manner, wherein information is displayed and then removed after a time period without any user interaction. The time period typically is configurable, and may range from less than a second to the duration of the call. Typically, the duration is set to be less than 10-30 seconds.

Tabular Manner—having a characteristic of a table format comprising rows and columns, with each cell formed thereby comprising text, and which may also incorporate different colors and/or icons.

Topic—another name for a "keyword set." A topic may have a name. For example, a topic called "affirmed", which reflects a positive response from a party, may have a number of keywords associated with it, such as "yes", "yeah", "sure", and "okay". It is also possible to call the topic using the name "yes," which by coincidence corresponds to the "yes" keyword in the topic.

Topic Meta-data—data about detection of a speech event correlated with a topic. Topic meta-data is typically structured as a record in the topic meta-data file, and provides various data elements related to a speech event.

Topic dashboard icon (a.k.a. topic dashboard indicator)—a visual element that is displayed in a non-transient manner, which indicates detection of a particular topic over one or more calls, and reflects the outcome of analyzing a frequency of occurrence of the topic. Typically the outcome is reflected in a numerical value, but could also be reflected by a visual characteristic of the topic dashboard icon.

Time-line (in conjunction with a checkpoint widget)—a visual element indicating the passage of time. A time-line may have checkpoint indicators shown thereon as well as keyword indicators.

Widget (also called "Checkpoint Widget")—a collection of visual elements displayed on a computer screen, which may comprise text, icons, and symbols representing one or more checkpoints that are indicated by corresponding checkpoint indications (also called "checkpoint status indicators") that reflect whether the checkpoint occurred. The widget is configurable so as to be capable of indicating which checkpoints have occurred and thus may change over time.

Widget Instance—a depiction of a widget at a particular time. The widget has the ability to indicate whether checkpoints have been detected during a call and thus can change over time. Thus representation of a widget by a diagram or figure inherently depicts a static representation of the widget at a specific point in time.

Workstation—a computer configured to handle agent-related contact center functions in contact center. In one embodiment, this may be a specialized computer based component configured to handle voice calls or process information related to such voice calls. The workstation comprises a display, often a computer display, and may, but not always, comprise a telephone device.

Voice Call—communications involving human recognizable speech, which may involve various forms of technologies, including conventional telephony, digitized voice, ISDN, VoIP, etc.

Service Concepts

Contact centers must comply with various federal and state regulations that govern how certain types of calls may be conducted. These regulations may provide a spectrum of guidelines as to how certain types of calls are to be conducted. For example, broad guidelines may prohibit an agent involved in a debt collection call from making intimidating statements to the debtor. On the other hand, other guidelines may be very specific in that they require the agent involved in a debt collection call provide certain information (e.g., make certain statements) to the debtor, such as indicating at the beginning of the call that the purpose of the call is to collect a debt. Further, many contact centers have other policies, such as prohibiting agents from using curse words, mandating a welcome greeting, or requiring the agent to ask the party at the end of the call whether there are any outstanding questions or issues that need to be addressed.

Compliance with these regulations may require the agent to convey certain information, or to refrain from making certain statements. Usually, compliance with the regulations requires the agent to behave in a certain manner. In various circumstances, the agent's behavior may depend on what the remote party says. Obviously, a contact center cannot control what the remote party does or does not say on a call with the agent, and thus focuses on the agent's conduct. Thus, depending on the context, including based on what the remote party says, the agent is expected to provide certain information or refrain from using certain speech. These may be broadly referred to as "speech conditions."

In the past, detection of undesirable speech conditions was largely performed by humans. This may have been performed by reviewing call recordings and manually evaluating whether the agent complied with certain regulations. In addition, such evaluation may have been performed in real-time by a supervisor, by using a "barge-in" or other conferencing capability whereby the supervisor could listen to or monitor the conversation. Regardless of whether the activity was done in real-time or in non-real-time, the process was labor intensive in that it required a knowledgeable and experienced person to perform the evaluations. However, some of the activity is, by its nature, menial. For example, monitoring the speech for a curse word uttered by the agent does not require any particular experience and can be a tedious exercise. Further, it could be often overlooked, since not all calls were recorded and reviewed.

Speech analytics systems ("SAS") are now able to detect programmed speech conditions, and more recently, can perform this in real-time. Thus, a real-time speech analytics system ("RTSA system") is an effective labor-saving technology that can provide real-time analysis of many conversations of agents in a contact center on a non-stop basis. RTSA is more sophisticated than mere speech recognition, in that it allows more sophisticated contexts to be defined. For example, it can detect when an agent responds inappropriately to a certain question posed by the remote party, as opposed to merely recognizing a particular word or phrase.

For example, it may be possible to detect using speech recognition when the agent states the words "I can't tell you." However, detecting this speech by itself may not be very useful. This may be a valid answer if the agent is asked by the remote party for confidential information, e.g., his annual salary or home address. On the other hand, if the party is asking the agent for the party's current balance or due date for the next payment, such an answer is inappropriate. Speech analytics can detect the context of the speech and apply rules for generating an alert, which mere speech recognition systems cannot.

Thus, SAS (e.g., an RTSA system which is a system that can perform real time speech analytics) can alleviate the need for a supervisor or similar person to analyze each call serially. Obviously, requiring a supervisor to monitor each call limits the number of calls from agents that can be monitored. Thus, using an RTSA system makes it now possible for all calls of all agents to be continuously monitored for compliance and other aspects.

This raises an issue of how a supervisor is expected to analyze the results from a RTSA system. There are a number of speech conditions that may be detected during a call, and it may be quite burdensome and overwhelming for a supervisor to be able to review the results from all calls, especially if the results are provided non-stop in real-time. For example, a contact center may have dozens or hundreds of agents that are making a number of calls. Providing real-time results of each speech condition detected could easily overwhelm a supervisor.

The results from the RTSA system that are provided to a supervisor or an agent may be referred to as "alerts" or more specifically, "RTSA alerts." RTSA alerts report detection of a particular speech condition. Usually, the alert relates to speech from the agent, not from the remote party. However, the speech condition reported with respect to the agent may be based on a context that takes into account speech from the remote party. For example, once an agent engaged in a debt collection call is informed by the debtor that they are represented by a lawyer, any further attempts by the agent to collect the debt should cease. Thus, detecting an attempt to collect a debt is a concern only if the party has informed the agent that they have retained a lawyer. Consequently, reporting this speech condition relates to the agent, but the context involves speech from both the remote party and the agent. Thus, it may be necessary to report detection of both speech events in order ascertain the context and then send a single alert.

The alert may report a negative or undesirable speech condition, which may be a violation of a policy or regulation. In addition, the alert may report a positive or desirable speech condition, which may reflect that the agent is in conformance with a policy or regulation. Thus, the supervisor reviewing alerts may receive either positive or negative alerts. These may be used in evaluating the performance of an agent. Typically, these are compiled into a numerical value, called a "score" of some type (e.g., a "compliance score").

Supervisors reviewing such alerts may require various types of information in order to quickly assess a RTSA alert. For example, since supervisors may be receiving or reviewing alerts in real-time, they may find it beneficial that the alerts are formatted so they can quickly evaluate whether a particular alert is a positive or negative alert. A negative alert may represent a compliance violation and depending on the context, may require immediate intervention by the supervisor. A quick and easy method of distinguishing between a positive and negative alert is by color code on the alert indication. An alert indication may be associated with one color for positive alerts, such as green, and another color for negative alerts, such as red. Other colors may be used to reflect other categories. Ascertaining the color of a visual indication can be done very quickly and easily, and much quicker than having to read, e.g., text.

Further, a visual indication of the severity of the alert is useful. This allows the supervisor to focus their attention on the severe versus minor violations. Again, this can be reflected by different color shades or hues used on the alert indication. Thus, a dark red could be interpreted as more severe than a light red. In another embodiment, an icon may be included in the alert to indicate a severity. This may involve various levels of colors, line thicknesses, shapes, or sizes. Thus, a small exclamation point ("!") may represent one level of severity, and a greater severity level may be reflected by e.g., a larger font, different color, or by concatenating two such marks (e.g, "!!"). In addition, in other embodiments, a sound level may optionally be used to indicate a severity. This may involve different sounds or different levels of the same sound. Sounds may be defined to merely attract attention (e.g., a whistle or chirp), convey urgency or a warning (e.g., a claxon sound), or some other characteristic.

The alert itself may also include text-based information to provide additional details. Text-based information obviously requires the intended recipient (usually the contact center supervisor or manager) to read and understand the information in order to evaluate its significance. Thus, text-based information may be used by a supervisor to augment the color/icon information if they so desire. In other words, the supervisor may select a particular alert based on the color or severity and then further click on an icon to be presented with the associated text.

In addition, the supervisor needs to be able to quickly review current alert information, past (historical) alert information, as well as trends. This allows the supervisor to quickly evaluate whether a problem is transient, ongoing, or developing into a worse situation. This must be provided with minimal interaction and distraction with the supervisor, given the potentially large number of alerts that may be received.

While alerts provide particular information related to a call to a supervisor or agent, the depiction of events that have occurred may also be presented to a supervisor or agent via a checkpoint widget (or simply "widget"). The widget depicts the occurrence of certain events that have been designated as "checkpoints". A checkpoint reflects is an event (e.g., the detection of a potential particular speech related occurrence) that has been labeled as a checkpoint, typically reflecting its importance in some way. By defining certain keywords as checkpoints, this allows a filter to be defined that can distinguish some events from others (e.g., non-checkpoint events from event checkpoints). As checkpoints are detected during a call, checkpoint indicators on the widget that is displayed are modified to reflect the occurrence of the corresponding keyword. The checkpoint widget provides a very easy-to-understand indication of the status of a call with respect to which checkpoints have occurred. The call status may thus be ascertained faster and easier than reviewing the alert history for a given agent.

In one respect, one difference between alerts and checkpoints is that both may be reported via an event message, but one is designated as a checkpoint as opposed to an alert. An alert may be considered as a speech event that is worthy of providing notification to a user (e.g., an "important" event). An event message may report a speech condition that is expected, and hence may be designated as a checkpoint, but its detection or absence thereof may not be deemed important enough to cause an alert to a user reporting such.

In another respect, an alert is geared more towards providing an instantaneous notification of a speech event during of a call, whereas checkpoints may serve as guideposts to determine "where" a call is currently located in regards to an expected flow of the call. Finally, alerts frequently are used to report undesirable events (though they may report positive events), whereas checkpoints are typically used to report expected events during a call (but which may be categorized as desirable or negative). Further, because checkpoints reflect the expected occurrence of events, they may have an expected chronological order. In contrast, alerts may not have an expected chronological order. It should be noted that in various embodiments, not all of these generalizations will always be present or applicable. For example, it is possible that failure to detect an event will cause both an alert to be generated and cause a change in a checkpoint status indicator to occur.

Merely indicating when a certain event occurred during a call does not necessarily reflect occurrence of a checkpoint. This is because, in part, knowing whether an event occurs during a call cannot be ascertained until after that particular event has occurred. Thus, indicating when a certain event has actually occurred is different from indicating events that are expected to occur, or may occur during a call. In the latter case, expected events can be defined before a call occurs, whereas indicating events that have actually occurred obviously cannot be indicated before the call occurs. Thus, checkpoints should not be confused with technologies that merely visually indicate what speech has been detected during a call as opposed to indicating speech that is expected or which may occur.

Associating an Alert with an Agent

Associating a given alert to a given agent is necessary for various reasons. If there is a negative speech condition detected and reported, the supervisor requires knowledge of which agent was involved, not that there simply was a negative alert reported from among a set of agents. There may be, e.g., a hundred agents and providing corrective action for an agent obviously requires knowing which agent was involved. The indication to a user of the association of an agent with an alert can occur in various ways. Two main ways include: tabular and graphical.

First, it is important to distinguish that the tabular format for reporting alerts is not the same as table-based reports. Reports are well known in contact centers and provide tables of various statistics for agents, which can be organized in different ways. However, the presentation of reports typically involve presenting information as a static summary. Frequently, such reports convey information in a non-interactive, non-real time format, which requires presenting all available information on the table, and if not presented, the information is not readily available. Thus, a conventional report format makes it difficult to provide the various levels of detail which may or may not be required depending on the circumstances.

In contrast, alert indications are dynamically presented in real-time according to the concepts and technologies presented herein. Thus, the tabular format is not the same as a table-based report. In the tabular format, each alert is indicated in a column on a table with the name of the agent (or functional equivalent identifier) indicated in a corresponding column. Thus, one format may list the alert in a row in the table along with the agent's name in another column in that row. The use of such tabular reports is well known in contact centers, but such information is typically not real-time summaries of information. The tabular format, as with the graphical format, may provide real-time information, and may allow the ability to "drill-down" and obtain further detailed information. Thus, the tabular format is more like an interactive dashboard. This is not possible in a static report. Of course, it is possible to generate a report of alerts which were indicated, but the report is a static, non-real time summary of past events.

A graphical form for an alert is well suited for a supervisor to quickly associate an alert to an agent. Thus, the graphical form is well adapted to real-time indications and evaluations. This can be done different ways, including by associating an alert to a map of a particular work location of the agent and/or including a pictorial image or icon of the agent. One embodiment involves a work location map, typically referred to as a "floor plan map." This may represent a floor diagram of the contact center. The floor plan map is typically applicable to contact centers that maintain a physical presence (as opposed to contact centers that support work-at-home or virtual agents). In a floor plan map, a layout of the various agent positions is shown, and a particular agent may be identified by highlighting or otherwise identifying a particular location on the floor plan map. Typically, the location is associated with their workspace or cubicle location.

The other graphical approach involves a series of agent icons, each of which represent an agent. Each agent may have a picture or other icon associated with their image, along with their name, for quick identification. A series of agent icons may be presented in a grid or a matrix of rows and columns, which allows easy identification of a particular agent. These can be grouped in various ways, including: alphabetically by name, by workgroup, location, experience, skill set, experience, etc.

The alert may contain the appropriate text and icon information such that the supervisor can identify the nature of the alert quickly and identify the agent that the alert is associated with by the relative positioning of the alert indication. In either the tabular or graphical form, the alert may be overlaid on the tabular icon, floor plan map, or over the appropriate agent icon or position to identify the agent involved. The alert is positioned to be approximate to the appropriate graphical image associated with the agent. This may be accomplished by overlaying the alert on a portion of the graphical image or the surrounding space associated that graphical image. Other embodiments may use a pointer or other graphical indicator to link the alert to the appropriate agent. In various embodiments, the name and/or image of the corresponding agent may be shown.

Typically, the alert indication is displayed in a transient manner. That is, the alert indication is displayed for a limited amount of time. If the alert indication was permanently displayed, there would eventually be a number of alert indications that would cover the display screen and could interfere with reviewing the information. This would make it very difficult to ascertain which alert indications were current, recent, or important. In other embodiments, the alerts could be configured to be placed on top of one another, with a slight offset. While this minimizes the space taken up, it eventually does increase the area of the displayed consumed.

In various embodiments, an alert count is maintained on the tabular, floor plan or agent icon showing a cumulative number of alerts received. This can be defined on a per call basis, per shift basis, or some other period of time. This allows the supervisor to review which agents are incurring alerts, which allows the supervisor to evaluate conditions even if they do not witness the transient alert indication.

Figure 2:
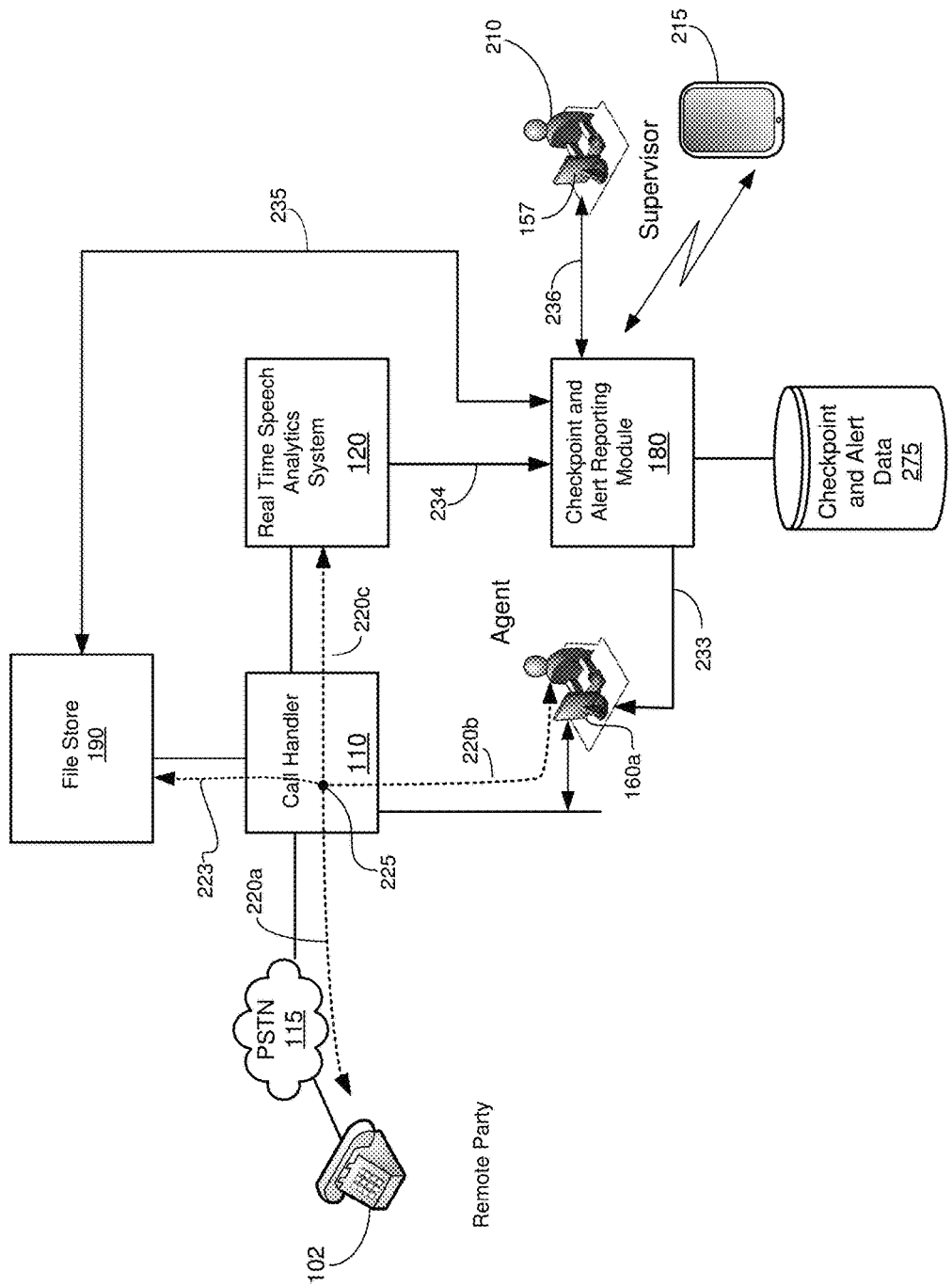
FIG. 2 illustrates one embodiment of a call involving a real time speech analytics system capable of generating real-time alerts that are processed by a checkpoint and alert reporting module and stored for either real-time or subsequently display to a contact center supervisor.

Contact Center Overview—FIGS. 1 & 2

Exemplary Call Center Architecture

FIG. 1 illustrates one embodiment of a call center architecture 100 that may be used in accordance with the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. That is, the call center may be considered a contact center. Thus, although a contact center has been referenced above, for the purposes of the remainder of this disclosure, the term "call center" is used throughout, although it is understood that the two are synonymous to the extent that they both handle voice calls.

Since the call center may handle calls originating from a calling party, or initiated to a called party, the term "party," without any further qualification, refers to a person associated with a call processed by the call center, where the call is either received from or placed to the party. The term "calling party," if used, will generally refer to a party communicating with the call center, but in many cases this usage is exemplary. Thus, use of the term "calling party" is not intended to limit the concepts to only inbound calls or voice calls, unless the context dictates such. Reference to the term "remote party" encompasses either a calling or called party.

Depending on the embodiment, inbound voice calls may originate from calling parties using a variety of different phone types. For instance, a calling party may originate a call from a conventional analog telephone 102 connected to a public switched telephone network ("PSTN") 115 using an analog plain old telephone service ("POTS") line 116*a*. The calls may be routed by the PSTN 115 and may comprise various types of facilities 116*d*, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 109, such as a smart phone, tablet, or other mobile device, which wirelessly communicates with a mobile service provider ("MSP") 112. The voice calls may be routed to the PSTN 115 using an integrated services digital network ("ISDN") interface 116*b* or other types of interfaces that are well known to those skilled in the art. In particular embodiments, the MSP 112 may also route calls as packetized voice, referred to herein as voice-over-IP ("VoIP") to an Internet provider 123*b* using Internet-based protocols. For convenience, unless indicated otherwise, the term "trunk" refers to any type of facility 116*c*, 116*d*, or 116*e* providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 103. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"), Megaco (a.k.a. MGCP), or H.323 developed by the International Telecommunications Union and the Internet Engineering Task Force. The call may be conveyed by other types of Internet providers 123*a*, such as a cable company providing Internet access services over a coaxial cable facility 116*e*. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call using any form of currently available technology and/or originating from any type of device, such as a soft phone 103, a conventional telephone 102, a mobile phone 109, or other device known in the art. The term "call" as used herein may encompass an active instance of two-way communication, an attempt to establish two-way communication, or a portion of the two-way communication. For example, a user at a conventional telephone 102 can dial a telephone call in an attempt to establish two-way communication, and a call can be said to exist even prior to establishment of a two-way connection.

In another example, a call may be put on hold, and a portion of the call may be referred to as a "call leg" existing between the caller and certain equipment, or between two pieces of equipment. A call may comprise a number of concatenated or joined call legs, which may involve various components at their end-points, as known to those skilled in the art. A call leg may also be unidirectional or bidirectional with respect to the ability to convey speech. In certain contexts, which will be made explicit, the call may encompass communications other than voice, for example, text, email, video chat, facsimile, etc. Unless stated otherwise, a call is a voice call.

In various embodiments, inbound calls from calling parties to the call center may be received at a call handler 110, which could be, in one embodiment, an automatic call distributor ("ACD"). In particular embodiments, the call handler 110 may be a specialized switch for receiving and routing inbound calls under various conditions. Further, the call handler 110 may be embodied as a dedicated form of equipment readily available from various manufacturers, or the call handler 110 may be a so-called "soft switch" comprising a suitable programming module executed by a processing device to perform the necessary functions. The call handler 110 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the call handler 110.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a specially configured computing device 160*a*-160*c*, such as a computer, and a voice device 161*a*-161*c* that is adapted for various contact center functions associated with processing communications. The combination of computing device 160*a*-160*c* and voice device 161*a*-161*c* may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161*a*-161*c* at the agent's position. Similarly, "routing the call to the agent" means routing a call to the appropriate equipment at an agent's position. The workstation computer typically has a display, which may be used to convey information to the agent about the calls, and the agent may interact with the call handler using a mouse or other pointing device with the display.

In particular embodiments, the voice device 161*a*-161*c* used by an agent may be a soft phone device exemplified by a headset 161*a* connected to the computer 160*a*. The soft phone device may be a virtual telephone implemented in part by an application program executing on the computer 160*a*. Further, the phone may also comprise an Internet Protocol ("IP") based headset 161*b* or a conventional phone 161*c*. Use of the term "phone" is intended to encompass all these types of voice devices used by an agent, unless indicated otherwise.

Agents typically log onto their workstations prior to handling calls. The workstation may also communicate this to the call handler. This allows the call center (including the call handler) to know which agents are available for handling calls. In particular embodiments, the call handler 110 may also maintain data of an agent's skill level that may be used to route a specific call to the agent or group of agents having the same skill level. In particular instances, if a suitable agent is not available to handle a call, the call handler 110 may queue the call for the next available agent. As can be expected, various algorithms may be employed to process calls in an efficient manner.

In various embodiments, two types of signaling information may be provided with an inbound call that may be used by the call handler 110 in processing the call. The first type of signaling information indicates the telephone number dialed by the calling party, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the call handler 110 may use the DNIS to determine the purpose of the call, and potentially identify a group of agents having the appropriate skill level to handle the call. Thus, in various embodiments, the call handler 110 may prioritize and route calls to an agent based on the required skill level. Skills-based routing may be a rule-based set of instructions that the call handler 110 uses to handle calls. Depending on the embodiment, skills-based routing may be implemented by the call handler 110, or by the call handler 110 interacting with a computer-telephone integrated ("CTI") server (not shown).

The second type of signaling information that may be provided with an inbound call is the calling telephone number, often referred to as automatic number identification or "ANI." In particular embodiments, the call handler 110 and/or CTI server may use the ANI of an incoming call to retrieve caller information from a data store 175 and provide the data to an agent's workstation computer 160*a*-160*c* over facilities 168 along with routing the call to the agent's workstation phone 161*a*-161*c*. Further, in particular embodiments, the ANI may also be used to ascertain a party's status (e.g., a "Gold Level" customer warranting premium service), determine whether consent has been received by a party for particular services or actions, and/or to facilitate the call handler 110 routing the call to a select group of agents. Depending on the embodiment, the data store 175 may include one or more databases storing different information such as, for example, records of caller information. Further, the data store 175 may be integrated with the call handler 110 or segregated as a standalone medium or media.

In various embodiments, the call handler 110 may place a call (either an inbound or outbound call) in a queue if there are no suitable agents available, and/or it may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components, such as the CTI server or the data store 175, to retrieve or provide information for processing the call. In other configurations, the IVR may be used to only provide announcements.

Depending on the embodiment, the interaction between the various components shown may involve using a local area network ("LAN") 170. However, other configurations are possible, such as, but not limited to, using a wide area network, wireless network, router, bridge, direct point-to-point links, etc. Thus, in lieu of facility 165 for conveying audio to the agents, the facilities associated with the LAN 170 may be used.

In particular embodiments, when an agent is interacting with a called or calling party, the agent may use his workstation computer 160*a*-160*c* to further interact with other enterprise computing systems, such as, for example, a customer relationship management ("CRM") server (not shown). A CRM server may be used to integrate information from various enterprise business systems to facilitate the agent servicing the call. In addition, the CRM server may provide a variety of applications.

In addition to receiving inbound communications, including, for example, voice calls, emails, text messages, and facsimiles, the call center may also originate communications to a called party, referred to herein as "outbound" communications. In some embodiments, the call handler 110 may be a dialer, such as a predictive dialer, that originates outbound calls at a rate designed to meet various criteria. The predictive dialer may then connect an agent at a workstation with the outbound call via a call leg after the remote party answers. Similar to the other components within the call center architecture 100, depending on the embodiment, the dialer may comprise one or more software modules executing on a processing device hardware platform.

In various embodiments, the call handler 110 is typically configured to dial a list of telephone numbers to initiate outbound calls. Thus, in some embodiments, the call handler 110 may include functionality for originating calls, and if so, this functionality may be embodied as a private automatic branch exchange ("PBX" or "PABX"). Further, in other embodiments, the call handler 110 may directly interface with voice trunks using facilities 116*c*, 116*d*, and 116*e* to the PSTN 115 and/or Internet providers 123*a*, 123*b* for originating calls. After the calls are originated, a transfer operation by the call handler 110 may connect the call with an agent or a queue, or in some instances the IVR. In various embodiments, the call handler 110 may make use of one or more algorithms to determine how and when to dial a list of numbers so as to minimize the likelihood of a called party being placed in a queue while maintaining target agent utilization. In other embodiments, the call handler may handle both incoming and outgoing calls.

Although a number of the above components may be variously referred to as a "server," each may be also referred to in the art as a "computing device," "module", "unit" or "system" or "sub-system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the call handler 110 or other component may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the call center.

Also shown is a Speech Analytics System ("SAS") which may be a real-time speech analytics ("RTSA") system 120. This typically monitors the speech during a call, and is able to monitor both the agent's and the remote party's speech. This is typically accomplished by using a conference bridge or similar function in the call handler 110, with a conference call leg to the RTSA system 120, although the RTSA system only listens to the speech, and does not interject any speech into the conference bridge. The conference call leg to the RTSA system may be unidirectional and may comprise single or dual audio streams. The RTSA system typically interfaces with the LAN 170 to communicate with other components, including the call handler 110 and a checkpoint and alert reporting module 180.

The RTSA system is configured to detect certain speech conditions in certain contexts. These speech conditions detected are also known as "topics" or "keywords" since it refers to speech in a particular context. More precisely, the RTSA detects a keyword, which may be one of several keywords defined in a keyword set (a.k.a. topic). Thus, the RTSA system can be configured to detect an agent's response to a particular question asked by the remote party, or detect whether the agent properly introduced themselves at the beginning of the call. The RTSA system can be configured to detect each speech condition and report its detection.

The messages generated by the RTSA system may be referred to as "event messages" and may convey information for an alert or a checkpoint, or both. The event messages are received by the checkpoint and alert reporting module, which in turn may be configured to generate other messages for causing alerts or checkpoint widgets to be displayed. The event messages may also be referred to as an "alert message" when the context refers to an event message that conveys information corresponding to an alert. The event message may also convey information that corresponds to a checkpoint status update. This type of event message could also be referred to as a "checkpoint message", but in most cases hereafter it will simply be referred to as an event message. Thus, without further qualification, an "event message" may refer to conveying information associated with either a checkpoint widget or alert, whereas an "alert message" is used to refer to a particular form of event message associated with an alert. Note that this distinction may not be absolute, since some event messages can convey information for an alert that is also defined as a checkpoint. Further, some event messages report detection of a keyword which does not necessarily correlate to a checkpoint or alert.

The topics detected by the RTSA system are typically associated with a name for administrative convenience. As noted earlier, the RTSA system can be configured to detect the agent providing a greeting at the beginning of a call. This topic could be given the name of "welcome." Thus, the "welcome topic" relates to detecting the agent's greeting. Similarly, a "closing topic" could detect a particular closing speech condition. Thus, the names provide an easy reference to a particular speech condition that the RTSA is configured to detect. In situations where the topic or keyword detected is associated with a checkpoint, the name may also correlate to text that is displayed with the checkpoint. However, it is possible the name of the topic and the text displayed may be slightly different.

The RTSA system 120 reports each detected topic to the checkpoint and alert reporting module 180 ("CARM"). In one embodiment, the CARM may comprise a processor and associated computer instructions, and may reside in the call handler, the RTSA system, or a separate dedicated processing system. The CARM, in turn, is configured to inform an agent and/or administrator, often at a supervisor's computer 157 or an agent's computer 160, although other processing devices may be involved (e.g., tablets, smart phones 215, etc.). In one embodiment, the CARM processes the alert and/or event message from the RTSA system and generates the appropriate indication to the administrator. As will be seen, the CARM may map an alert message to a variety of alert indication formats, depending on various criteria. Further, the CARM may also process an event message that results in presenting and updating a checkpoint widget to the agent and/or supervisor. In other instances, the CARM may process an event message so that nothing is updated or displayed to the agent or supervisor.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process and/or place calls.

Turning next to FIG. 2, additional details are provided regarding how a particular call is analyzed by the RTSA system and interacts with the other components. In this illustration, a three-way call is established and shown as a dotted line. One call leg 220a of the three-way call involves the telephone 102 of the remote party, which is connected through the PSTN 115 to the call handler 110. The call handler 110 effectively provides a conference capability, illustrated as a three-way bridge 225, although a variety of technologies can be used to provide such functionality, or similar functionality of joining call legs together. Another call leg 220b is established to the computer 160a of an agent, so that the agent and remote party can converse. Finally, the call handler 110 also establishes a third call leg 220c to the RTSA 120. This allows the RTSA to listen and monitor the speech between the agent and remote party. Unlike a conventional three-way call, the RTSA may not be able to interject speech into the conference, or if the bridge does allow it, the RTSA typically does not provide speech into the conference. Consequently, the call leg 220c to the RTSA may be either bi-directional or unidirectional.

Additionally, there may be a fourth call leg 223 from the call handler 120 to the file store 190. The file store may take a variety of forms, such as a file server, network file store, virtual file store, database, redundant array of interchangeable disks, archival storage, etc. The file store maintains storage of the speech of the call. As will be discussed later, the file store may store this information for a variety of formats, and allows selective retrieval of audio from an indicated call.

The RTSA system 120 is configured to recognize the presence or absence of certain keywords, which may be individual words or sets of words, including phrases. Thus, the RTSA may send an event message based on the real-time detected speech (or lack thereof) detected in a certain context. This event message is received by the CARM 180, which may process the message into an alert or potentially as an update to a checkpoint widget. In the context used herein, an "alert" (by itself, without qualifying the word "message") is information designed to ultimately inform a person with minimal processing, whereas an "alert message" refers to an event message conveying information designed to be further processed into an alert. Thus, the RTSA system 120 provides event messages, typically in a particular format, to the CARM 180, which then may provide suitable alerts in a desirable form effective for human processing or may provide updates to the checkpoint widget. The CARM 180 may also store alert or checkpoint information as a form of meta-data in a checkpoint and alert data database 275.

The CARM may also provide the meta-data related to the call to the file store 190 via signaling 235. For example, for each call stored in the file store 190, the CARM may provide meta-data relating to timing information of checkpoints that occurred during the call. The timing information, as will be seen, may be defined in various formats. One format may be an offset time from the beginning of each call for each checkpoint. For example, the meta-data may have an offset time #1 for the first checkpoint, an offset time #2 for the second checkpoint, etc. The file store 190 may store this information in association with the call recording, so that the call recording and the meta-data can be retrieved at a later time for reviewing the checkpoint widget.

The CARM processes the event message received from the RTSA system via signaling link 234 in order to provide a more useful and effective form of the information via an alert notification or checkpoint widget to the appropriate personnel, such as to the supervisor via signaling link 236 or to the agent via signaling link 233. To accomplish this, the CARM may interface with a LAN 170 for sending particular information to display devices over these signaling links. For example, the CARM 180 may send RTSA alerts or update a checkpoint widget for display on a supervisor's workstation 157, which the supervisor 210 views. In other embodiments, the CARM may send the RTSA alerts or checkpoint widgets to a mobile device, such as to a tablet which may have a Wi-Fi interface. Other devices, such as smart phone 215 may be used by the supervisor. In other embodiments, the CARM may send the checkpoint widget to the agent's computer 160a via link 233 and/or to the supervisor's computer 157 via link 236.

Some of the functions performed by the CARM include:
Authorization and Security: administrators may log into the CARM to configure how the alerts and checkpoint widget updates are sent, to whom they are sent, how certain conditions are manifested in the alerts, etc. The authorization and security may be based on conventional user identification and password credentials.

Mapping of event messages. The event message received from the RTSA system may be mapped to an alert or checkpoint widget, or both. As will be seen, various conditions may be reported in a RTSA event message and each can be mapped to particular graphical elements, such as icons, images, colors, and even sounds. This mapping may be defined or modified by editing various settings, which provide flexibility as to how RTSA alerts/checkpoint widget updates may be defined. In one embodiment, a mapping table may be used to define the mapping of an RTSA message to an alert indication for a user or for updating a checkpoint status indicator on a widget. It is possible that an event message may be used to define a context, which determines how a subsequent event message is to be mapped. Thus, the first event message is indirectly used for determining how to map other event messages.

Individuals Receiving Notifications. The CARM is configured to provide alerts/checkup widget updates to certain devices/individuals. These may be based on the type of alert of widget update. For example, all alerts/widget updates may be provided to one device, agent, or supervisor, whereas other select alerts may also be provided to another device, agent, or supervisor. This allows more serious speech conditions to be detected and reported as desired within the contact center. For example, certain RTSA messages may be sent as SMS texts to a smart phone of a team leader as well as the contact center supervisor.

Device Configuration Information. The CARM may also have configuration information as to how information is to be presented on different devices or individuals. For example, information may be configured for display on a computer using a conventional web browser or display on a smart phone using a mobile browser. A supervisor may desire to receive certain types of alerts/widget updates as SMS texts messages, but this requires structuring the text for 160 characters (the size of the SMS text). In other embodiments, alerts/widget updates may be sent to a paging system, voice announcement system, etc.

Checkpoint and Alert Reporting Module Process Flow

Various embodiments of the concepts are reflected in the process flows contained in the figures. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

The following discussion (e.g., for FIGS. 3A-12) largely focuses on the processing of alerts, though many of the concepts may be applicable to the processing of checkpoint widgets. The discussion thereafter (e.g., for FIGS. 13-21)

largely focuses on the processing of checkpoint widgets, though many of the concepts may be applicable to the processing of alerts. The discussion for FIG. 29 applies to both alerts and checkpoint widgets.

Figure 3A:
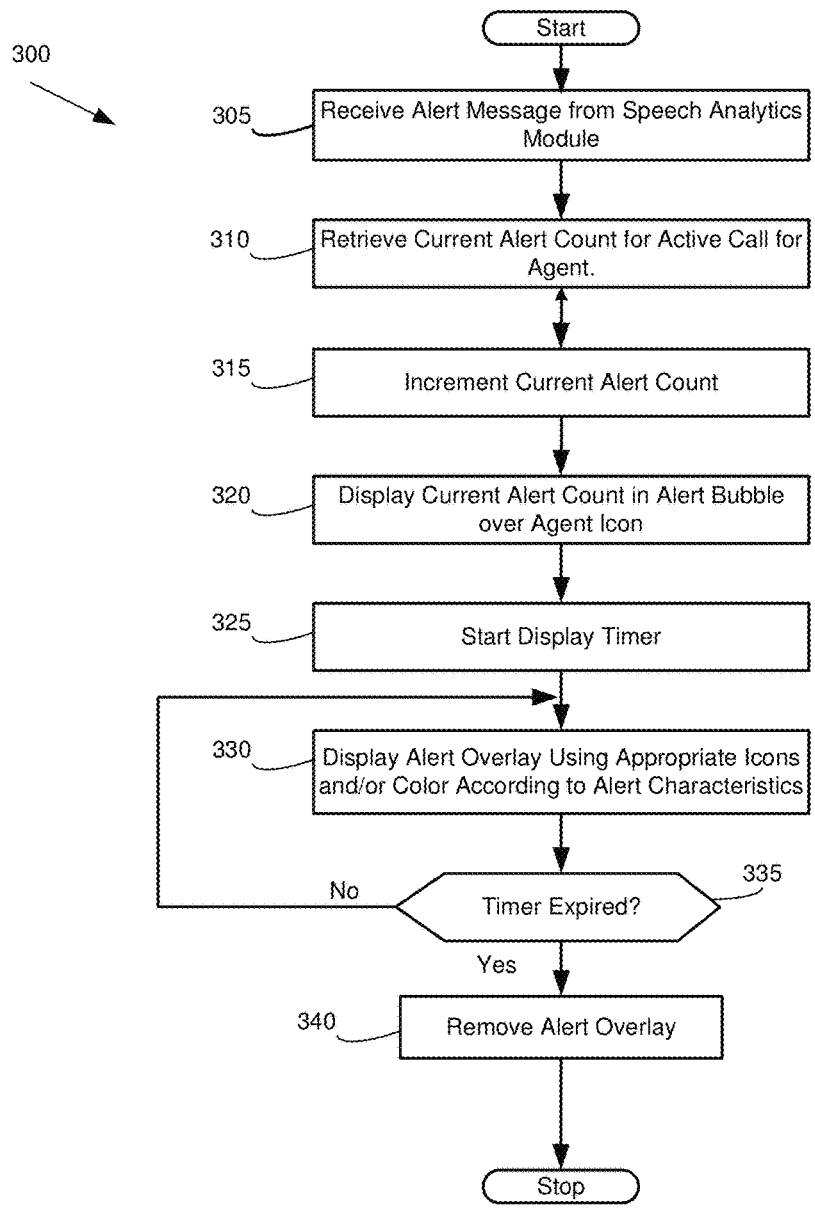
FIGS. 3A-3B illustrate embodiments of process flows of the checkpoint and alert reporting module to display real-time speech analytics alerts.

The CARM receives the RTSA system alert messages from the RTSA system and processes this information in order to generate the alerts intended for human consumption. A high level process flow 300 is shown in FIG. 3A. The process flow 300 begins with receiving the alert message (i.e., event message) from the RTSA system in operation 305. This could be conveyed on a direct link, or by using a LAN as shown in FIG. 1. The message can be provided using a variety of formats, and the content is processed by the CARM. Typically the message provides information about the RTSA topic or keyword that was detected, also referred to as the "speech condition." This typically includes context information such as the time of the detection of the speech condition, an identifier of the particular call, and in some embodiments, information identifying whether it was the agent or remote party. Depending on how the RTSA topic is defined, additional information may also reflect whether a topic (e.g., keyword) was detected during a call or its absence was noted during a call. In various embodiments, the event message may not convey information as to the severity, impact, or individuals to be notified, though it could be indicated in the event message. As can be appreciated, the exact information conveyed in the event message conveying alert information may vary in different embodiments. Typically, the information at least identifies the speech condition detected on a specific call.

An event message may be processed by the CARM to establish a context, and does not necessarily result in sending an alert. However, a subsequent event message received in the established context may result in then sending alert. For purposes of illustrating the concepts herein, the discussion presumes that the event message corresponds to a checkpoint or alert.

Next, the CARM retrieves a current alert counter for that active call for that agent in operation 310. This counter reflects the current cumulative number of alerts received for that call and the counter is incremented in operation 315. This count may be also stored in the agent's alert count in a database previously identified, so that cumulative statistics may be maintained for the agent. In some embodiments, cumulative counts for the number of alerts received during a call for an agent are maintained, and may also be cumulatively maintained for the shift of the agent and/or for an extended time period (e.g., two weeks, quarterly, annually). This allows easy reference by a supervisor to evaluate the progress (or trending pattern) of the agent over time or view a snapshot of the agent's performance during the call or during their shift.

The current alert counter is then displayed in operation 320 over an agent icon in an "Alert Bubble," which may be in one embodiment, a circle encasing the numerical value. This is a static indication, since it always appears in conjunction with the agent icon. The agent icon is a graphical representation of an agent. As will be seen, there are other graphical user information element formats which can be used in lieu of agent icons, but the illustration herein is based on using agent icons.

The next steps are focused on displaying a dynamic alert indication. This may be displayed in a transient manner, typically over, or adjacent to, the agent icon. First, a display timer is started in operation 325. This timer defines how long the RTSA alert is displayed over the agent icon. This value is typically set between 1 and 15 seconds, which is long enough to capture the attention of an individual looking at the agent icons and perhaps allows them to read the text provided with it, but not too long that the cumulative display of RTSA alerts begins to "clutter" the display of agent icons. Other timer values may be used, and the range of 1-15 seconds reflects a typical range, and not any sort of limit. Shorter or longer range values may be used.

Next, the RTSA alert is displayed in operation 330. The particular format of the RTSA alert may depend on the content of the RTSA message received from the RTSA. The format may reflect different colors, icons, fonts, and text, which may be based on the type and severity of the alert message. The CARM may use an alert mapping table (discussed below) to map alert information in the event message to various colors, fonts, icons, and text that is to be displayed. Reference to an alert mapping table is intended to encompass other types of data structures or mechanisms that may be used to perform the mapping function. Thus, reference to the "alert mapping table" should not be interpreted as requiring a table structure in all embodiments. Further, as will be seen, the alert mapping table may also contain information related to checkpoint widgets.

The RTSA alert is usually displayed until the display timer expires. Hence, in operation 335 a decision reflects whether the timer has expired. If not, the process loops back to operation 330 which has the effect of maintaining the display. Once the timer expires in operation 335, the process continues by removing the alert overlay from the display in operation 340. The process is completed at that point. It becomes evident that a user looking at the agent icon will view the alert when displayed, but if the user is not looking at the agent icon (i.e., distracted or looking elsewhere), it is possible that the user will miss the display of the alert.

The steps occurring in operation 330 that map the alert message into the RTSA alert for human review may greatly vary from embodiment to embodiment. The procedures defined herein reflect one approach, which allows certain alert information to be quickly conveyed and subsequently reviewed in greater depth by a supervisor in a contact center. The potential for a large number of RTSA alerts, which depends on the number of agents involved in simultaneous calls and the number of speech conditions detected, can greatly vary. Thus, the need to provide an effective synopsis of the relevant information depends on each embodiment. For example, some RTSA alerts may inform the viewer of compliance violations that could result in legal liability to a contact center operator. Such violations need to be easily distinguished by the supervisor from other, less critical, RTSA alerts.

The user viewing the agent icon may choose to view additional information about the alert, or other historical alerts associated with that particular agent. This may be accomplished by the user selecting the alert bubble or agent icon using a pointing device (e.g., mouse, joystick, cursor control, touch-screen, stylus, etc.) In one embodiment, the user may select the alert bubble or the agent icon at any time, including during the transient display of the alert indication over the agent icon. In another embodiment, the user may select the agent icon after the display of the transient alert indication ceases. In this case, the alert count shown in the alert bubble is displayed and informs the user that there was a prior alert indication received (which may have been missed because the user was looking elsewhere) and that further information is available. This process flow is shown in FIG. 3B.

Figure 3B:
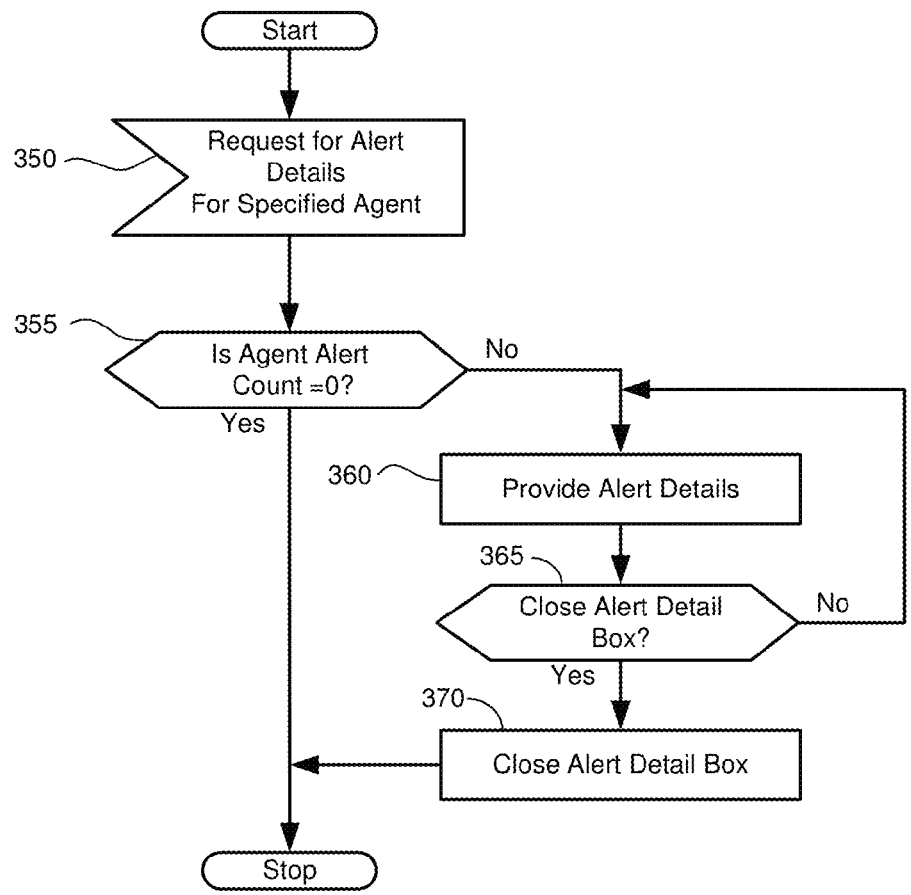

Turning to FIG. 3B, the process flow begins with receiving an input from the user requesting additional alert details in operation 350. A determination is made for the selected agent whether there are, in fact, any reported alert indications for that specific agent. If the alert count is zero (indication there are no prior alert indications), then the process terminates as there is no further information to display. If, however, the alert count is non-zero (e.g., a positive number), then there is additional alert information to be displayed. The appropriate information may be retrieved from a database, an alert log, or from memory. The alert details are provided in operation 360 to the user. This may be displayed using a variety of formats. The information may be displayed until an input is received closing the alert detail box in operation 365. Thus, if no such input is received, the process loops back to display the alert detailed in operation 360. Once the input is received to close the alert detail box, then the alert detail box is closed in operation 370. At that point, the process is completed.

Figure 4:
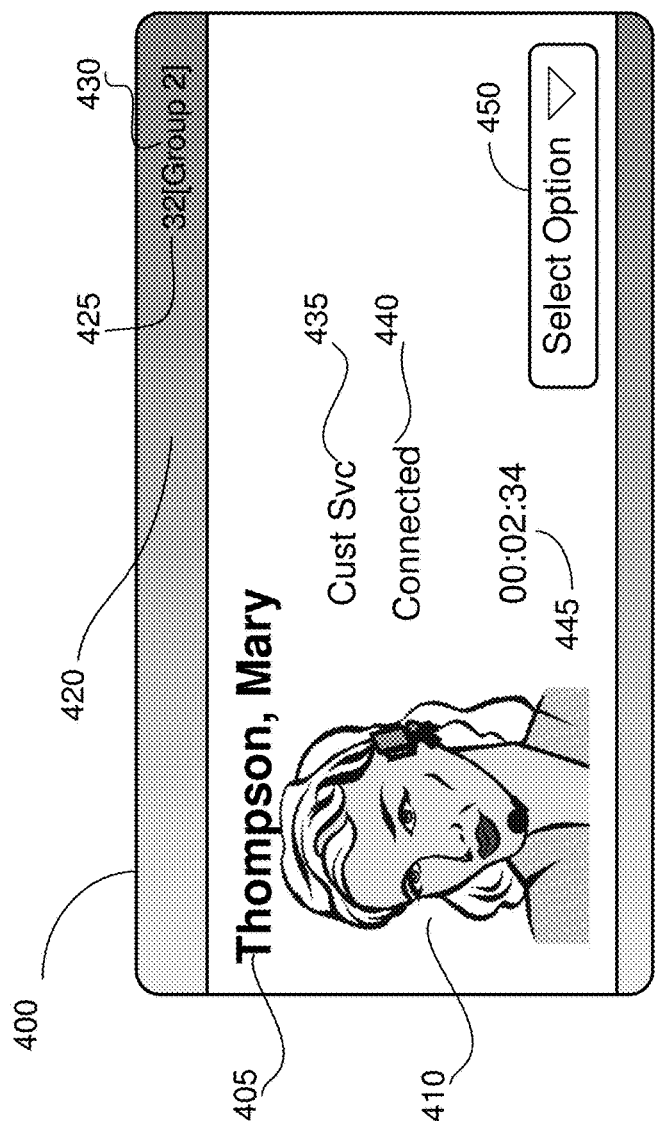
FIG. 4 illustrates one embodiment of an agent icon that may be displayed on a workstation.
Figure 5:
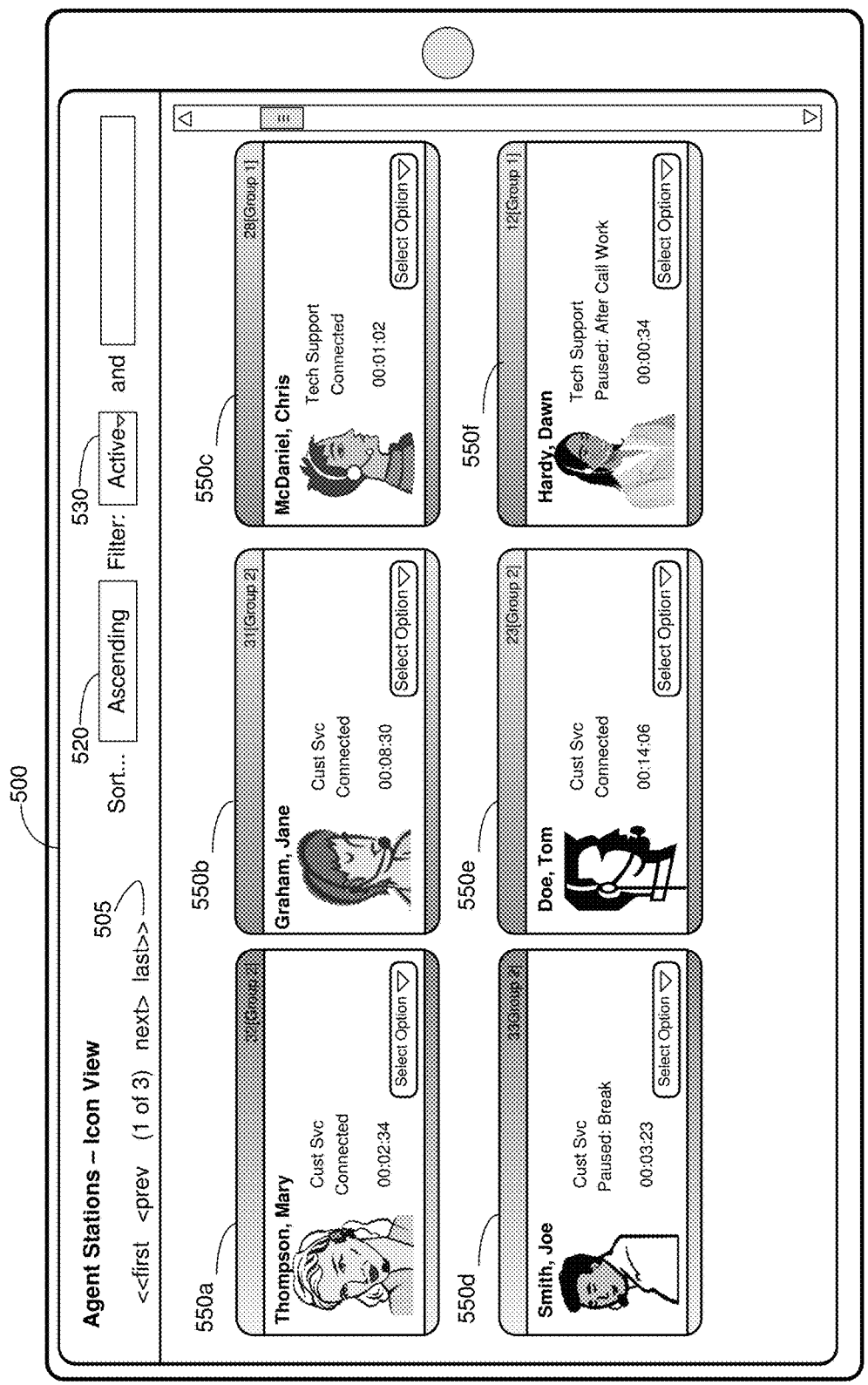
FIG. 5 illustrates one embodiment of a display on a workstation showing a plurality of agent icons.

Agent Icons Associated with Alerts—FIGS. 4-5

One format for displaying RTSA alerts involves overlaying a RTSA alert on an agent icon. Typically a grid of agent icons are viewed or presented at any given time. Before this aspect is reviewed further, it is appropriate to illustrate one embodiment of an agent icon.

Turning to FIG. 4, a representative agent icon 400 is shown. This is a box containing information that is designed to identify an agent and provide high level status information. For the purpose of identifying the relevant agent, each agent icon may include an image 410 of the agent, which may be a picture, icon, or caricature of the agent. If an image is not available, a generic "outline profile" may be used. In addition, a name 405 of the agent is provided. This allows the viewer to quickly associate the face and name of the agent for identification purposes.

A variety of status indicators may be provided. In this embodiment, an indication of the call campaign 435 is indicated. In this example, the agent is fielding customer service calls. The agent state 440 is reflected, which may be: connected, paused, waiting, or logged off. Other states may be defined. Briefly, "connected" means the agent is connected on a call; "pause" means the agent is not on a call, nor available to receive a call; "waiting" means the agent is ready to receive another call; and "logged-off" means the agent has logged off of the call handler. A timer 445 reflects how long that agent has been in that state. (For logged off, this value may be set to zero or null.) Thus, in FIG. 4, agent Mary Thompson is currently engaged in a customer service call and has been doing so for the last two minutes and thirty-four seconds.

Other information shown may include an agent station number 425, which may reflect a particular workspace location, physical telephone, or logical phone being used by the agent. In addition, a group indicator 430 may be used to indicate what group the agent is assigned to. It is possible, for example, that there may be multiple groups assigned to the same campaign.

The "select option" 450 icon allows a supervisor to select various functions that can be performed for that agent. These include: barge-in (joining the call), monitor (to listen to the call), or log-off the agent (to make the agent unavailable for further calls). Other functions may be defined.

Finally, the agent icon may include a color portion 420, shown in the figure as a shade of gray, although in practice, various colors may be used. The color may reflect the state of the agent, which can provide an easier means of identifying an agent's state as opposed to reading text 440. Further, the colors can also reflect other states, such as being monitored or a specific activity while in the paused state. Other embodiments may use different shadings, hatching patterns, etc.

A collection of agent icons may be assembled on a screen of a workstation or tablet. One embodiment is shown in FIG. 5. In this figure, the screen 500 is referred to as having a "grid" layout of agent icons 550a-550f, because the agent icons are typically arranged in rows and columns (e.g., a grid). Typically, a subset of all the available agent icons are shown on a single screen, which necessitates navigation controls 505 for selecting an appropriate page. Further, tools may be provided such as a sorting icon 520 or a filter 530 icon for searching and/or sorting through the agent icons.

RTSA Alerts—FIGS. 6-9

Figure 6:
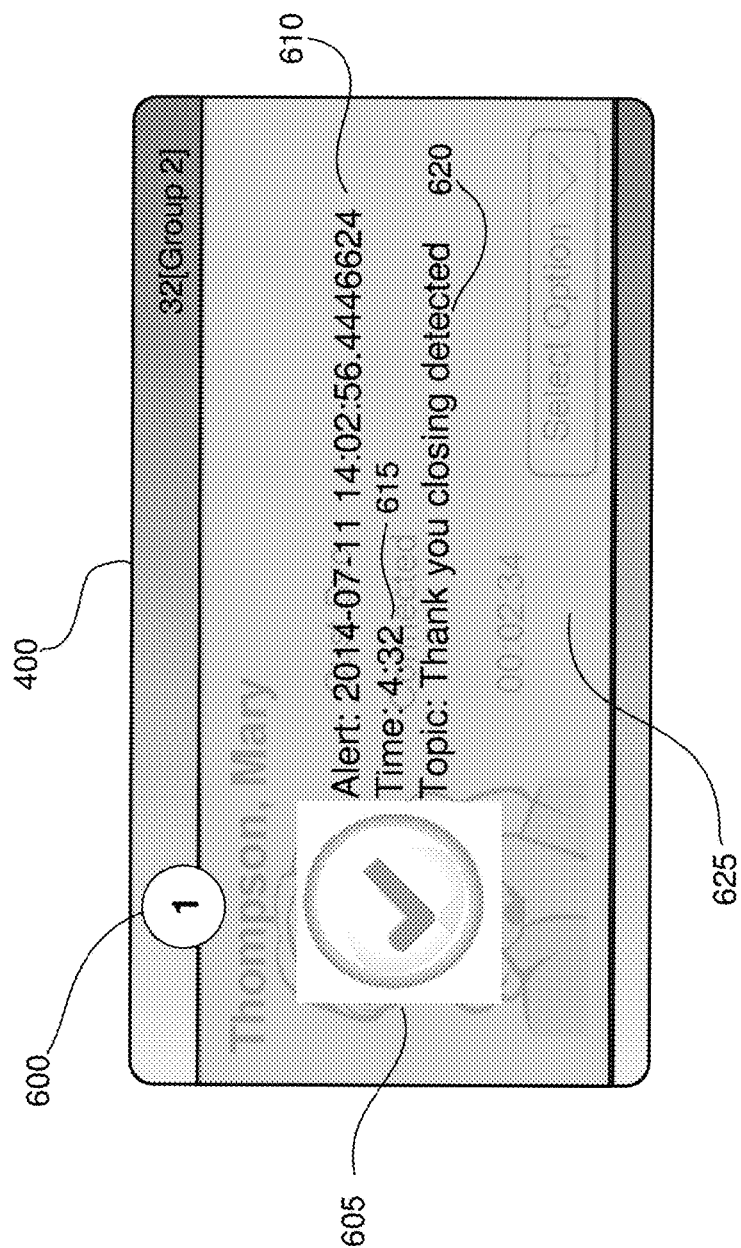
FIGS. 6-7 illustrate embodiments of real-time speech analytics alerts overlaid on an agent icon.

In one embodiment, the RSTA alerts are dynamically overlaid on the grid of agent icons. Specifically, a RTSA alert for a particular agent is overlaid on the corresponding agent icon. One embodiment of a RSTA alert is shown in FIG. 6. In FIG. 6, the agent icon 400 for Mary Thompson is shown. However, overlaid is the RTSA alert 625. In this embodiment, the RTSA alert 625 is partially transparent so that portions of the underlying image may still be seen. In other embodiments, as will be seen, the RTSA alert may be opaque so that the underlying image is not seen.

Each RTSA alert will cause an alert bubble 600 to appear. In this embodiment, the alert bubble is a circle, although in other embodiments other shapes may be used. In some embodiments, just a number may be present. The number in the alert bubble (a.k.a. the "count") represents the cumulative number of alerts for that agent during the current call. In other embodiments, the number may be defined with respect to the current shift, in the last hour, the past week, etc. In this embodiment, it is assumed that the number is based on the current call. Thus, in FIG. 6, this is the first alert reported for the current call involving this agent.

An alert icon 605 is provided, which provides a ready indication of whether the alert reflects a positive or negative condition. Recall that alerts may reflect the detection of a speech condition or the absence of a speech condition. Depending on how the speech condition is identified, the reporting of the condition could be a positive occurrence. For example, agents may be trained to thank the caller at the end of a call, and consequently detecting this speech condition would be viewed as a positive occurrence. In this example, the agent has done so, and consequently a positive icon 605 is shown.

The RTSA alert may also include text that informs the reader on the specifics of the alert. For example, text 610 may be provided that reflects a date, time, and call identifier for the speech condition that was detected. A time 615 into the current call may be indicated. This allows identification of the speech should verification be desired. Further, text 620 may reflect the particular RTSA topic that was detected. Finally, a color background may be used to indicate the particular type of alert, severity of alert, etc. For example, a positive condition may include a green background whereas a negative condition may incorporate a red background. Other colors or visual patterns may be used.

The RTSA alert may appear by fading in over the agent icon for the duration of a display timer, and then may fade out upon the expiration of the timer. The use of a background color and an icon allows the viewer to readily ascertain the relative importance of the alert, even if the supervisor does not read the text and only sees the RTSA alert for a fraction of a second. Further, the alert bubble 600 provides a simple means to review which agents are encountering a large number of alerts. This provides an easy to use mechanism allowing the supervisor to evaluate an alert.

Figure 7:
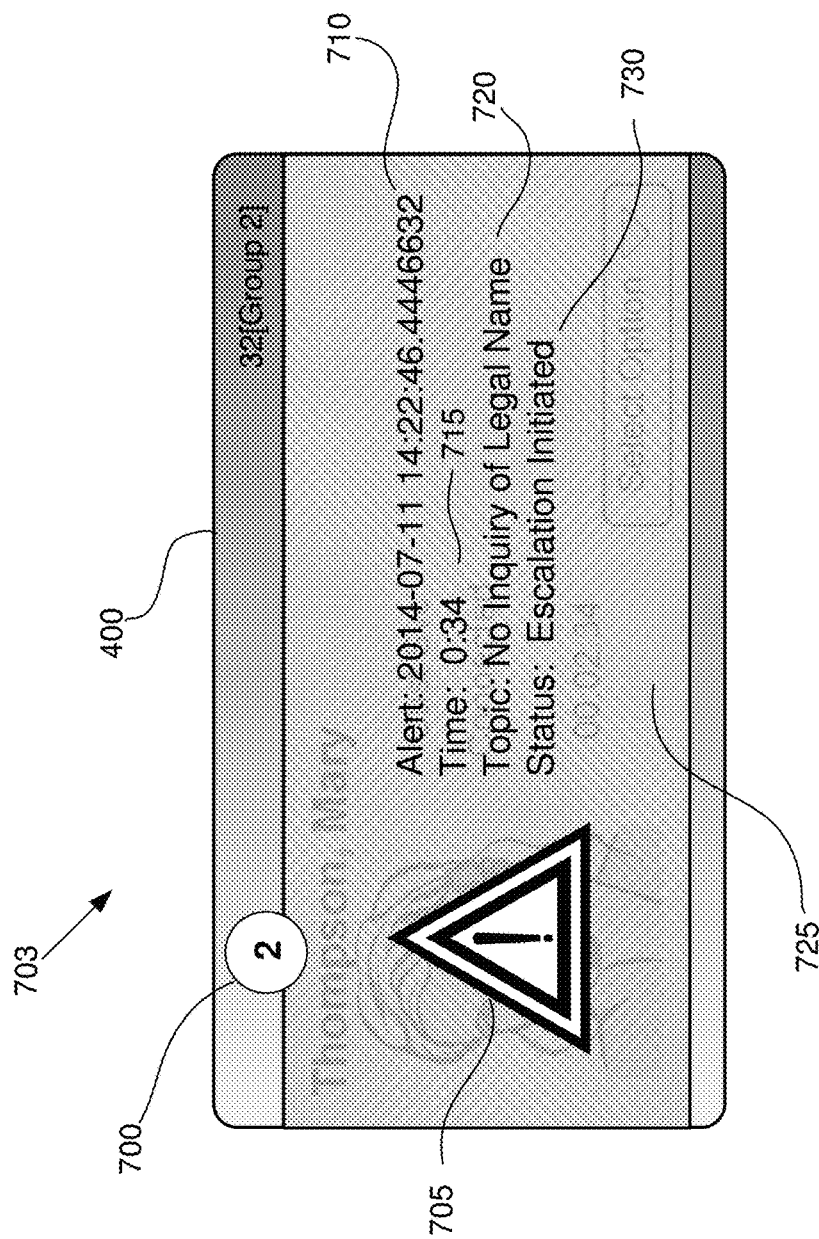

FIG. 7 illustrates another embodiment of a RTSA alert 703. In this example, the same agent icon 400 is involved, though most of it is obscured by the alert. It is assumed that this is the second alert received during this call for the agent. Thus, the alert bubble 700 reflects a "2".

The alert icon 705 in this embodiment is a warning icon, reflecting that a negative speech condition was detected. This may be accompanied by a red background color 725. The alert also includes text that reflects the date, time, and call 710, the time into the call 715, the topic detected 720, and in this case, additional information related to additional actions, namely that an escalation has been initiated 730. This may reflect a notification was sent to another individual regarding the presence of the alert.

Figure 8A:
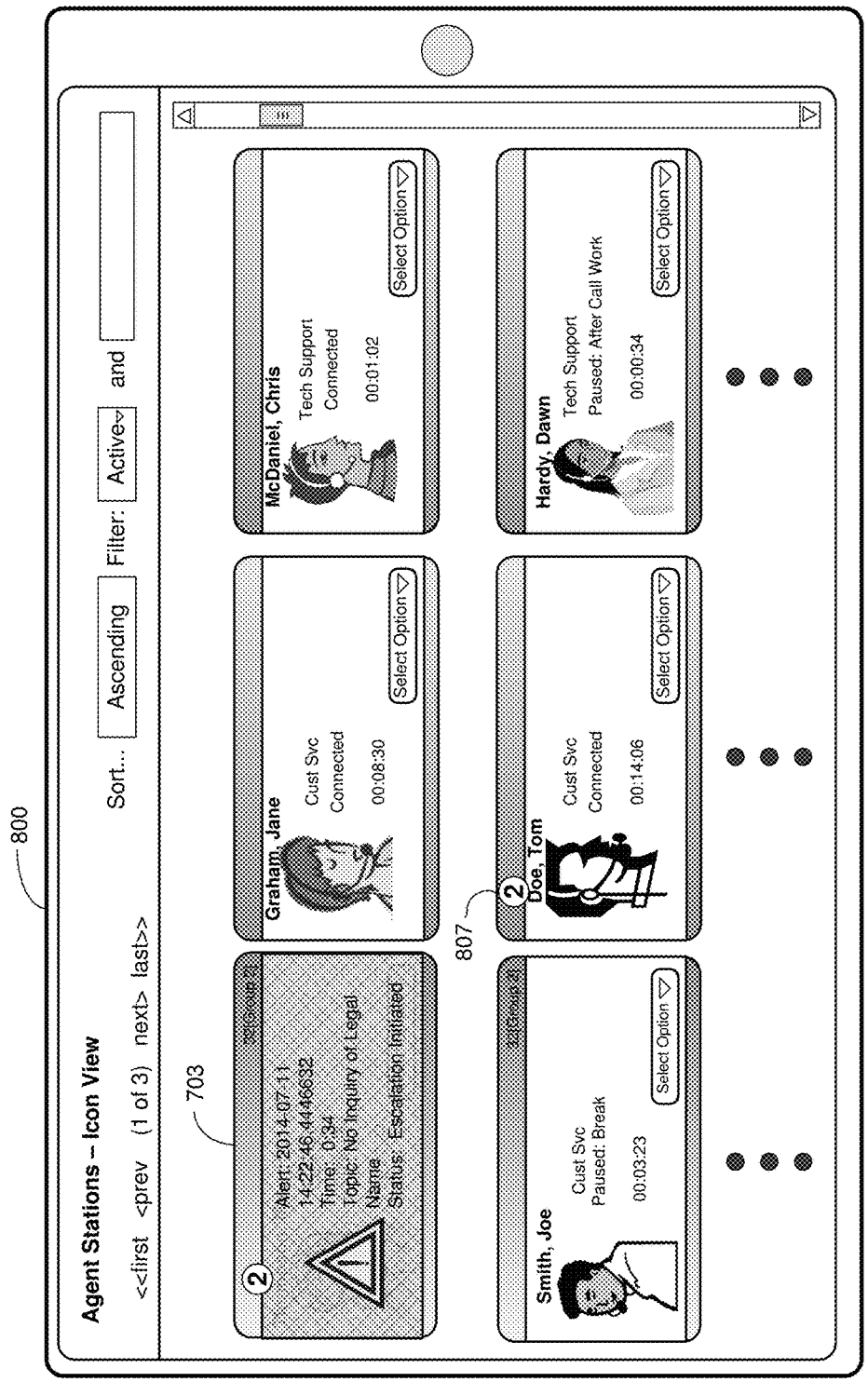

FIG. 8A shows how the RTSA alert 703 from FIG. 7 would appear when presented on a screen comprising a grid of agent icons. In FIG. 8, the screen 800 shows the grid of agent icons, and the RTSA alert 703 is shown overlaid thereon. This would be shown for the duration of the display timer, and then fade away so that the original agent icon would be shown. However, after fading away, the alert bubble would remain indicating the number of alerts having been received for that current call. For example, another agent is shown with another alert bubble 807. If this is defined to reflect the number of alerts during a particular call, then the value is reset (or the alert bubble removed) after the call terminates.

Figure 8B:
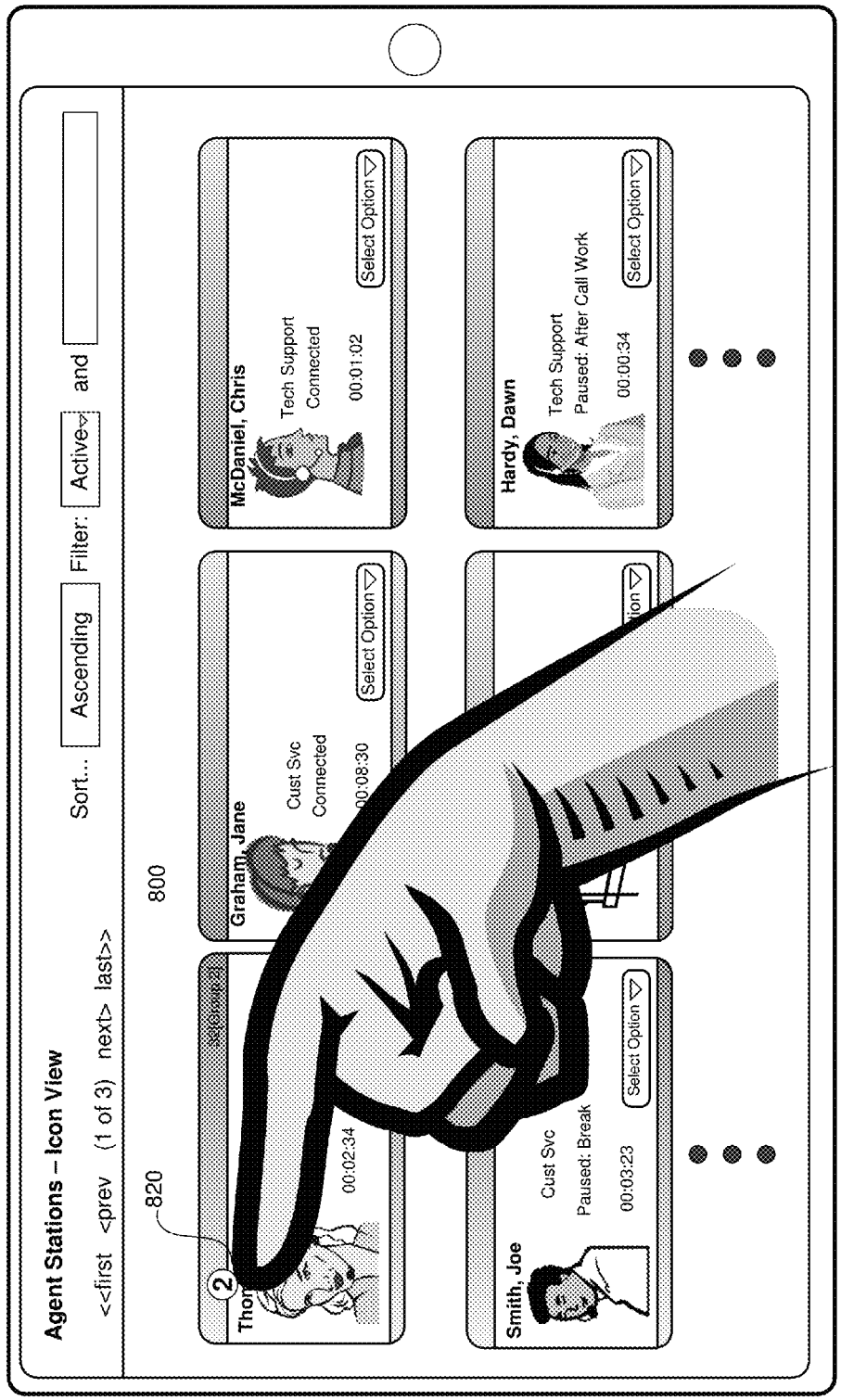

In various embodiments, the viewer may select the alert bubble by selecting the alert bubble icon. Depending on the technology involved, this may involve the user using a mouse to position a cursor over the alert bubble or using some other pointing device. In FIG. 8B, it is assumed that a touch-screen is being used on a tablet, and the user may select the bubble alert by touching it with his finger 820. Selecting the alert bubble will cause a pop-up window 875 to appear as shown in FIG. 8C. This pop-up window 875 includes text associated with the prior alerts. A more detailed view of the pop-up window 875 is shown in FIG. 9

Figure 9:
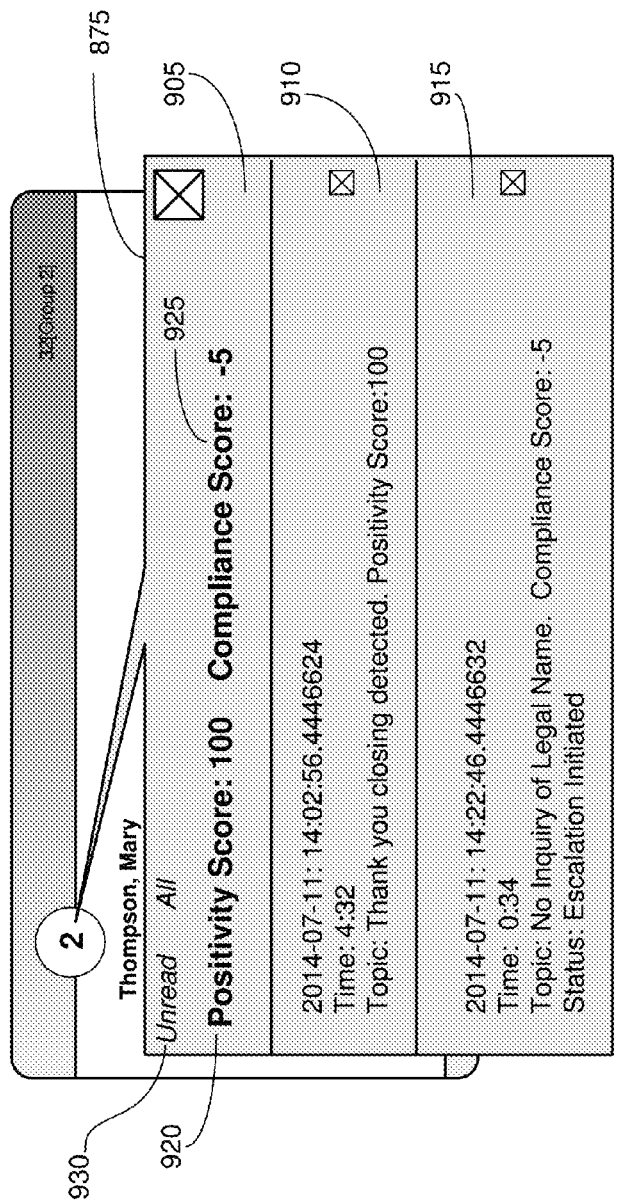
FIG. 9 illustrates an embodiment of further information associated with a real-time speech analytics alert.

Turning to FIG. 9, the pop-up window 875 may include text portions 910, 915 that reflect the text with prior alerts. The agent may choose to read and mark these as having been reviewed. Separate controls may be presented 930 allowing the agent to review all of the alerts for the agent or only those unread. In addition, another portion 905 of the pop-up window includes a positivity score 920 and a compliance score 925. These scores provide a summary of the current standing on the agent's performance relative to customer service (e.g., "positivity") and compliance. These scores are assigned to each detected RTSA topic and allow a weighting of the relative importance of the detected speech conditions. In other embodiments, the scores may be defined for a different category or purpose.

Figure 10A:
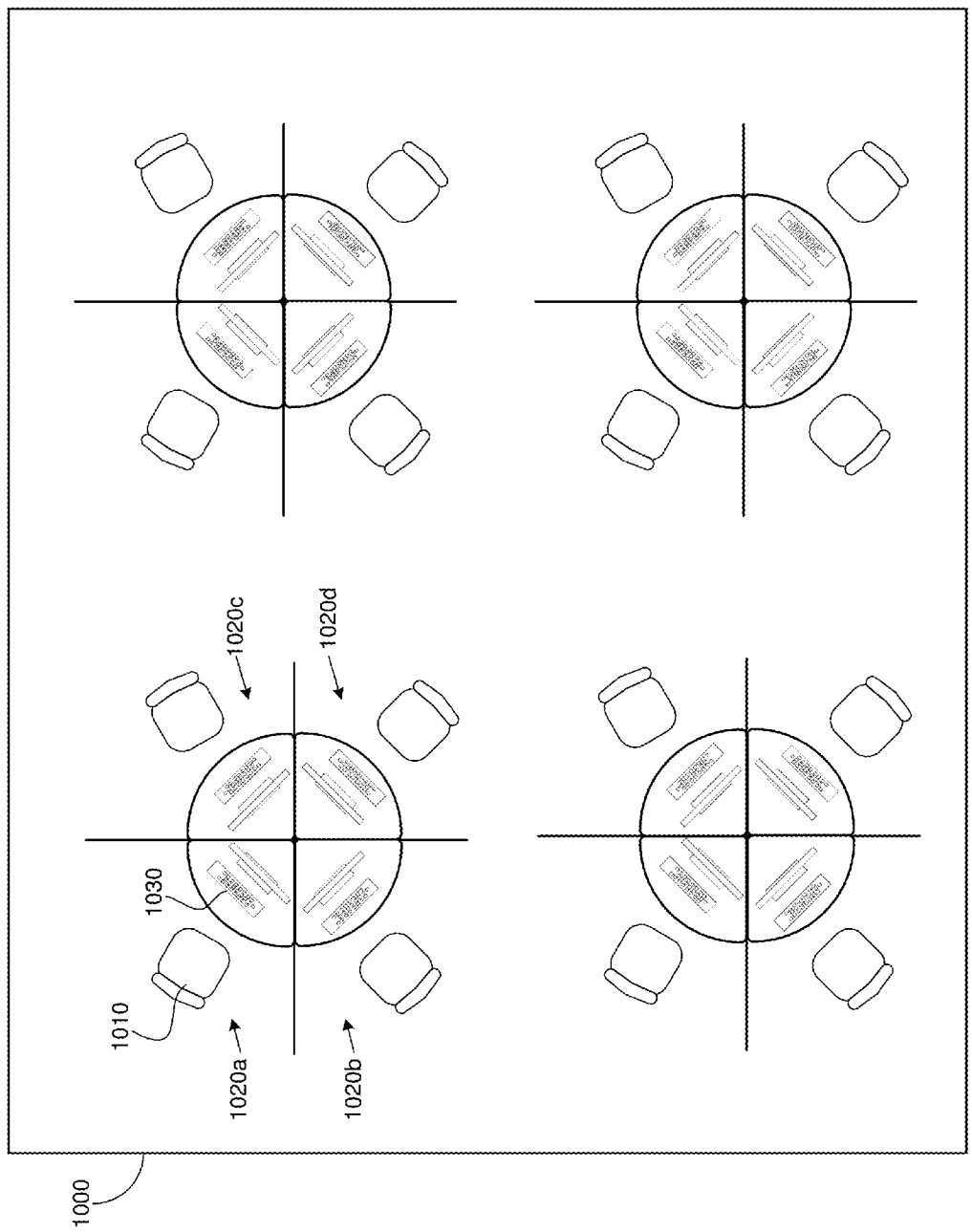
FIGS. 10A-10C illustrate an embodiment of a floor plan map and a real-time speech analytics alert overlaid thereupon.
Figure 10B:
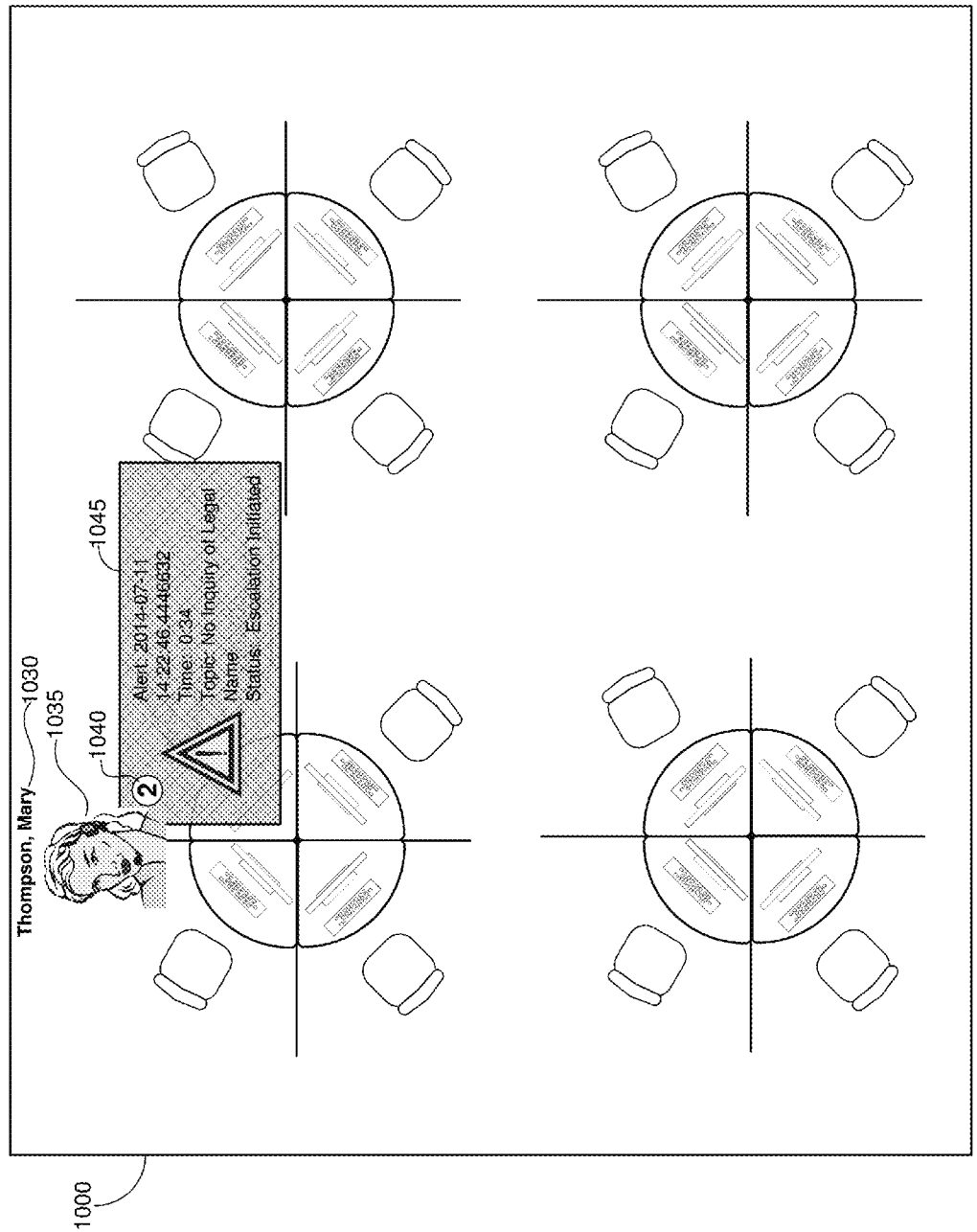
Figure 10C:
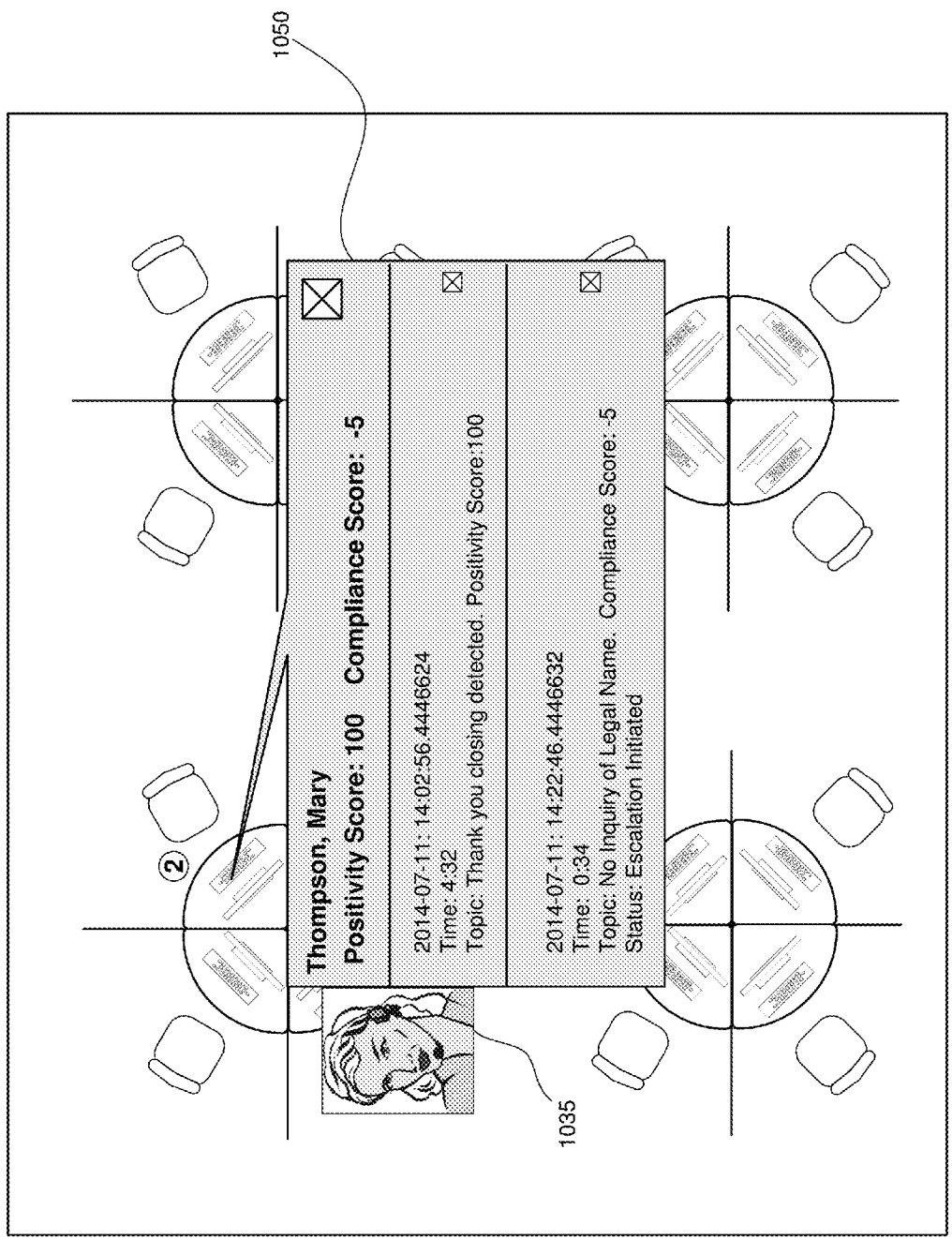

Other Graphical Formats for Alerts—FIGS. 10A-10C

Other graphical formats may be used for displaying a RTSA alert. One such format involves a graphical depiction of an office layout or floor plan. The floor plan represents the locations of the workspaces of the various agents. One such representation is shown in FIG. 10A. In the floor plan layout 1000, a quadrant of workspaces 1020a, 1020b, 1020c, and 1020d are defined. Each workspace has e.g., a chair 1010 and a workstation 1030 used by an agent. The quadrant of workspaces may be in turn replicated as needed. In the floor plan 1000 shown, a total of sixteen agent workspaces are shown.

Each agent may be assigned a workspace location and the supervisor may associate a workspace location on the floor plan with a particular agent. Thus, when a RTSA alert is displayed over a work location, the supervisor can then associate the alert with the agent. One embodiment of a dynamically displayed RTSA alert is shown in FIG. 10B. In this figure, the RTSA alert 1045 is overlaid at the workspace of the agent. The alert bubble 1040 is displayed as well, along with the agent's name 1030 and picture 1035. The positioning of the agent's name and picture facilitates identification of the agent by the supervisor, in addition to placing the RTSA alert over that agent's workspace. This may be useful for some embodiments where agents may share a workspace for different shifts or days during the week. The RTSA alert is temporarily displayed, and will fade out after the display timer expires.

The supervisor can select the workspace to review additional information regarding the alert. This can be accomplished by using a pointing device, as disclosed before. Once the workspace is selected, the alert text box 1050 shown in FIG. 10C may be displayed. This allows the supervisor to read additional details of the latest or other previous alerts. The supervisor can close the alert text box when completed. This allows the supervisor to then view other RTSA alerts or select other workspace locations for investigation.

Tabular Formats for Alerts—FIGS. 11A-11B

The prior embodiments illustrate application of various graphical formats for displaying the overlaid RTSA alerts. It is also possible to use a tabular format for displaying overlaid RTSA alerts. The use of a tabular format operates in concept similar to the graphical format, except that a spreadsheet-like format may be employed. One embodiment is shown in FIG. 11A. In FIG. 11A, the table 1100 comprises various columns with various identifiers. Included is a column 1105 for the agent's name and a column 1110 for the number of current RTSA alerts. This represents the number of current alerts for the call that the agent is currently connected to. In addition, another column 1120 for the number of cumulative RTSA alerts is shown. This represents the number of alerts associated with that agent since the beginning of a time period, such as in the past hour, since the start of their shift, for the week, etc.

In this embodiment, the dynamically displayed RTSA alert comprises an icon 1130 which may be temporarily displayed. This draws attention to the supervisor viewing the table that a RTSA alert has been reported. In other embodiments, additional information may be presented regarding the alert, its severity, etc.

If the supervisor desires to view further information, the supervisor may again use a pointing device, such as a mouse, joystick, or stylus, to select the cell of that agent for which additional information is desired. A touch screen could also be used. Once selected, additional alert information may be presented as shown in FIG. 11B. In FIG. 11B, the alert text window 1160 is presented, which provides the additional information. The supervisor can then close the alert text window 1160 when viewing is completed.

No doubt that one skilled in the art may be able to devise variations on the concepts and technologies disclosed above in light of the present disclosure. There are a variety of graphical formats that can be used for defining the contents of agent icons, how they are arranged, and how RTSA alerts are defined and displayed. For example, other floor plan configurations are readily possible that could be used, including using rows and other workspace cluster formations. With respect to using a tabular-based presentation interface, the tabular arrangement can be displayed as a real-time dashboard and may incorporate or display other information in real-time.

Figure 12:
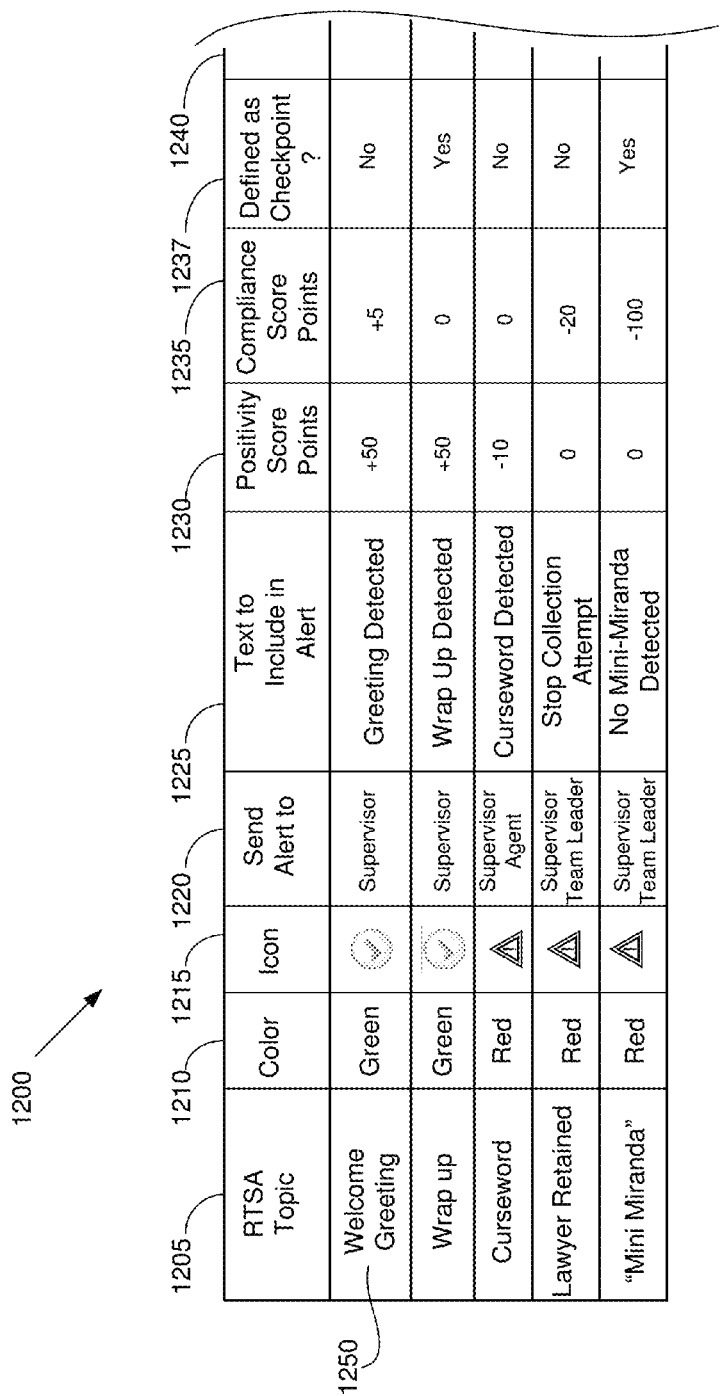
FIG. 12 is an embodiment of one embodiment of an alert and checkpoint mapping data structure used in generating an alert or processing event messages for updating a checkpoint status indicator.

Alert Mapping Table—FIG. 12

FIG. 12 shows one embodiment of an alert mapping table. This data structure may be accessed by the CARM and used to process an event message from the RTSA system in order to generate the appropriate RTSA alert in a human readable form, or update a checkpoint widget. The event message from the RTSA system typically reports the speech conditions, called "topics" in a specific call, involving a particular agent. In various embodiments, it is the CARM that then uses this information to generate the appropriate alert or update the checkpoint widget. Although referenced as a table, other types of data structures are intended to be covered.

Turning to the table 1200 in FIG. 12, a number of columns are presented. The first column is the RTSA Topic column 1205, which functions as an index. Although represented as text, it usually is a numerical value corresponding to a particular speech condition. For example, the "Welcome Greeting" topic (or keyword) refers to the RTSA system detecting the presence of an appropriate greeting by the agent upon answering the call. Upon detecting this RTSA topic, an alert is formatted as defined by the various other characteristics.

The second column 1210 defines a color to be used when displaying the RTSA alert. In the case of the Welcome Greeting 1250 topic, it is a green color. Further, the next column 1215 indicates the appropriate icon to use, which is illustrated as a checkmark. In practice, again, the value in the table would be a numerical value corresponding to that icon by indicating a stored image. There may be a correlation between the icon used and the level of severity associated with the event. There may be a number of different types of alerts which correlated to a "warning" severity level, each of which may have a different number of points associated therewith. Thus, different actions could be defined to occur at different severity levels. Thus, a "warning" severity may correlate to displaying a certain icon and text to an agent or supervisor, whereas a "severe" severity level may entail a different action. Typically, there are a few number of severity levels defined (e.g., typically 5 or less).

The fourth column 1220 indicates to whom the alert should be sent to. In this case, it is sent to the supervisor, according to the configured manner (e.g., using an agent icon grid, tabular format, etc.). Other alerts may result in another message (e.g., a text message) being sent to a team leader or other individual. The fifth column 1225 defines the text that should be displayed with the particular alert. This is in a human readable form, and in the example shown, the text indicates "Greeting Detected".

The next two columns 1230, 1235 represent "positivity score points" and "compliance score points." These represent mechanisms to allocate a weight to the detected speech condition. This allows the supervisor to review a cumulative score that represents how well the agent is performing. The categories and definition of these scores can vary significantly from embodiment to embodiment, but they represent a numerical value associated with certain speech conditions that reflects a current and/or aggregate performance metric of the agent.

The indication of a severity level may also be included, which may be separate from the number of points provided with a detected speech condition. The number of points may reflect a granularity which is not possible, or appropriate, with defining various severity levels. For example, a scale of 1 to 100 allows various points to be allocated to various conditions, and it would not be practical to define 100 different severity levels. Typically, there are a few levels (e.g., five or less) severity levels, which may correlated to certain colors, icons, etc. The score allows a separate and independent approach for measuring speech conditions separate from defining severity levels.

The positivity score may be allocated to speech conditions which represent good behavior. By allocating a negative score, bad behavior can be represented and measured. In one embodiment, these speech conditions can be linked to customer service goals. For example, the alert mapping table 1200 allocates positivity score points for providing a welcome greeting and providing a proper "wrap up" (e.g., thanking the customer and asking if there are any other questions they may assist with). On the other hand, points may be subtracted if the agent states a curse word during the call. Thus, the cumulative number of positivity points can be used to evaluate how well the agent is performing in these aspects.

Similarly, the compliance score points may be allocated on matters that relate to compliance issues. These may be assigned to detecting compliance related speech conditions. For example, the alert mapping table 1200 allocates negative compliance points for two topics. Specifically, −20 points are allocated whenever the "lawyer retained" topic is detected and the agent continues to collect the debt, and −100 points when the "mini-Miranda" speech condition is not detected. The "lawyer retained" topic may be defined as detecting attempts by the agent to continue collecting a debt when the party has informed the agent that they have retained a lawyer. In this case, the agent should cease any attempts to collect a debt, and attempting to do so may be a violation of a regulation. The "mini-Miranda" speech condition reflects that the agent should inform the party that the purpose of the call is to collect a debt. Thus, the "mini-Miranda" should be stated by the agent shortly after the call is answered. Violation of this condition may be a serious compliance violation, and the allocation of −100 points may signify that it is considered a more serious violation than the "lawyer retained" violation. Consequently, the agent's compliance with various regulations may be gauged by examining their net compliance score.

There may be other score types defined, based on the goals desired by the contact center to monitor and evaluate a particular type of agent behavior. For example, a number of RTSA topics could be defined as "up-selling." These topics could detect speech conditions that reflect when the agent is offering the customer additional items to go with a purchase. For example, points could be allocated to the agent for asking the customer if a matching belt is desired to go along with a purchase of shoes. Points could be allocated for asking if the customer would like another item in a different color, etc. A cumulative "up-selling" score could be maintained for measuring an agent's effectiveness in this category. Thus, there may be a variety of score types that may be maintained for an agent.

The alert mapping table also shows a "Defined as Checkpoint" column 1237 which indicates whether the RTSA topic or keyword is defined as a checkpoint. In one embodiment, a binary flag can indicate whether the keyword is defined as a checkpoint. In the embodiment shown in FIG. 12, the "wrap up" and "Mini-Miranda" topics are defined as checkpoints. In other embodiments, there may be a number of checkpoint categories defined. Thus, there could be a set of checkpoints for compliance purposes, another for positivity purposes, etc. Each of the checkpoints may be displayed to the agent or to a supervisor using a specific graphical user interface element in the form of a checkpoint widget. In such embodiments, the checkpoint column 1237 may have one of several identifiers indicated, as opposed to a binary flag. Or, in other embodiments, there could be different checkpoint column types indicated. Those skilled in the art will recognize that various data structures and methods could be used to indicate whether the keyword correlates to a checkpoint.

Other columns 1240 may be defined in the alert mapping table. These can provide other characteristics associated with how the RTSA alert could be provided. Particularly urgent or significant speech conditions that are detected may be associated with a providing a sound in addition to presenting an icon. Or, the RTSA alert could result in a supplemental message delivered to the agent's workstation, an immediate separate text message sent to a supervisor, etc. Other graphical user interface techniques for drawing attention could be used—for example, an RTSA alert could be mapped to a blinking or flashing icon. In other embodiments, a set of points could be deposited into a virtual account maintained for the agent, which is then used by the contact center management for incentivizing agents. These points could be used to give priority to the agent for future work scheduling decisions, redeeming awards, gifts, time off, etc. For example, the agent with the best compliance score could be given priority for requesting the day off for the next upcoming holiday. Thus, there may be a variety of additional characteristics defined for how a topic is mapped to an alert indication.

Further, other data structures and names than above disclosed table may be used. Thus, the phrase "alert mapping table" refers to any form of a data structure and/or process that maps a RTSA message from a RTSA system into a form designed for human review, whether it may be a list, linked tables, a database, rule process, etc. The "alert mapping table" could also be referred to as a "checkpoint and alert data structure", "checkpoint mapping table", or a similar name, to reflect that the structure may also contain information related to processing events related to checkpoints.

Checkpoint Widgets—FIGS. 13A-13B

As discussed above, an event message received from an RTSA system may be processed so as to result in dynamically displaying an alert on a supervisor's processing device. It is also possible to process event messages from an RTSA system to provide information regarding the progress of the call with respect to a set of checkpoints. A checkpoint is a point during a voice call that is associated with the expected or possible occurrence of a speech event. This could be analogized as indicating the occurrence of certain expected benchmark during a call. Typically, there are a chronological series of checkpoints for a call associated with a particular campaign. Frequently, different campaigns will have different checkpoints, which reflect the expected different flow of the conversations involving the agents. For example, a debt collection campaign call will typically involve a point in the call where the agent asks if the remote party can make a payment. In contrast, a non-profit campaign call soliciting donations will typically involve a point in the call where the agent asks whether the remote party wishes to make a donation. Making a payment is different from making a donation, and these could be defined as different checkpoints for these different campaigns. Thus, the RTSA system would likely be configured to recognize different keywords for these different campaigns.

It is even possible for a given call of a particular campaign to have different types of checkpoints identified. Thus, a series of checkpoints could be defined to ensure that the agent is courteous. There could be a "welcome" and "closing" checkpoint for each call, and then a separately defined set of compliance checkpoints during the call. Thus, there is great flexibility in defining which keywords would be considered to be a checkpoint.

To convey the occurrence of a checkpoint to a person, it is useful to provide a common collection of visual elements displayed on a computer screen, which may comprise text, icons, and symbols that represent the set of chronological checkpoints associated with the call. These elements may indicate whether the checkpoint actually occurred. This collection of visual elements indicating which checkpoints have occurred is referred to herein as a "widget." Specifically, because the widget provides information about checkpoints during a call, it may be referred to more specifically as a "checkpoint widget." For purposes of brevity, it will be simply referred to as a "widget."

The display of a widget may be provided on the workstation of an agent or a supervisor, which provides the viewer with a quick, easy-to-comprehend, indicator of the status of the various checkpoints during a call. Each checkpoint is associated with a checkpoint indicator on the widget, and each checkpoint indicator may also be accompanied by text that informs the reader of the nature of the checkpoint. The checkpoint indicator may also referred to as a "checkpoint status indicator" because the indicator usually indicates a status of the corresponding checkpoint during a particular call. The text associated with the checkpoint indicator may be referred to as the "checkpoint indicator text." Returning to the above example of a debt collection call, there may be a checkpoint indicator reflecting whether the agent has asked for payment. The checkpoint indicator text could be "Ask for Payment." Similarly, for the non-profit solicitation call referred to above, the checkpoint indicator text could be "Ask for Donation." The text of the checkpoint indicator is defined by the contact center administrator prior to processing of calls and can be any text which conveys the purpose of the checkpoint.

One instance of a widget is shown in FIG. 13A. This widget 1300 is associated with a debt-collection call campaign. As evident, unique widgets could be defined for a variety of campaigns, such as solicitation calls, surveys, customer service, etc. The widget 1300 is characterized by a plurality of checkpoint indicators 1310a-1310e. Each checkpoint indicator is associated with a checkpoint, which is a point during a voice call associated with the expected or possible occurrence of a speech event. The checkpoint indicators 1310a-1310e are arranged in a chronological (i.e., the expected order of occurrence) by being overlaid onto time-line 1305. Based on convention, movement from left to right on the time-line 1305 reflects the passage of time. Although the checkpoint indicators 1310a-1310e are shown equidistant on the time line, this does not necessarily mean that the occurrence of the checkpoints themselves are equidistant over time. Typically, the fact that a checkpoint indicator 1310a is positioned to the left of another checkpoint indicator 1310b indicates that it is expected to occur before the other checkpoint indicator 1310b. Thus, the instance of the widget 1300 shown in FIG. 13A has five checkpoint indicators, correlating to five expected instances of speech that are expected to be detected.

Because the widget may be updated over time (e.g., as the call progresses and checkpoints are detected), the depiction of the widget 1300 in FIG. 13A is necessarily a snapshot in time as the widget would be displayed over time. Thus, this depiction is referred to as an instance of the widget. The widget in FIG. 13A is the initial state of the widget, where all the checkpoint indicators are set to their initial state, representing that the checkpoint has not been detected.

In this embodiment, each checkpoint indicator is associated with checkpoint indicator text 1315-1319. The first text 1315 is "Recording Disclaimer." This checkpoint indicator text is typically defined by an administrator prior to processing of calls. The text is merely a short label that reflects the speech expected with the checkpoint in order to inform the user of the nature of the checkpoint represented. In this example involving debt-collection campaign calls, the calls are recorded and the agent is expected to indicate to the remote party that the call is being recorded. This "recording disclaimer" text reflects that the agent is expected to provide some sort of disclaimer of the call recording to the remote party.

Similarly, the "Mini-Miranda" text 1316 associated with the checkpoint indicator 1310*b* reflects a requirement for debt-collection calls that the agent inform the remote party that this is a debt collection call. This disclaimer is referred to as a "Mini-Miranda" in the debt-collection industry. Thus, the checkpoint indicator 1310*b* reflects whether the agent has provided an appropriate mini-Miranda statement to the remote party.

Similarly, the "Verify Contact" text 1317 associated with the checkpoint indicator 1310*c* reflects the requirement for the agent to verify that they are speaking with the debtor, and not with some other member of the household. The "Ask for Payment" text 1318 is associated with a separate checkpoint indicator 1310*d*, and reflects the requirement that the agent asks the debtor to make a payment. Thus, this checkpoint indicator 1310*d* is encountered when the agent has asked the debtor for payment. Finally, the "Thank Customer" text 1319 is associated with the last checkpoint indicator 1310*e*, which reflects that the agent should thank the remote party at the end of the call.

It can be appreciated that the checkpoint indicators are shown in a chronological order that reflects the order typically encountered in most calls. The recording disclaimer must be provided at the beginning of the call, and the mini-Miranda should be provided before any substantive discussion of the debt. Similarly, the remote party should be verified before any substantive discussion of the debt. At some point after these three checkpoint indicators, the agent should ask for payment of the debt, and it is typically at the end of the call that the agent thanks the customer. In other embodiments, it is possible that there are different possibilities as to when the checkpoints occur on a given call. This depends on how the checkpoints are defined, type of call, etc. Whether this is possible may impact the choice of format of the widget, as will be seen.

FIG. 13B shows the same widget, but a different instance in time. This instance of the widget 1350 depicts the status of the checkpoints during the call. In this case, the first checkpoint indicator 1370 may be depicted with a different color (e.g., green) to reflect a different status. In other embodiments, any type of distinguishing visual characteristic could be used to reflect a change in status, including showing a different color, line type or thickness, shading, text font, embedding a different symbol, blinking or flashing a visual element, etc. Whereas in FIG. 13A, checkpoint indicator 1310*a* is a circle with white filling and a dot in the center, checkpoint indicator 1370 has a circle with a green filling and a dot in the center (though the accompanying figure is in black and white). This reflects that the appropriate speech was detected and reported by the RTSA system. In other embodiments, a small square or other shape in the center of the circle could be used to reflect a change in status.

Further, the thickened portion 1355 of the timeline reflects that this checkpoint was in the past. Further, the second checkpoint indicator 1372 is overlaid with an "X", perhaps using a red color. This reflects that this checkpoint was not detected. In other words, this widget reflects that the agent did not properly provide the "mini-Miranda" statement to the remote party on this call. The placement of an "X" on the checkpoint indicator may not be determined until the next checkpoint is detected. Next, the third checkpoint indicator 1374 occurs. Based on the text 1317, this checkpoint reflects whether the agent has verified the remote party's name. Since this checkpoint indicator has been modified, the checkpoint has also been detected.

At this point in time, the widget 1350 indicates that the next checkpoint indicator is associated with the agent asking for payment. The thin thickness of line 1360 indicates that the call has not yet progressed to this point of the call. In other embodiments, a marker may be shown associated with the current expected checkpoint or the last detected checkpoint.

It is possible that the agent may first confirm the contact's name and once confirmed, then provide the person with the mini-Miranda statement. If so, then the second checkpoint indicator 1372 may be changed so that the "X" is removed, and instead a green circle indicator may be shown. This widget format is well suited when there is a fixed and certain chronological sequence of checkpoints expected during the call. If the checkpoints occur in a non-predictable order, then other widget formats may be used, or the indicator may not be marked with an "X".

The widget shown in FIG. 13A-13B illustrates that a number of checkpoints can be expected during the call. The widget indicates in real-time which checkpoints have or have not occurred as the call progresses. This provides an easy-to-comprehend status of the call, allowing an agent or supervisor to quickly view and understand how the call is progressing. While in theory this could provide some of the same information as the RTSA alerts previously discussed, the widget provides a quicker and easier to use format indicating how an agent is doing on a call. Specifically, there may be no need to select a view of the history of the alerts. Further, the RTSA alerts reflect additional information about keywords which are not necessary defined as checkpoints, which requires the user to manually filter out those RTSA alerts which are not defined as checkpoints. In addition, many RTSA alerts may not be appropriate to define as a checkpoint. Finally, requiring the agent to view RTSA alerts in real time may be distracting to the agent.

Although not shown in FIG. 13A-13B, each checkpoint indicator text could also include, or have displayed adjacent to it, information regarding the corresponding points (e.g., a score) associated with successfully detecting the checkpoint (or which could be deducted if not detected). For example, FIG. 13B could indicate that 10 points are allocated when properly providing the disclaimer, 20 points are provided for properly providing the mini-Miranda statement, etc. A real-time point counter could be also displayed, which provides the agent with a real-time quantitative indication of how well they are conforming to the contact center policies and regulations based on the occurrences of checkpoints. This can serve to motivate the agent to improve their performance.

The determination of whether the status of a particular checkpoint should be marked (e.g., as checkpoint indicator 1372) as to indicate whether the checkpoint has not yet occurred, has occurred, or was skipped, may be associated with further information maintained in conjunction with the checkpoint that is referred to as "checkpoint relativity information" ("CRI"). The CRI provides information that specifies when a first checkpoint should occur (if at all) relative to other checkpoints, in order to determine if that checkpoint was omitted. In other words, the CRI provides information for determining a context. For example, the agent may be expected to verify the identity of the person answering the call, which is the "Verify Contact" checkpoint, and may also be expected to provide the mini-Miranda statement, which is the "mini-Miranda" checkpoint. In some embodiments the mini-Miranda must occur before verifying the contact, in other embodiments, the order may not matter, as long as both of these occur before the agent discusses the debt or asks for payment. Further, both the "mini-Miranda" checkpoint and "Verifying Contact" checkpoints should occur after the agent provides the recording disclaimer. In order to know whether the agent omitted providing the speech corresponding to a particular checkpoint, it is necessary to know when that checkpoint is expected to occur relative to other checkpoints. In summary, it may not be known that a checkpoint was skipped until a subsequent checkpoint is detected.

In this example, the "Recording Disclaimer" must be the first checkpoint encountered. If it is provided after any other checkpoint, then the disclaimer is not effective. Next, the "mini-Miranda" or "Verify Contact" checkpoint should occur, perhaps in either order, or with a specific order. However, because the fourth checkpoint reflects the agent asking for payment, it should always occur after both the "Verify Contact" and the "mini-Miranda" checkpoints occur. If the "Ask for Payment" checkpoint occurs before both the "mini-Miranda" or "Verify Contact" checkpoints, then a checkpoint has been skipped. Finally, the "Thank Customer" checkpoint should always be the last checkpoint.

How the CRI is defined for the checkpoints may impact how these checkpoints are indicated on the widget. If the "Recording Disclaimer" is defined to be first checkpoint, then detecting any other checkpoint first means that the "Recording Disclaimer" was not properly provided, and then that checkpoint indicator can then be marked as not occurring or having been skipped.

However, in regard to the "mini-Miranda" and "Verify Contact" checkpoints, these can occur in either order, so that detecting one does not necessarily mean the other has been skipped. However, if the missing checkpoint is not provided by the time before the "Ask for Payment" checkpoint has been detected, then the agent has failed to provide the requisite speech and the checkpoint was skipped. Thus, it is evident that the CRI is necessary in order to know how and when to properly mark the checkpoint indicators on the widget as having not been detected (yet) or not having been provided at all.

The CRI may take various forms, and may indicate for example, whether a checkpoint must be the first, second, third, etc. checkpoint detected. The CRI may indicate whether a first checkpoint must occur before or after another checkpoint or set of checkpoints. The logic and means by which the appropriate relationship among the checkpoints can be defined may vary according to embodiments. Further CRI may be stored in some manner in the alert table of FIG. 12 detailing the CRI for each of the checkpoints or using a separate data structure. However stored, the CRI allows a greater degree of control in determining how to ascertain a missing checkpoint or process an out-of-order checkpoint during a call.

It is possible to further indicate on the widget, or in a separate portion of the window, information about the CRI. This could take the form of a symbol which indicates whether the checkpoint must occur first, or must be preceded by certain other checkpoints. This can be graphically illustrated using various diagrammatic structures that convey a required relative order.

In addition to marking a checkpoint as not being properly detected in the above circumstance, other actions may occur when a checkpoint has been determined to have been skipped. It is possible to display a pop-up window to the agent providing compliance information, generate a report message, transfer a call, join another party to the call, initiate a message over a web-based application programming interface, write data to a log, etc. This allows tracking, reporting, or other actions to occur in response to determining a checkpoint was overlooked by the agent.

Figure 14A:
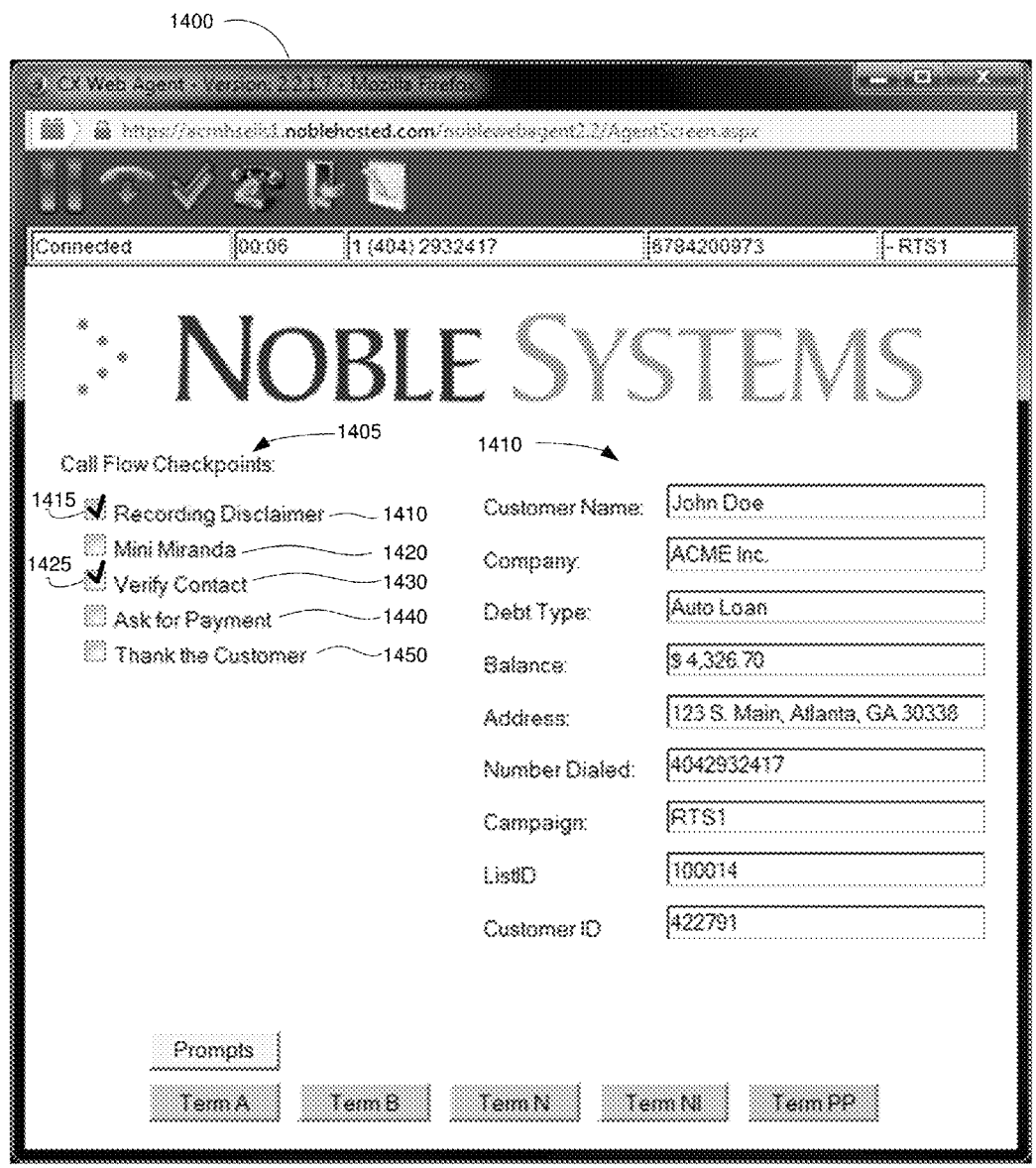
Figure 14B:
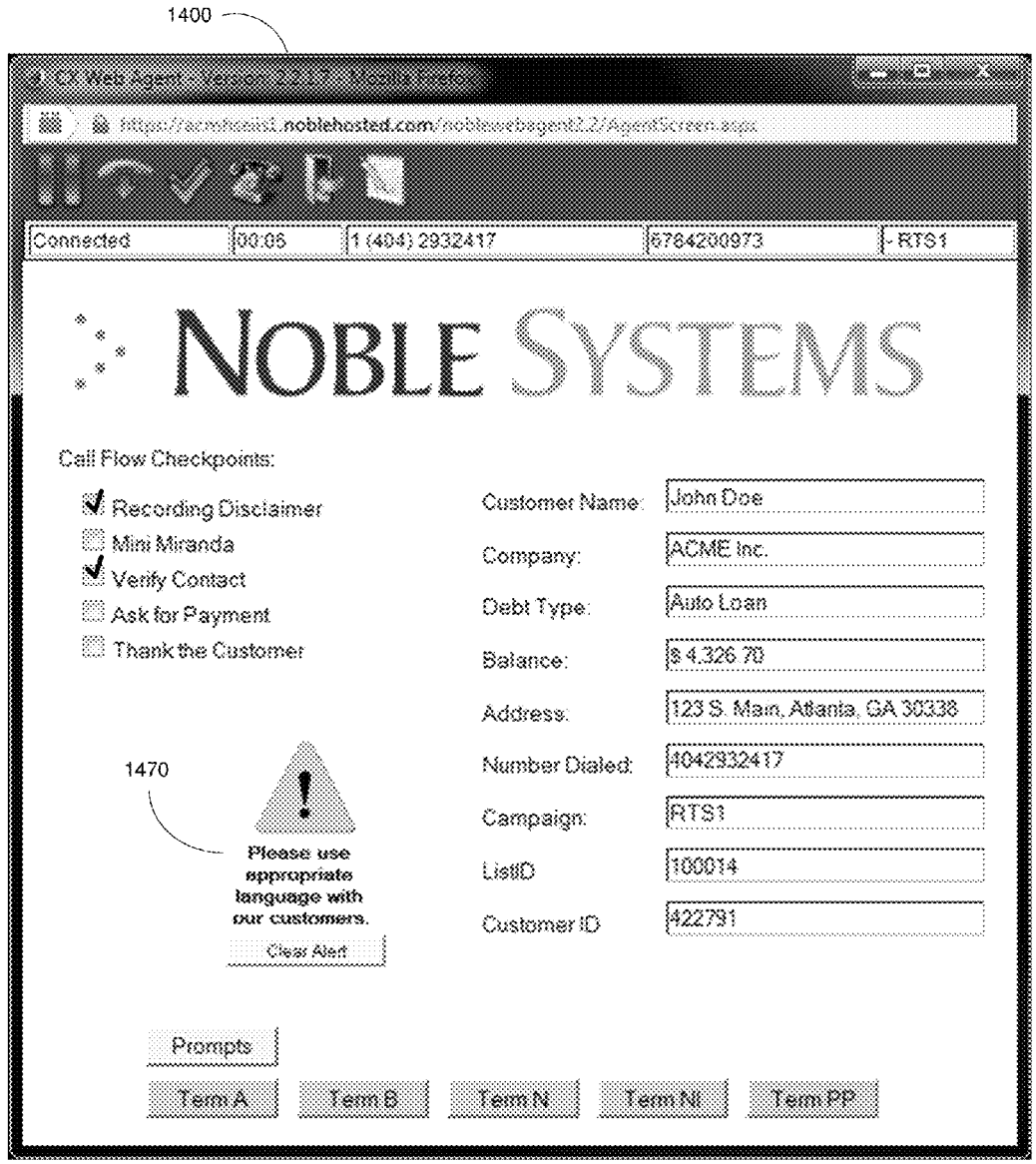

Other Widget Formats—FIGS. 14A-14B

Turing to FIG. 14A, another format of a checkpoint widget is shown. As can be appreciated, one skilled in the art could develop a number of different widget formats in light of the present specification to graphically illustrate the progress and status of various checkpoints during a call. In this embodiment, a screen shot 1400 is shown that may be presented to an agent during a call. The screen shot may be presented to the agent on a workstation comprising a computer, and may involve using a number of various technologies, including as a web page, thin-client application on the workstation, or an application executing on the workstation.

A first section 1410 may include account information of the person the agent is communicating with. This may provide account information, such as the remote party's name, account type, balance due, address, etc. Also shown is another screen section 1405 that comprises the widget with checkpoints. In this embodiment, the checkpoints 1410, 1420, 1430, 1440, 1450 are arranged as a series of checkboxes along with text in a list format. There is an implied time-line reflecting the passage of time in a downward manner (e.g., the first checkpoint associated with the first line is expected to occur before the second checkpoint in the second line, etc.).

The first checkpoint checkbox 1415 is shown as checked, denoting that it has occurred. That is, the recording disclaimer provided by the agent was detected and reported by the RTSA system. The second checkpoint 1420 does not show the checkpoint checked, and this reflects that the mini-Miranda statement was not detected as being provided by the agent. The third checkpoint 1430 has its corresponding checkbox 1425 shown as checked, which reflects that the agent has verified the contact (e.g., verified the name of the person contacted). The fourth checkpoint 1440 and the fifth checkpoint 1450 have not been reported as being detected.

If the agent were to provide the mini-Miranda, then the second checkpoint checkbox would be then checked. This particular widget format may be more suited to calls in which the chronological order of checkpoints is not as predictable as it could be. Furthermore, it is also possible to also indicate for each checkpoint, the number of points each checkpoint may contribute to a total score associated with the call. It is also possible to define the CRI so that it can be easily determined if a checkpoint was skipped during a call, and then somehow signify this on the checkbox (such as displaying an "X").

The widgets illustrated in FIGS. 13A, 13B, and 14A illustrate checkpoints that are normally expected to occur on a call. It is also possible to use a widget to depict the occurrence of a checkpoint that is unexpected during a call. These may include "undesirable" events detected by the RTSA system, which reflect the occurrence of undesirable speech. This may include asking for inappropriate information, providing a discourteous response, or using inappropriate language. It is possible to depict such checkpoints in a transient manner, such as shown in FIG. 14B. In other embodiments, the checkpoint could be added to the widget after it is detected, potentially using a different font, size, or color, to indicate that the checkpoint indicator was added during the call.

Turning to FIG. 14B, the same screen shot 1400 is shown but with an added icon and text 1470. This comprises a warning symbol and text that reflects the speech condition that was detected for this checkpoint. This allows feedback to the agent to reinforce speech that is not desired for whatever reason. In this embodiment, the icon and text 1470 remains displayed until the agent acknowledges the alert. Further, the icon and text 1470 are only displayed once the checkpoint has been detected. In other embodiments, the alert could be displayed for a predefined time period. In other embodiments, the information may be logged into a file recording the agent's checkpoints, or a notification message could be sent to the agent's supervisor or team leader. The functional operation of this type of checkpoint begins to become very similar to the operation of an alert.

Figure 14C:
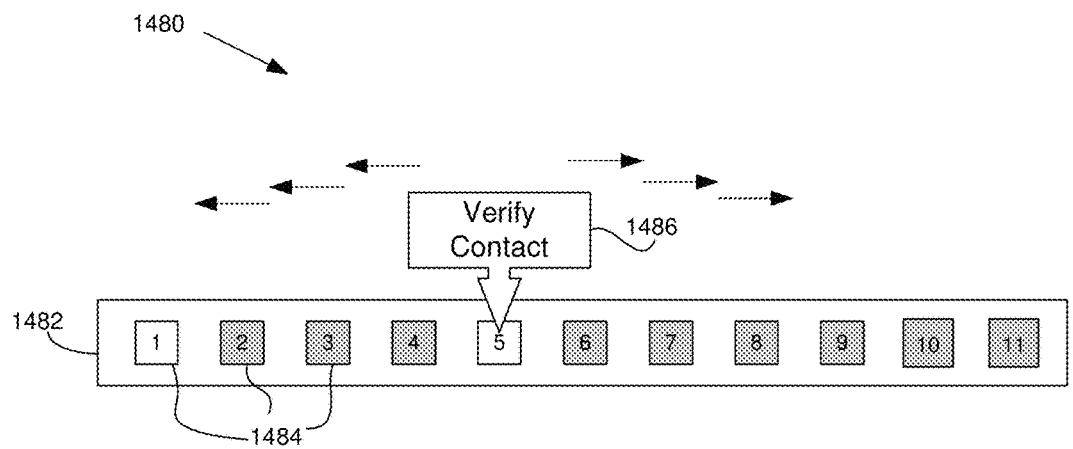

FIG. 14C illustrates another embodiment of a checkpoint widget. This embodiment may be advantageous if there are a number of checkpoints, such that including the checkpoint indicator text for each checkpoint indicator would be impractical. This widget format does not normally display the checkpoint indicator text on each indicator. Rather, a sliding viewing tool can be manipulated by the user to see the text on any one selected checkpoint. Turning to FIG. 14C, this widget 1480 comprises a progress bar 1482 which encloses a series of checkpoint boxes 1484. Each checkpoint box contains a number, and the order represents the typical occurrence of the checkpoints during a call. As a checkpoint is detected, the corresponding numbered checkpoint box is distinguished in some manner. In this embodiment, the checkpoint box is grayed-out or colored if the checkpoint was detected. Thus, it is readily apparent that checkpoint box #1 and checkpoint box #5 have not been grayed-out, indicating that the checkpoints have not been detected.

A sliding viewing tool 1486 (or simply "slider") can be manipulated by the user using a mouse and moved sideways. As the slider moves, it displays the checkpoint indicator text associated with the corresponding checkpoint box. For example, in FIG. 14C the slider 1486 is positioned over checkpoint box #5 and the corresponding checkpoint indicator text is "Verify Contact." If the user desires to see the checkpoint indicator text for checkpoint indicator #1 (or for any other one), then the user can use a pointer, mouse, or other device to select and move the slider to the appropriate contact indicator where the checkpoint indicator text will appear.

Although FIGS. 14A-14C illustrate various types of checkpoint widgets, no doubt other variations can be defined, which indicate which checkpoints have been encountered during a particular call. Thus, the embodiments disclosed herein are not intended to be exhaustive, but merely illustrative of the different types of widgets that can be presented.

Configuring Events as Checkpoints for Widgets

Prior to processing calls and indicating their current status, it is necessary to define the speech events are to be detected and reported by the RTSA system for a given campaign. These events may be then processed by the CARM to generate the appropriate modifications to the widget being displayed. As indicated previously, it is not necessary that every reported speech event corresponds to a checkpoint. Many reported events are used to score the agent's performance, present an alert, determine a context, or otherwise measure the agent's compliance, but are not necessarily defined as a checkpoint. The definition of which events are defined as checkpoints is based on various business and operational factors. For example, a contact center operator may encourage agents to provide a friendly welcome greeting when the remote party answers the call. This greeting may be, e.g., a phrase "good morning, my name is . . . " The contact center operator may define "good morning" as a keyword or topic that is to be detected and reported. The agent may even receive points going towards their compliance or performance scores. However, the agent's failure to provide such a greeting may not be deemed a serious violation and this keyword may not be defined as a checkpoint, though it is defined as an alert. Consequently, even though this keyword may be reported as an event and scored, it does not necessarily appear on the widget because it is not defined as a checkpoint.

Figure 15:
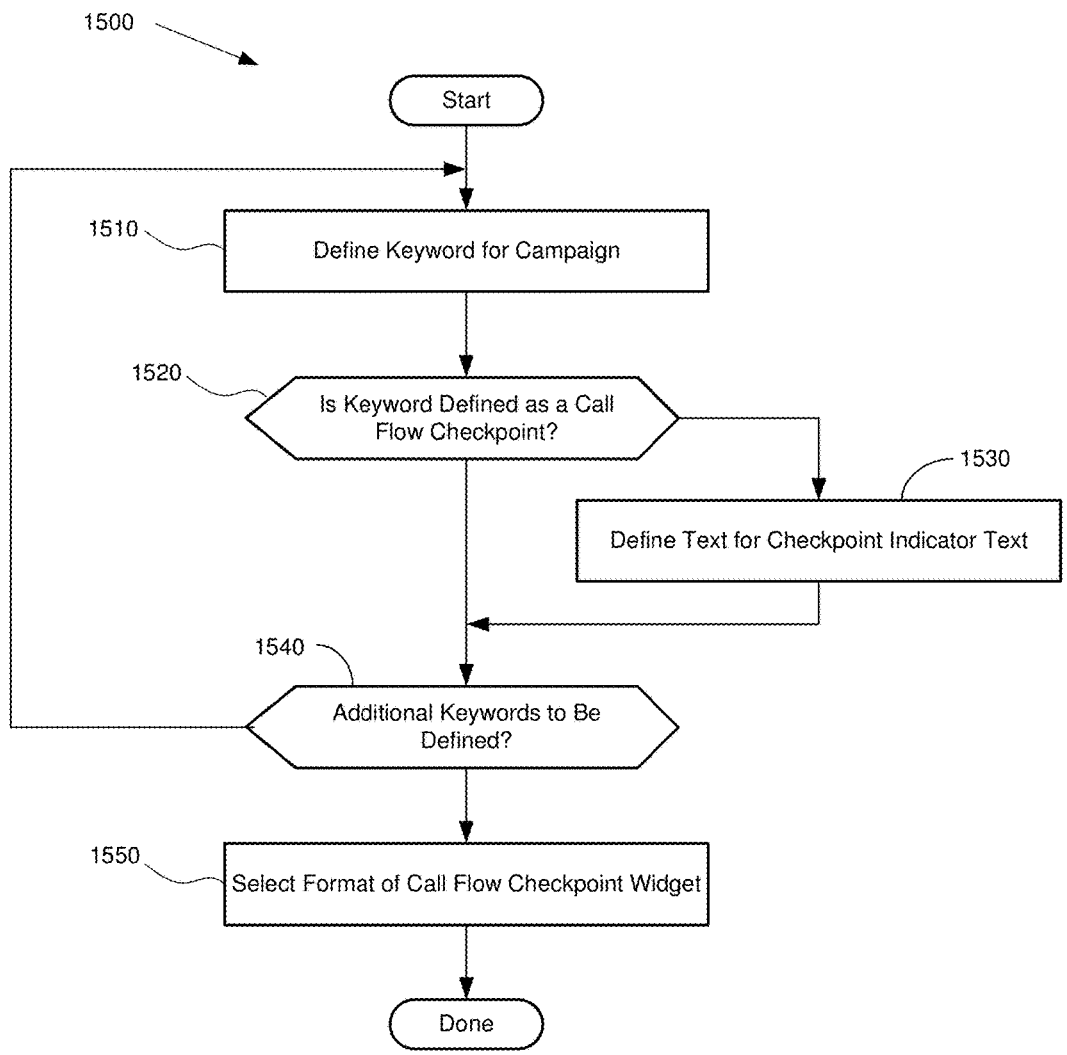
FIG. 15 illustrates one embodiment of a process flow for associated specific keywords as checkpoints.

FIG. 15 illustrates a process flow 1500 that illustrates how checkpoints are defined. The process begins with defining the keywords that are to be reported by the RTSA system in operation 1510. Typically, the keywords include one or more words (e.g., phrases) that are defined in a context, which may include who (e.g., agent or remote party) is expected to speak the keyword, when the keyword is expected to occur (e.g., a time period at the beginning of the call or in conjunction with another keyword), etc. During this process, the user (usually the supervisor or call center administrator) will indicate whether a keyword is to be considered as a checkpoint in operation 1520. It is possible for an event message to generate an alert, alter the checkpoint indicator status, perform both, or do neither. If the keyword is to be defined as a checkpoint, then the user provides the checkpoint indicator text in operation 1530, which is to be included when displaying the widget. If the keyword is not defined as a checkpoint, then the process flow continues where a determination is made whether there are additional keywords to be defined in operation 1540. If so, the process repeats until all the appropriate keywords have been defined.

At some point during the process, the user may also define one of several formats that are to be used for the widget. As one skilled in the art would appreciate in light of the present specification, there are various graphical formats that can be used to construct the widget. A system may provide a single default widget format or may allow the user to select which of several formats to use. The user may select the format in operation 1550, if such an option is provided.

Figure 16:
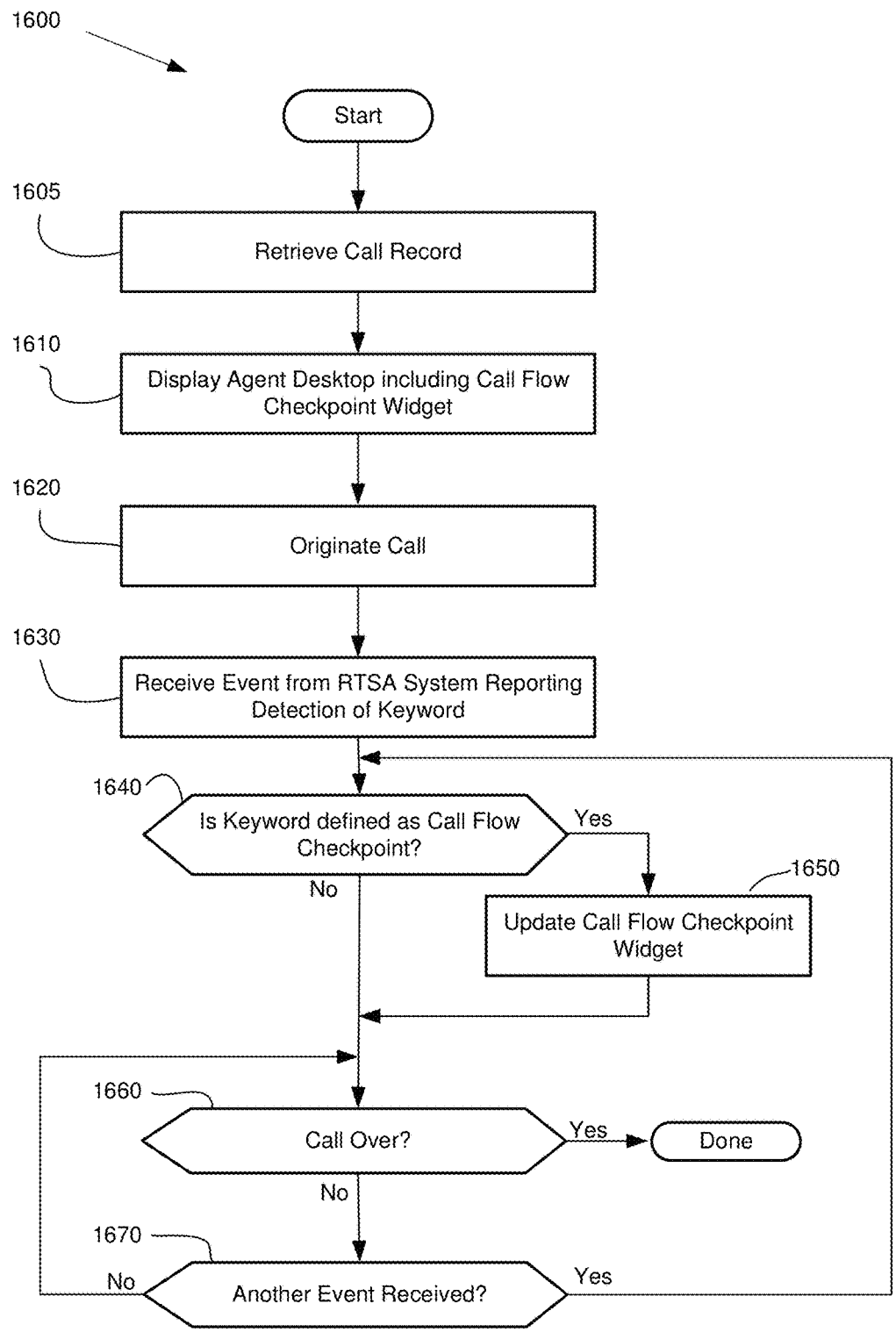
FIG. 16 illustrates one embodiment of a process flow of processing event messages associated with a call for purposes of updating a checkpoint widget.

Operational Flow for Processing Checkpoint Information—FIG. 16

Once the keyword has been identified and indicated as a checkpoint, an embodiment of the process for handling a call is depicted in FIG. 16. In FIG. 16, the flow 1600 begins with retrieving the next call record from a dialing list in operation 1605. The call record typically includes (or allows access to) information such as shown in FIG. 14B, such as the remote party's number and account information.

This information and other information may be used to populate certain portions of the agent's screen as indicated in operation 1610. Part of the populating of the agent's screen includes displaying a checkpoint widget in the selected format. At this stage, the widget will be displayed in an initial state with none of the checkpoints indicated as having occurred (similar to, e.g., FIG. 13A). In many embodiments, this may involve displaying the corresponding text associated with each checkpoint indicator.

Next, the call is originated in operation 1620. Once the call is answered, event messages may be received at the CARM from the RTSA system. The process flow 1600 shown in FIG. 16 process flow presumes that at least one event is received from the RTSA system in operation 1630 (as will usually be the case). The event message reports the detection of a previously defined keyword in the speech by the agent on the voice call.

Since not all events will necessarily be indicated as checkpoints, a test is made in operation 1640 as to whether this particular event is indicated as a checkpoint. If it is, then an update to the widget being displayed occurs in operation 1650. As explained previously, updating a widget may involve modifying the shading, color, or adding a visual element to the widget. Since the checkpoints on a widget are different, the appropriate checkpoint correlated with the event message must be updated. That is, the second event message reported may not necessarily result in updating the second checkpoint, but rather some other checkpoint.

If the call is over in operation 1660, the process is done. Typically, the widget will be reset to its initial state for the next call. If the call is not over, then a test is made in operation 1670 to determine if another event is received. If so, the process loops back to determining whether the event is indicated as a checkpoint in operation 1640. If no event is received, but the call is still active, then the process loops back to operation 1660 to see if the call is completed.

Figure 17:
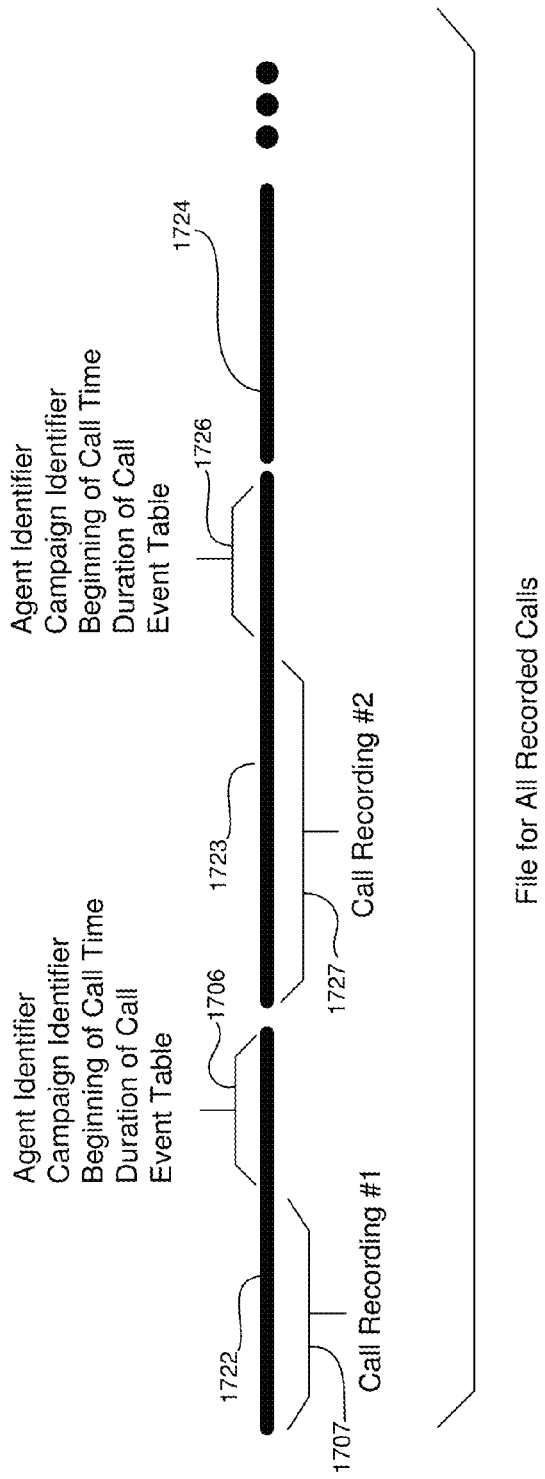
FIG. 17 illustrates one embodiment of a file structure for a recorded call.

Audio Recordings—FIG. 17

The audio recordings associated with an agent, specifically those portions associated with a checkpoint on a particular call, can be subsequently reviewed aurally by the agent or by a supervisor. This requires that the audio of the calls are recorded and stored in some manner. FIG. 17 illustrates one embodiment of a file structure for recording the audio in conjunction with the checkpoint related information.

Turning to FIG. 17, a linear time-wise depiction is shown of a plurality of call recordings and associated meta-data. In one embodiment, the audio of call may be stored in cache memory, and when the call is completed, the audio data is written to the file along with meta-data appended to it as a call record. Thus, FIG. 17 shows a series of such recordings, including a first call record 1722, a second call record 1723, a third call record 1724, etc. Each call record can be thought of as comprising a call recording portion and a meta-data portion. Thus, the first call record 1722 has a first call recording portion 1707 and a first meta-data portion 1706, the second call record 1723 has its own call recording portion 1727 and corresponding meta-data portion 1726, etc.

The call recording portions 1707, 1727 may be stored in any number of audio formats known to those skilled in the art, including: MPEG 4, AAL, WAV, PCM, WMA, MP3, etc. The meta-data portion may be also stored in any number of formats, including those associated with the format used to store the recording portion. The meta-data is not audio data per se, but data about the audio, and comprises information that directly provides, or either indirectly allows, identification of the agent involved in the recorded call and a campaign identifier (since the agent may be involved in more than one campaign during a shift).

In addition, the meta-data 1706, 1726 includes timing information regarding the call. This may include a start time and an end time. Or, this may include a start time and a duration of the call. Either approach allows determination of the length of the call. Further, timing information is provided regarding the event messages received during that call. This may be stored in a data structure called an "event table," though other structures or data formats may be used. Thus, reference to an "event table" should not presume that any particular structure is required (such as a tabular structure). The information in the event table indicates when, during the call, the event messages were received. Further information may include an indication of the type or contents of the event, a corresponding score, etc. The timing information of the event may be based on an absolute time or a relative offset from the beginning of the call. For example, if the absolute time approach is used, then an event received at a certain time can subtract the starting time of the call to determine the offset from the beginning of the call. Specifically, if a call was received at 09:35.00 (i.e., 9:35 a.m. and 0 seconds), then an event recorded at 9:35.43.50 (i.e., 9:35 a.m. and 43.5 seconds) means that the event occurred 43.5 seconds into the call. That is, the offset time of the event is 43.5 seconds. Alternatively, each event could be defined as the offset from the beginning of the call where the call is assumed to begin at time=0.

Regardless of the format used, the event offsets indicate how far into the call each event occurred. Typically, these are indicated in chronological order, so that the first event offset represents the first event message received, the second event offset represents the second event message received, etc. In this manner, the meta-data provides information about when the event messages occurred during the call recording. In this embodiment, each event entry in the event table corresponds to a checkpoint during the call. It is possible to record event messages received during a call that are not defined as corresponding to checkpoints, but this example is simplified to illustrate the concepts of how audio data correlated to a checkpoint can be reviewed.

Figure 18:
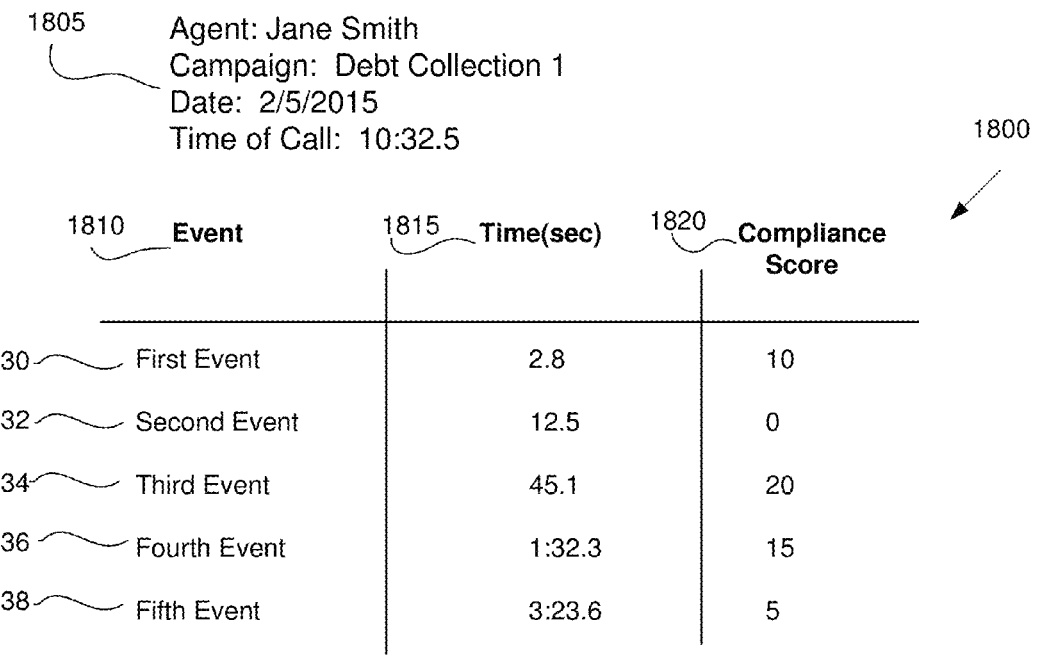
FIG. 18 illustrates one embodiment of an event table for a recorded call.

Event Table—FIG. 18

FIG. 18 illustrates one embodiment of an event table. The event table 1800 is shown along with other meta-data 1805 to provide useful contextual information about the call it pertains to. Thus, this event table 1800 pertains to events corresponding to checkpoints for a call handled by Jane Smith, which was for a "Debt Collection 1" campaign, on Feb. 5, 2015, where the call started at 5 seconds after 10:32 a.m.

In this embodiment, the event table 1800 comprises three columns. The first column 1810 is the event identifier. In this example, these event identifiers are simply identified with generic names, although other embodiments may provide information about the event message type or contents. The second column 1815 is the time when the event occurred, which in this embodiment represents an offset time from when the call began. Finally, the third column 1820 is a compliance score associated with the occurrence of the event.

Thus, for this particular call, there are five rows 1830-1838 which represent five events. The first event 1830 occurred at 2.8 seconds after the call started and its occurrence contributed to 10 points to the compliance score. The second event 1832 occurred at 12.5 seconds into the call, and it was worth zero compliance points. The reason this event is worth zero points is that no points were defined for the occurrence of this event, or that the contents of the event message was such that zero points were allocated. Specifically, the event could report that the agent said "you are welcome" and the event may be defined as accumulating zero points. Alternatively, there may be points awarded for saying the phrase, but the event message reports that this was not detected, in which no points are awarded. The third row 1834, fourth row 1836, and fifth row 1838 also reflect events that occurred at their respective times.

Thus, the event table 1800 provides information as to where the relevant speech can be found in the call recording that correlates with the reported event. Typically, the events correlate to speech that is detected, but it is possible for the events to report speech which is not detected. In this case, the time may simply correlate to when the event message was sent by the RTSA system that reported when the RTSA system finally concluded the speech condition was not detected.

Reviewing Agent Checkpoint Widgets

Once call recordings and the associated meta-data for an agent are stored, this information can be subsequently reviewed. The review can be performed either visually or aurally. Frequently, review occurs visually, followed by an aural review. Aural review allows the condition to be validated and the context fully appreciated by the reviewer. In both cases, a common user interface is initially accessed by the user, which may then be augmented with an audio player-like graphical user interface for aural review. This scheme provides a logical and easy to user interface for selecting and reviewing specific portions of a telephone call recording.

A typical use case involves a supervisor (or agent), reviewing an agent's performance, which may involve identifying calls that reflected poor agent performance. This may involve identifying a threshold score of some form, which is then used to retrieve or identify specific calls. The checkpoint widgets for such calls may be displayed, and the user may review the checkpoint widgets for an agent, determining which checkpoint widgets reflect a low score warranting further investigation, and then selecting a particular call to further focus on. This may further entail selecting a checkpoint on a checkpoint widget, and then requesting audio associated with that checkpoint for aural review.

Figure 19A:
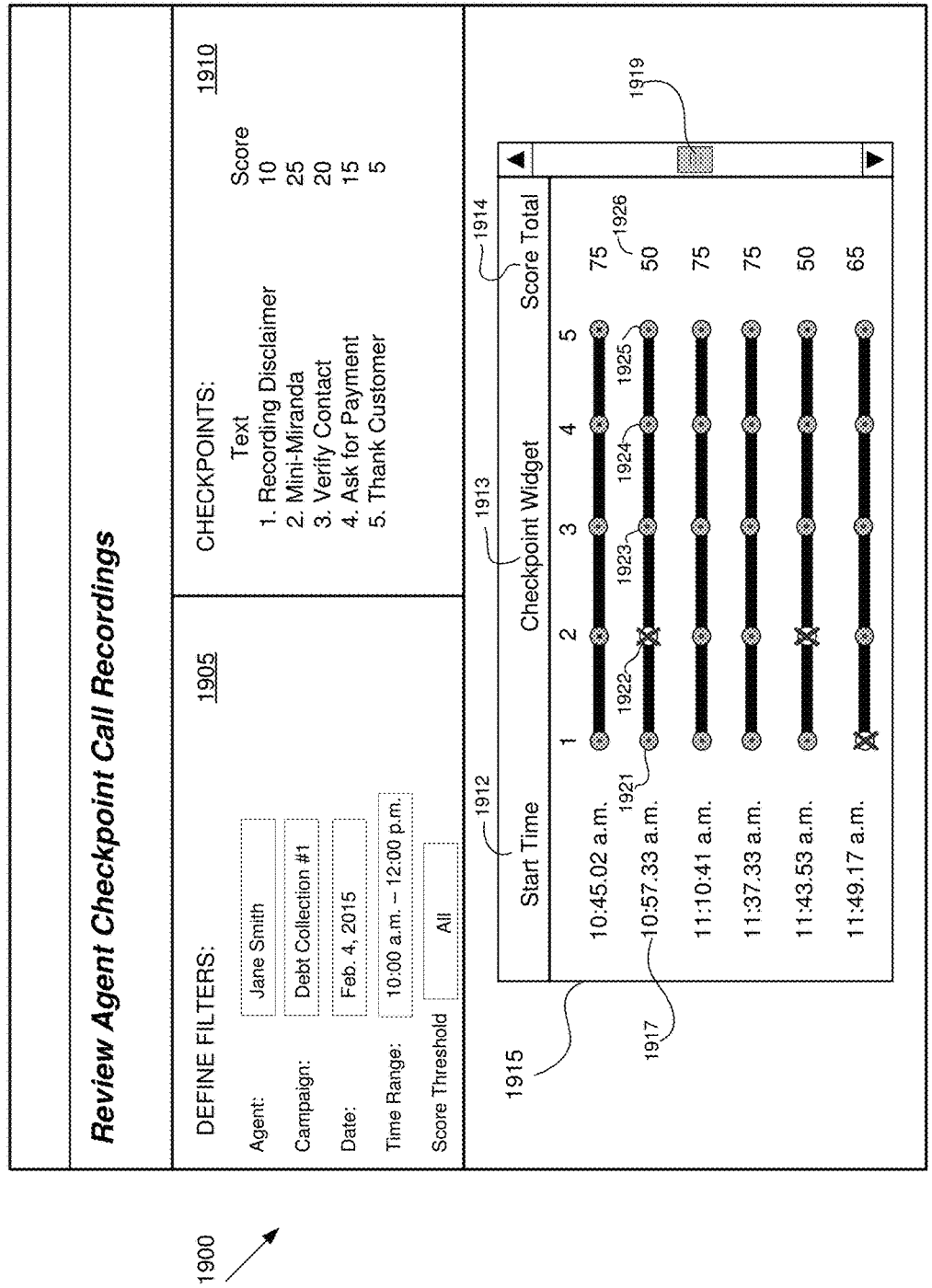
FIGS. 19A-19B represents embodiments of screens used to review agent checkpoint call recordings.

Turning now to FIG. 19A, a screen image 1900 is shown of one embodiment of a graphical user interface that can be defined for allowing review and selection of a checkpoint widget for an agent. The same interface can then be used for selecting a checkpoint for reviewing the audio recording of that call.

The screen image 1900 includes a first portion 1905 which allows the user to specify filter information to identify a subset of the call recordings to select for review. In various embodiments, the review may involve selecting calls based on various criteria. This may involve reviewing calls associated with a particular agent, campaign, date, time, or score. Further, various combinations of these criteria are possible. Thus, a supervisor may desire to review all calls from a given agent or only those which encountered a low score. This may be accomplished by indicating a "wildcard" that indicates all values are acceptable for a particular filter element. For example, by entering a score threshold of "20" and a wildcard for all other filter elements, then all calls from all agents, for all campaigns, for all dates, for all times will be retrieved.

Typically, the supervisor may desire to narrow down the search by using multiple filter elements. In the example shown in FIG. 19A, the filters will retrieve all calls from Jane Smith that were for the "Debt Collection #1" campaign on Feb. 4, 2015, from 10:00 a.m. to 12:00 p.m., regardless of score.

Another portion of the screen image comprises a results window 1915 that displays results of the selected calls that meet the associated filter requirements. The results window 1915 includes a column header 1912 for the start time of a call, a second column header 1913 which indicates the checkpoint widget for each call, and finally a third column 1914 which indicates the score total. Finally, a scroll control icon 1919 allows the user to scroll up or down to review the results.

The results window 1915 allows a number of call specific results to be displayed. The results are typically ordered by time, as can be seen by examining the start times for each call. The checkpoint widget shown for each call, displays a status summary of the checkpoints during each call.

The checkpoints are numbered in this embodiment at the top with the numbers 1-5. These numbers correspond to the checkpoint labels shown in the checkpoint legend 1910 on the screen image. These are also numbered from 1-5 and the text reflects the nature of the checkpoint. For example, the first checkpoint is associated with "Recording Disclaimer", which reflects whether the agent has provided the disclaimer that the call may be recorded. The score, which is shown as 10, indicates the number of points allocated to this event being detected. Thus, the checkpoint legend 1910 allows the user to quickly review the nature of the checkpoints shown in the results screen. This arrangement avoids duplicating the checkpoint text in the results window 1915, allowing more results to be shown.

Turning to the second call shown in the results window, the second call began at the time indicated 1917, which is 10:57 a.m., and 33 seconds. The first checkpoint 1921 is shown as having occurred, whereas the second checkpoint 1922 is shown with an "X" as not having been detected. The third checkpoint 1923, the fourth checkpoint 1924, and the fifth checkpoint 1925 have all occurred. Because the second checkpoint did not occur, which was worth 25 points, the total number of points received is 50 (as opposed to the maximum amount which is 75). Similarly, the last call shown reflects the first checkpoint did not occur, which was worth 10 points, hence the total score received was 65 points.

The user can quickly review calls from an agent, and easily find out which calls had a perfect score, i.e., all checkpoints occurred and thus all points were awarded. These calls could be used, for example, to illustrate exemplary call handling. On the other hand, calls where the score is low could be used to illustrate poor call handling. These calls could be further examined with the agent to discuss what is deficient, and why. A sum total of the score for an agent's shift, or some other time period, can be maintained and used in performance evaluation.

Reviewing Agent Call Recordings Associated with Checkpoints

Typically, a supervisor reviewing calls with a low score total (e.g., reviewing checkpoint widgets with missing checkpoint occurrences), will want to review the actual audio of the call. This can be accomplished by the user selecting the appropriate widget, which identifies a particular call, and then selecting a particular point on the widget that identifies a particular portion of the audio of the call.

Figure 19B:
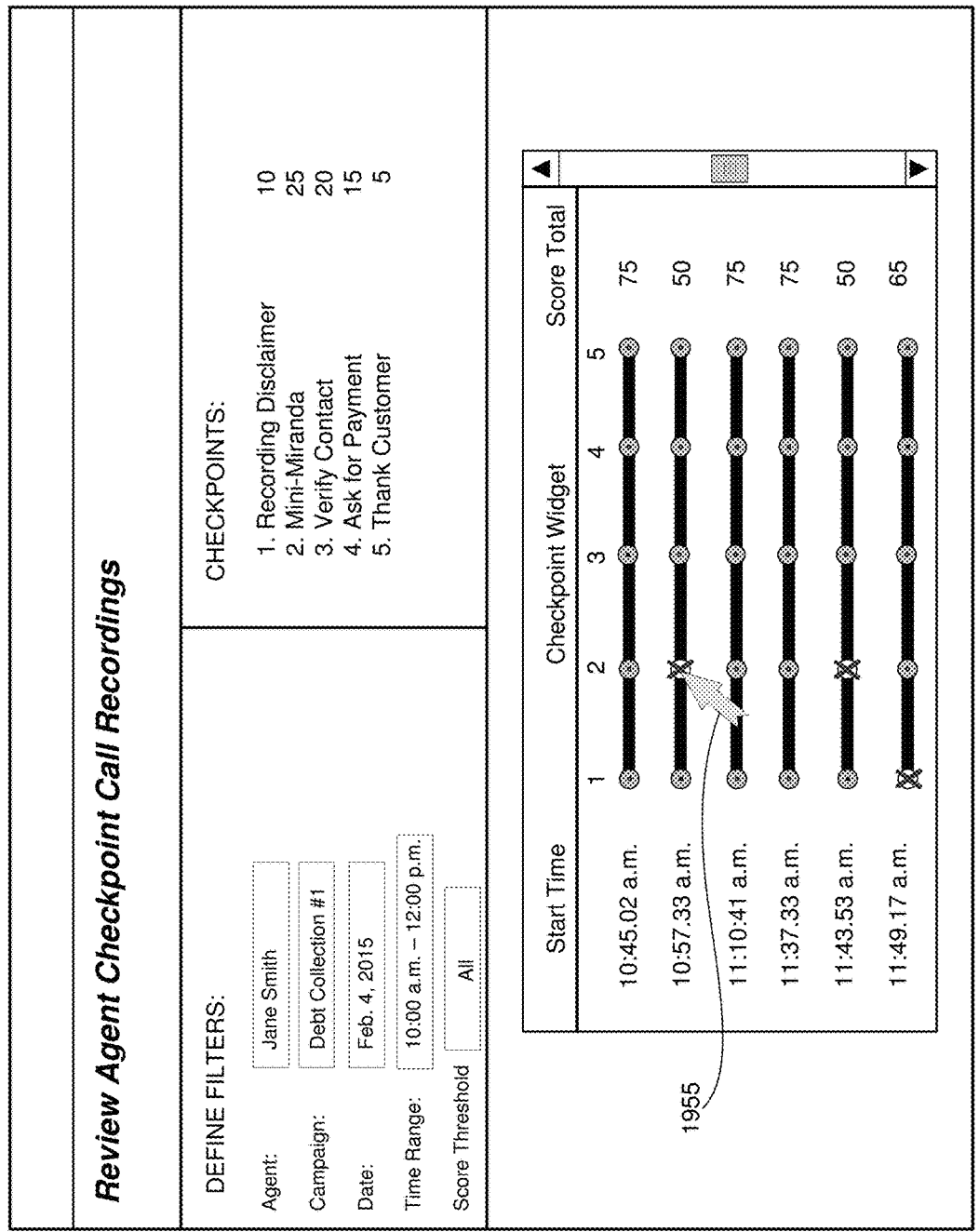

FIG. 19B illustrates one embodiment of a user selecting the second checkpoint of the second call widget. This selection is for the purpose of reviewing the audio of the call at this point in the call. This can be accomplished by the user moving a cursor using a mouse or other pointing device and selecting the checkpoint by clicking the mouse button. Those skilled in the art will recognize a variety of other pointing devices may be used to select the checkpoint, such as trackballs, pointers, touch screen displays, cursor controls etc.

Figure 20:
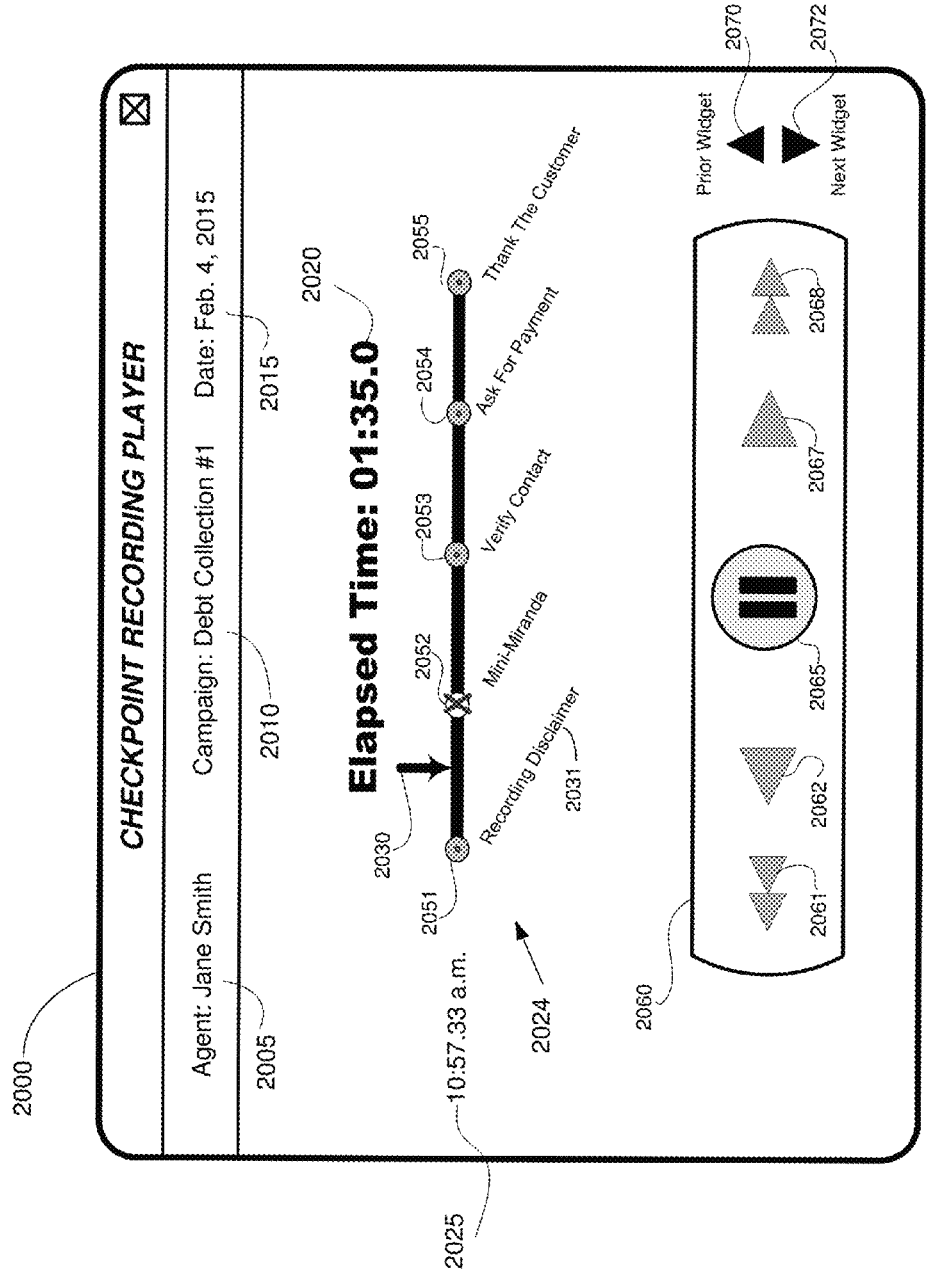
FIG. 20 represents one embodiment of a checkpoint recording player for reviewing audio portions of a call.

Once the checkpoint is selected, another window may appear, which is an audio player window (or simply "player window"). One embodiment of a player window is shown in FIG. 20. This may be overlaid on the screen image 1900 of FIG. 19A, but is shown by itself for clarity in FIG. 20. Turning to FIG. 20, the player window 2000 is shown. The window provides some or all of the filter information on a portion of the player window. Specifically, the selected agent name 2005 is shown, along with the applicable campaign 2010, and the date 2015. The relevant time of the selected call 2025 is shown along with the widget itself 2024.

In this embodiment, the checkpoints are shown with their respect text. Thus, the first checkpoint 2051 is accompanies by the respective text 2031 "Recording Disclaimer." This avoids the user from having to refer to the checkpoint legend on the screen image, which may not be presently visible.

A current location marker 2030 is shown relative to the widget. This location marker indicates the current location of where the audio currently being played, or about to be played. The elapsed time indicator 2020 reflects in a numerical format the relative position of the location marker. In this embodiment, the location marker is located at 1 minute and 35 seconds from the beginning of this call. In some embodiments, the user can position the location marker directly using a cursor or mouse. In other embodiments, separate controls, as discussed below, are used.

A controller box 2060 contains a plurality of control icons for controlling the playback of the audio. This includes a start/stop control 2065. This toggles the playing or stopping of the audio. The backup control 2062 backs up the location marker (e.g., typically moving it to the left). In some embodiments this may back up the audio to the next previous checkpoint or in other embodiments a fixed about of time (e.g., 5 seconds). Similarly, the forward control 2067 moves the location marker to the next checkpoint or advances it a fixed amount of time. The fast-backup control 2061 and the fast-forward control 2068 will advance the location marker to the very beginning or the very end of the checkpoint. In other embodiments, these will go to the first or last checkpoint. Finally, the widget controls 2070, 2072 will advance the location marker to the prior or next widget relative to the widgets shown in FIG. 19A.

Determining the Audio Starting Point for Playback

Returning back to FIG. 19B, the user may select a point along the widget for reviewing the audio of the call. This determines the starting point (e.g., where the location marker is initially positioned) when the player window appears as shown in FIG. 20. There are various embodiments for how the initial starting point of the location marker may be selected.

In one approach, the user can select and move the arrow 1955 to any point along the widget. This may be over a checkpoint or between checkpoints. A corresponding time will be calculated and used to position the location marker. For example, if the arrow 1955 is positioned approximately halfway between the $3^{rd}$ and $4^{th}$ checkpoint, then an estimated time halfway between the $3^{rd}$ and $4^{th}$ checkpoints may be determined. Recall that the time between checkpoints may not always be proportional. Thus, the time between the $2^{nd}$ and $3^{rd}$ checkpoint may be 10 seconds, whereas the time between the $3^{rd}$ and $4^{th}$ may be 50 seconds. Using the event table, this time can be estimated.

In another approach, the user is only allowed to select a checkpoint as the initial starting point of the location marker. For checkpoints that have occurred, there is a corresponding entry in the event table as to when they were detected. Thus, if the third event was detected at, e.g., 45.1 seconds into the call based on the event table, then the location marker could be initially positioned at 45.1 seconds into the call. This is easy to determine when the event table has detected each checkpoint.

However, returning again to FIG. 19B, the user has selected the second checkpoint using the arrow cursor 1955, where the second checkpoint is marked with an "X" denoting that is was not detected. Thus, there would not be a corresponding entry of a time in the event table for this widget. In such cases, one approach is to split the time difference between the adjacent checkpoints which did occur. In this example, the first and third checkpoints were detected, and so there would be time entries in the event table. This would allow an estimate to be used for initially positioning the location marker on the player window.

Further, in various embodiments, an offset may be incorporated when determining the initial position of the location marker. For example, if a user selects a checkpoint that was detected, there would then be a corresponding time for that event in the event table. That time may reflect the time when the event message was sent or received, which would necessarily occur after the speech occurred and was detected. Thus, positioning the location marker at that time would start playing the audio just at the end of the detection of the speech event. In order to provide the user with context, the location marker may be backed-up in time by, e.g., 5 or 10 seconds, so that the audio will begin just before the speech condition was detected.

Figure 21:
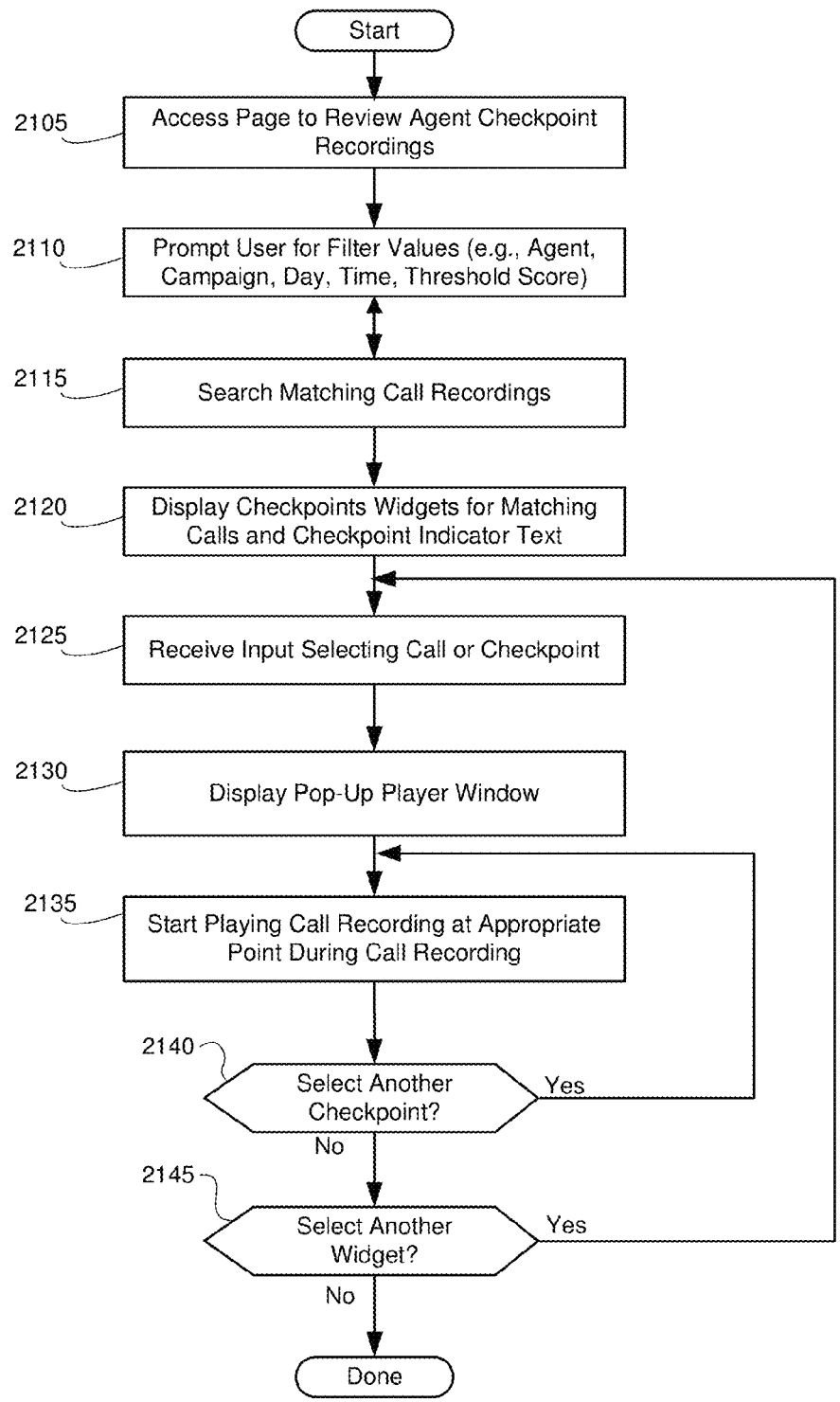
FIG. 21 represents one embodiment of a process flow for an agent reviewing checkpoints in a recorded call.

Reviewing Agent Call Recordings Process Flow—FIG. 21

The process flow for reviewing an audio recording is shown in FIG. 21. The process flow begins with the user selecting the appropriate screen for reviewing agent checkpoint recordings in operation 2105. This may be accessed by various menus by the user, who may be the supervisor. The user may access this via a management or administration portal on the call handler, RTSA system, or other system executing the CARM. Access to this function may be limited based on the login credentials of the user. For example, agents may be precluded from accessing this page, or if they are allowed to, they may be limited to only reviewing their own calls. Once this page is accessed, the screen image similar to that shown in FIG. 19A is shown.

The next step involves the user providing the appropriate filter information that is used to select the calls for review in operation 2110. Although the filter information may include the agent's name, campaign, day, time, and threshold score, other embodiments may allow or required a greater or fewer number of filter elements. Various constructs for indicating ranges, thresholds, values, wildcards, or other selection criteria can be used. Further, other embodiments may allow selection of certain types of examples of checkpoints or violations. Those skilled in the art will recognize in light of this disclosure that a large number of variations are possible for filtering the number of possible calls that are to be reviewed.

When the user has completed indicating their filter values, a search of the relevant call records can be made in operation 2115. This may involve using a variety of database retrieval means for identifying the relevant call recordings and associated meta-data. Once this information is provided to the system, the results window 1915 can be generated and displayed to the user. Typically, the resulting widgets are displayed in descending chronological order beginning with the first qualifying recording.

In order to generate the results window, the CARM may first identify the relevant call records, and then use the meta-data from each eligible call record to construct the corresponding widget. The time when the call occurred is used to display the starting time 1912 for each record. The existence of a detected event (or not) at each time is used to determine whether the corresponding checkpoint occurred or not. Finally, the score total associated with the call is also displayed. Thus, the checkpoint widgets in the result window can be relatively easily displayed once the corresponding meta-data is obtained. Typically, calls from a common campaign are retrieved, and typically a campaign has a common widget definition. That is, all calls from a common campaign typically have the same number of checkpoints and of the same type. However, if calls from different checkpoints are obtained, then the widgets may be different (e.g., they may have different checkpoint texts and a different number of checkpoints in each corresponding call). Thus, it is usually simpler to show the results for a set of calls having the same type of widget defined for those calls.

Once the results window are generated, the user may then provide an input selecting a particular widget in operation 2125. Specifically, the user may select a particular point along the widget timeline, or a particular checkpoint. This is used to define the initial location of the location marker when the player window is presented in operation 2130.

Once the player window is presented, the user may provide an input to start playing the audio. The input allows the appropriate point in the call to be identified so that the audio at that point is then played to the user. The playing of the audio may occur through speakers in the user's computer, headphones attached to the computer, or any other means for providing audio from a digital file using a computer.

The user may choose to replay the audio, or select another point in the same call to hear audio in order to obtain a better context of the call. Thus, the agent may use the controls to back up to a prior checkpoint or advance to the next checkpoint in operation 2140. If so, the process loops back to operation 2135. If not, the user may choose to select audio from another call. This could be accomplished by using the widget controls in the player window to advance or back up to the next or previous call. Or, the user could close the player window and select another widget. This reflects the user selecting another call, and if so, the process loops back to operation 2125. Otherwise, the user has completed their review of the agent's calls.

Alternative Embodiments and Additional Capabilities
Purpose

Additional embodiments are presented for detecting and reporting certain speech during a contact center call. As described previously, a set of various keywords may be defined that are monitored during calls involving a set of agents. Anytime one of the keywords is detected a corresponding alert is generated. This approach allows a supervisor to review the overall operation of a team of agents involved in a call campaign. For example, the supervisor can review a set of agent icons and quickly ascertain each agent's status, and if need be, drill down further to obtain more detailed information. The alert bubble indicates, e.g., how many alerts each agent has received and more detailed information about the various alerts can be determined by selecting the icon.

However, there are circumstances when the supervisor desires to use a more focused tool for monitoring speech. For example, the supervisor may desire to monitor only a particular agent (or set of agents) for a particular speech related aspect. For example, a particular agent may have been observed as having a propensity to use inappropriate language during a call. This could be, e.g., using a curse word, slang, or other words that they are instructed to avoid. For example, an agent may use the slang term "you-all", and they have been asked to use instead the term "you." The supervisor may coach the agent to avoid such language and use the speech analytics system to measure the agent's performance to see if there is a change in their behavior. The manager may establish a particular set of keywords which are applied by the speech analytics system to monitor that agent's speech for inappropriate language. This allows the supervisor to monitor that particular agent, and track their performance in avoiding such language. Presumably, once the agent learns to avoid such language, the need to monitor the agent is eliminated.

There may be other benefits to defining a distinct keyword set to be applied for a single agent, or a set of agents, on a temporary basis. By keeping the keyword set smaller, there may be a performance advantage in the speech analytics system, as well as other benefits from an administrative perspective. For example, if periodic alert reports are viewed by the supervisor, then the time to review and analyze these reports may increase if all agents are being reviewed for inappropriate language, when only one agent is using inappropriate slang. Further, having to process speech from every agent on every call, when only a single agent is to be monitored, consumes additional processing resources.

Another circumstance where a manager may desire a more focused approach for review reported results is when a keyword set is to be applied to all agents, but the results should be easily distinguished from other alerts. For example, a manager may need to monitor for a specific keyword among all agents (or a set of agents) for a particular purpose. This could be, e.g., to measure effectiveness of a new sales pitch, a new greeting, or to ensure a new special offer is being communicated properly to remote parties. While the aforementioned procedures allow this keyword to be defined, reported, and reviewed, such alerts are included with all other forms of alerts. The alert bubble, for example, includes a cumulative number for all alerts, not for a particular type. Thus, any reporting of this temporary keyword set is "buried" in the reporting of the other keywords. Recall that the ability to further investigate the details of alerts includes information about all of the alerts; it is not filtered for a particular type of alert.

Thus, there is a need to filter and/or segregate alerts of a particular type from other types of alerts in a manner that allows the supervisor to readily review a distinct or particular alert type. Further, information about these particular forms of alerts may also be presented to the agent via the agent's workstation computer display, so that the agent can readily review their performance on a particular aspect without having to search through non-relevant reporting information. This allows the agent to better focus on improving a particular aspect of their performance.

Further, it becomes evident that when reviewing the audio associated with a particular or distinct keyword, such as shown and described in conjunction with FIGS. 19A and 19B, this approach requires additional time for the user to select the appropriate checkpoint to hear the corresponding audio of the call. In those examples of FIGS. 19A and 19B, there were five different checkpoints illustrated. If the user is only interested in a particular checkpoint, this requires the user to locate and select each appropriate checkpoint individually, which may be complicated by the presence other information that is presented. Thus, a faster and quicker means is needed for the user to hear audio from calls related to a particular keyword. For example, referring back to FIG. 19B, if the user has pointed the cursor to the second checkpoint (indicating an abnormal condition was detected), they can select it to hear the corresponding audio. However, to hear the next instance of that some condition in a separate call, the agent must look and scroll down (if necessary) to locate the next such instance. It would be easier if only the relevant calls were presented to the user, as the user may not have any interest in examining abnormal instances of other keywords, which are not relevant to the immediate purpose.

Topics and Topic Meta-Data

Overview

A variation of the previously identified capabilities is now discussed that provides a tool for a user, whether it be an agent or supervisor, to receive and review information related to a particular keyword detected (or not detected) in a call, even if that keyword does not correspond to a checkpoint shown on the checkpoint widget or causes an alert indication as described above to be generated. Thus, this variation may viewed, in part, as a distinct or special type of alert, having separate presentation related aspects. It may be desirable to define certain keywords that are reported via event messages, which do not correspond to a checkpoint or are reported as a conventional alert described previously. For example, if a keyword is part of a keyword set and that keyword is detected, and then it may be reported as a transient alert indication that may be missed by the user. While the user may detect the numerical value in the alert bubble has incremented, the user may not know what was reported, and may then have to perform additional actions in order to ascertain what keyword it pertained to, only to then find out it was not relevant to a particular keyword.

This augmented set of capabilities is accomplished by describing the capabilities in terms of modifications to the above disclosed concepts and technologies. However, the basic concepts of monitoring and reporting the presence (or expected absence) of various keywords is still performed.

Recall that a keyword set may also be referred to as a "topic." To avoid confusion, reference is henceforth made to a "topic" as opposed to a "keyword set", but the topic still comprises one or more keywords. Recall also, that the "event table" of FIG. 18 was one embodiment of storing information related to the detection of keywords (or speech events). The concept of the event table can be expanded into a database of records, wherein each record contains much more information regarding the detection of the keyword. This file is referred to as a "topic meta-data file."

The topic meta-data file is a database of records, where each record ("topic meta-data record") is created as a result of detecting a keyword, but each record contains additional information as compared to the entries in the event table. Further, the information in the topic-meta-data file can be manipulated using conventional database query techniques. The topic meta-data refers to information about the keywords detected during a call. Although this variation is presented as alternative embodiment to using the event table, another approach could be based on expanding the parameters in the event table. If this implementation approach is taken, then the distinction between an enhanced event table and the topic meta-data file is minimized.

The topic meta-data records (or simply "records") in the topic meta-data file could be automatically analyzed at various times during the day or analysis could be triggered based upon some input, such as a request from a supervisor, upon an agent logging out from a workstation, or at the end of a shift. The records can be analyzed in the context of a particular agent or a group of agents. Or, the records in the topic meta-data file could be analyzed for all agents, but only in the context of the detection of a particular topic. This provides an additional degree of filtering and control as compared to the previously mentioned approaches that display and report all keywords that have been identified as corresponding to checkpoints and/or causing alerts. For example, the aforementioned use of checkpoints and transient alert indications allow a group of agent to be similarly treated with respect to reporting speech events, but does not necessarily facilitate further analysis with a sub-group or for analyzing a particular speech event from the set of speech events that are detected for an agent in a unique way.

The results can be provided as real-time summaries or visual indicators, such as a cumulative value of qualifying calls determined from the beginning of a shift of an agent or group of agents. The results could also be provided in non-real time, e.g., such as running a report summarizing the results at the end of a shift or pay period. Finally, results from a particular call can be selectively reviewed in an audible manner. Although such an analysis has common aspects with processing event messages for purposes of generating checkpoint and alerts, this analysis can be thought of as a parallel form of processing of event messages allowing different outputs or indications to be provided.

One common approach for indicating these types of alerts is to provide a real-time icon indicating the result of an analysis of a plurality of topic meta-data records. Although similar to an alert bubble, there are some differences, and the phrase "topic dashboard indicator" is used to describe this new type of alert notification means. The topic dashboard indicator is typically focused on a single topic, as opposed to reporting an amalgamation of topics. The indicator may be frequently used to provide real-time statistics, hence it is referred to as a "dashboard" type of indicator. To ensure there is no confusion that these alert indications are different from the aforementioned alert indications, these are preceded by the word "topic." Hence, topic dashboard indicators are real time alert indications focused on one topic.

This embodiment allows targeted or selective results to be reviewed. For example, an agent can separately review instances in their calls where a specific keyword or topic was involved during a particular time period (e.g., before and after a lunch break). In another embodiment, a separate set of keywords are monitored by the supervisor in the contact center, but the findings are not presented to the agent, so that agent does not have the potential to review or even know that these other keywords are being monitored. However, it may be very useful for a supervisor to define and review information about a particular topic for all agents on a shift that is distinct from other keywords or topics which may be monitored by the speech analytics system. That way, the supervisor can review specific information that is not "cluttered-up" with other information. For example, a supervisor may desire to review how agents are performing only with respect to a particular topic that does not correspond to existing defined checkpoints or existing alerts. While deleting the existing checkpoints would allow the supervisor to focus on a single new topic, it would result in losing much information. The practical benefits of such an approach will become evident in the examples provided.

For example, a manager may desire to focus on detection of a particular topic for all agents, but without defining it as a checkpoint or as an alert. This could be done to confirm a hypothesis as to whether a certain speech condition occurs among a group of agents. For example, the supervisor may desire to determine the effectiveness of a recent training programs that certain agents attended, but does not want to "clutter up" the existing definition of the user-interface screens with respect to defining additional checkpoints and alert indications. Further, the supervisor does not want to define new alerts, since that too would be distracting to agents. Thus, the manager may desire to filter and review information about the raw meta-data developed for keywords in ways that are not necessarily fully known beforehand. For example, do certain agents have a greater tendency to speak certain phrases early in the day as opposed to later in the shift? By analyzing the topic meta-data file using conventional database query techniques, a flexible capability to analyze speech events is possible. This can then be coupled with the mechanism to retrieve and play back audio so that the supervisor can verify the audio recordings in a flexible manner.

This flexibility exists for post-call analysis or real-time call analysis of topic meta-data records. Post-call analysis involves analyzing stored topic meta-data for prior calls whereas real-time call analysis may analyze such records for a current call in real time. Frequently, the same statistics could be determined. For example, post-call analysis could ascertain whether an agent exceeded a threshold for uttering a keyword associated with a topic during the prior week. This requires all the calls to have been completed and analyzed. Alternatively, a real-time analysis could occur at the beginning of the week that analyzes the occurrence of the keyword, compares it to a threshold, and then reports the results using a topic dashboard indicator in real-time indicating whether the threshold has been exceeded. This analysis may involve performing a real-time analysis the current call's results with prior records for that agent. However, at the end of the week, the same result would be reached as if the records were analyzed post-call.

The additional embodiments and additional capabilities are illustrated as involving three, and optionally up to four, distinct, but related, processes. These can be identified by the labels: a) Administrative Setup, b) Analyze Topic File, c) Display Results, and optionally, d) Review Audio Snippets. Step a) occurs first. Steps b) and c) can occur in a real-time mode or a post-call mode. Lastly, it is optional to review audio snippets after the call has occurred. A process flow shown in FIG. 22 provides a high level overview of these processes.

Administrative Setup

Figure 22:
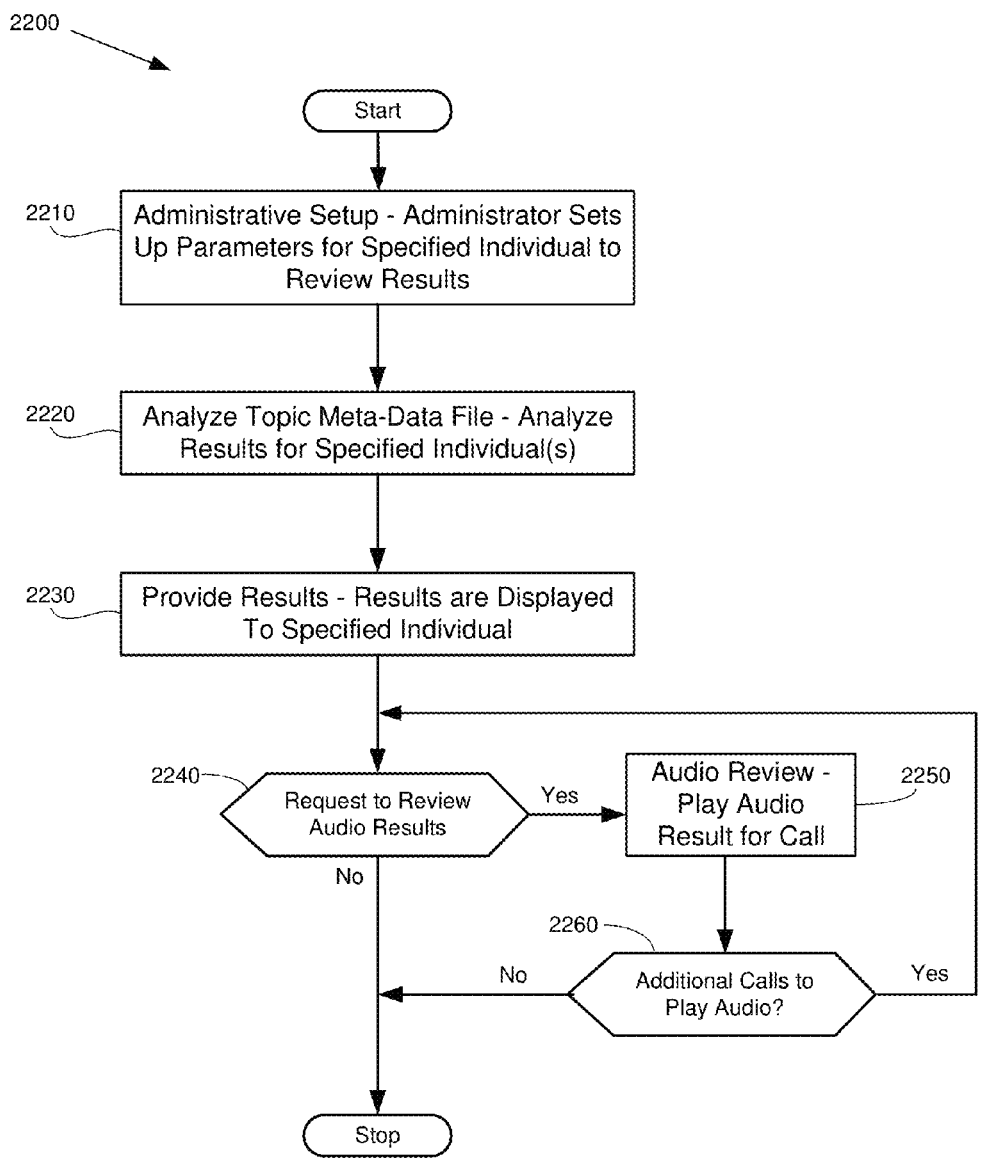
FIG. 22 represents one embodiment of a process flow for allowing review of information related to topics detected during a call.

The overall process 2200 first begins with the administrative setup process shown as operation 2210 in FIG. 22. This involves an administrator or supervisor defining what information is to be analyzed, when and how it is to be analyzed, who reviews the results of the information analyzed, and how the results are reviewed. This is a necessary requirement prior to running the analysis and reviewing the analysis. Note that the aspects of "what" information is analyzed, "who" can review the information, and "how" they review information are inter-related, as will be seen. Portions of this process are similar to defining how checkpoints/alerts are generated, but there is a distinction as to how the information is presented.

What Topics are Analyzed

Defining what information is analyzed first involves defining what keywords or topics are detected in some manner by the RTSA system. It is possible that the same information may be analyzed differently for different persons. Although the following are examples illustrate how topic information can be analyzed, it is intended to be illustrative, and not limiting the scope of the invention.

A supervisor may desire to review the frequency of all a specific topic uttered by all agents on a call during a particular shift, but without defining these as an additional checkpoints or causing a conventional alert to be generated. Determining the frequency of occurrence of a particular topic may be accomplished by simply counting occurrences of the associated keywords in that topic for each agent during a shift. The supervisor may desire to further highlight agents who are exceeding a certain threshold. So, for example, the supervisor may desire to identify any agents which utter a prohibited phrase or word more than a certain number of times during a call or during a shift. For example, agents may be urged to confirm with each party their consent to be contacted at their wireless number by the call center. An administrator may conduct a test to determine how many agents are, in fact, doing this. A percentage indicator could be displayed indicating the percentage of calls from the start of a shift that this has occurred for each agent or for all calls handled by a group of agents.

Upon learning that this aspect can be improved, the administrator may desire to allow each agent (or certain select agents) to be able to review such information in real time via a topic dashboard indicator. This information may be quickly reviewed by a specific agent to remind them whether they have (or have not) confirmed consent for each call. Each agent may periodically review this information, without this information "cluttering" up the checkpoint widgets, which occurs when by defining another checkpoint or by defining a new alert. Likely, once the agent has learned to check on their performance by reviewing the topic dashboard indicator, their performance will adjust appropriately. Unlike alert bubbles, which require further interaction to drill down and learn what was reported, the topic dashboard indicator can provide some of that information with a simple glance.

It may be that the supervisor desires to analyze the presence of a topic for all agents, but only for a limited period of time. Or, the supervisor may desire to analyze the information (after the calls have occurred) in a manner not previously anticipated. This could include, for example, a week-over-week change in detecting certain topics. The supervisor could run a report after the time period, or maintain a current cumulative topic dashboard indicator, without altering the existing checkpoints being monitored or existing alerts being reported.

In summary, defining what information is analyzed requires the administrator to first define the topics that are to be detected. Once detected, these could be analyzed in real-time or in post-real time. Analyzing information in real-time may be required in order to provide real-time updates or real-time topic dashboard indicators. On the other hand, analyzing information post-real time may be sufficient. Some information can be analyzed in quasi-real time (e.g., periodically, such as every hour).

The nature of the analysis defined to occur can be varied. For example, topics may be measured by counting their occurrence with respect to a particular time period (counting occurrences in each hour, during a shift, week, or pay-period). The occurrence of topics may be compared to the frequency of that person or group as compared to a prior time period or another group. The frequency of occurrence of a topic may be compared to a historical average of a group. Or, the frequency of occurrence can be reported as a deviation from the average. Thresholds could be defined where the occurrence, average, or deviation is greater or less than a particular amount. The topics detected could be correlated with other metrics. For example, the percentage of calls that an agent asks a debtor whether they are able to pay may be correlated to the effectiveness of that agent in obtaining a promise to pay from a debtor. This allows the supervisor to develop a metric by which other agents can be compared against in predicting their performance in obtaining a promise to pay from a debtor. Those skilled in the art will recognize that there are a variety of techniques that could be measured and reported based on analyzing a frequency of the reported topics as indicated in the records of the topic meta-data file.

Who Reviews the Results

Information analyzed regarding the detecting of topics can be reported to two main groups—agents and management. In each category, there may be sub-categories. With respect to agents, information may be provided to all agents employed (regardless of whether they are working at the immediate moment), all agents working on a shift, all agents working on a campaign, or a specific agent. This may be used when reporting information related to the entire group of agents, such an overall performance rate.

In another embodiment, information may be provided to only one agent. This would allow the agent to review information related to the analysis of topics only for that agent. For example, an agent may be assigned to a performance improvement plan that reduces the utterance of certain phrases. For example, an agent may have a tendency to say "well, you know . . . " repeatedly. This may be defined as a topic, and its occurrence may be analyzed and later reported to that agent. Only the agent involved would be interested (and should be allowed) to review this agent-specific information. Generally speaking, it would not be beneficial to allow an agent to review another agent's performance related information.

Another group that information may be presented to is management. This would include team leaders, supervisors, managers, and administrators. In many instances different levels of detail or type of information are presented to managers than agents. For example, a manager may be able to review each agent's performance related topical information, since the manager is charged with improving each agent's performance. The information provided to a manager may be summarized information or it may be specific to an agent. Typically, the type of information available to a manager is not necessarily available to the agents, or may include additional details.

How the Results are Provided

How the results are indicated is different compared to the prior discussion of providing checkpoints and/or alerts. The results may be provided in various forms, including a text-based report or via a real-time topic dashboard indication (a.k.a. a topic dashboard icon). In addition, the results may further be provided audibly. Typically, some information is frequently provided in a visual form, and may be optionally provided in an audible form. The visual form may include text or textual information, and may be as a simple as indicating a number of times a topic was detected or displaying a flag merely indicating whether the topic was detected. The audible form typically comprises providing audible snippets (i.e., portions of a call related to the topic or keyword detected) of one or more calls where the topic was detected.

The visual information may include text included in tables, charts and graphs. The provided information could be, for example, a table indicating how many times an agent uttered a keyword during a call, a relative percentage of how many times a topic was detected relative to a group average, a number of times a threshold was exceeded, etc. A chart or graph could show how many times the topic was encountered over a specified time period. Sometimes, the information may be provided as a numerical value via a topic dashboard icon in real-time. A continuous indication in the form of an icon could be displayed showing whether, or how many times, a topic was detected during a time period. This could be, e.g., an icon representing a positive or negative outcome, a number, or a percentage of the number of calls during the current shift that a particular outcome was detected.

How the information is provided may depend on how much information is required to be provided—real time, non-real time, or near real-time. This information may indicate to a manager how each agent performed with respect to a particular analysis for various topics. This could be displayed, e.g., using a table defined just for that agent. On the other hand, an overall summary of the collective performance could be provided simply with a numeric value for a collective number of agents. The administrator may select to receive the information in a report, which can be generated periodically or on-demand. The information could also be provided via a real-time indicator to the person intended to review it. For example, information could be provided via a real-time indicator that is displayed to an agent or a supervisor regarding topics associated with a particular agent. This could be a real-time numerical value, percentage, or other icon that reflects the agent's current performance via a so-called "dashboard" displayed to the agent.

Audio information may be provided if there is a desire by the manager or agent to hear one or more particular calls where the topic or keyword was detected and by the speech analytics system. Thus, if the information analyzed pertains to how often the agent provides an appropriate greeting, then audio of the calls where an inappropriate greeting was provided may be reviewed. This can be particularly useful if the information being monitored results in reporting a severe non-compliance situation, or if there is doubt regarding the accuracy of the RTSA system. Such calls may be individually or collectively reviewed.

Thus, returning to FIG. 22, the administrative setup operation 2210 involves the administrator defining what keywords will be analyzed and how, who will be provided the results of the analysis, and how the results it will be presented. To provide some additional examples, the administrator could define that occurrence of certain keywords should be monitored for a particular agent and reported to both the agent and their supervisor as a percentage of calls that include those keywords. That information is to be made available to the agent and displayed as a numerical value, via a dashboard display element or icon. The topic dashboard icon (which may also include a numerical value or text) may be defined as representing a particular form of information, which is displayed on the agent's workstation. The same topic dashboard icon could be provided on the supervisor's workstation, along with the ability to review information in audio form.

In another example, the administrator may define a collective performance attribute for a group of agents who are attempting to comply with a new internal policy. The collective performance as a daily metric could be defined to report the percentage of calls complying with the new policy. That value is displayed to all agents via as a topic dashboard icon (which reflects only that agent's performance) wherein as the supervisor may view a topic dashboard icon that reflects all the agent's performance. Further, individual agent statistics could be provided in a weekly report to the supervisor.

Analyzing the Topic Meta-Data File

Returning to FIG. 22, the next operation indicated in process 2200 is the Analyze Topic Meta-Data File operation 2220, which performs the analysis. That is, this operation analyzes the selected information in the topic meta-data file, which contains the meta-data records regarding the keywords detected.

Analyzing the topic meta-data file may be triggered in various ways. It may be a scheduled operation, which occurs periodically or essentially continuously. It may be scheduled to occur at the end of a shift, so that information regarding the agents' collective performance can be analyzed. It may be scheduled every 5 to 10 minutes (or some other interval), so as to provide periodic updates to an agent. It may run continuously, so as to provide real-time updates to an agent or supervisor.

Alternatively, the topic file may be analyzed upon request. For example, an agent or supervisor may request to receive an update as to the current status of selected values. Thus, returning to the example of an agent's performance in using an updated greeting, the agent could periodically request to review their current performance values by requesting an update. Or, a supervisor may request to obtain a "snapshot" regarding the performance of a certain topical metric that is being monitored.

As noted before, the operations performed in analyzing information in the topic meta-data file may include counting occurrences of a keyword for an agent, comparing the number of occurrences of a keyword during two different time periods of an agent or between two different groups or individuals during the same time period. There can be various statistical operations to correlate occurrence of a keyword with some other metric. There can be determination of trends, determining when a frequency of use threshold has been exceeded, and calculating a standard deviation determination of the frequency of occurrence of a topic relative to an overall agent population. The list of analysis functions that can occur is quite varied, and the exact form of the analysis may vary from what is disclosed herein. Typically, the analysis is based on some sort of frequency of occurrence of the topic as reported in the records for a particular agent. The frequency of use could be an absolute count of the occurrence of a topic for a given agent, a percentage of calls for the agent that reflect detection of the topic, a relative frequency of use compared to other agents, a comparison of the frequency of usage of the topic in two different time periods, etc.

Provide Results

After the results are determined in operation 2220, the next operation is to provide the results in the appropriate manner in operation 2230. This may involve providing a report, generating a graph, displaying updated summaries, presenting a topic dashboard icon, etc. Various graphical output forms are possible, and all are intended to be within the scope of the concepts and technologies disclosed herein.

Presenting the topic dashboard icon is one form of providing a real-time indication to the user, whether it be the agent or supervisor, of that agent's measured performance. The icon is different from the aforementioned alert bubble, in that the topic dashboard icon typically provides text as to the topic reported. Further, as noted earlier, the topic is often a singular topic that is reported. The topic dashboard icon typically reflects some sort of frequency of usage indicator of the topic, and comparison with a threshold or other comparative analysis may be the basis for altering the color, shape, size, or any other visual characteristic of the topic dashboard icon. Thus, if the agent exceeds a limit of some sort, the color of the topic dashboard icon may first change from green to yellow (indicating a threshold is being approached), and then to red (indicated a threshold has been exceeded). The real-time nature of the topic dashboard icon is particularly useful for efficiently motivating an agent in a particular manner. This mode of operation may be more informative to the user as compared to other forms of alert indications, which may be transient in nature. Further, the numerical value indicated in the alert bubble may correspond to a wide nature of speech events, which requires further interaction by the user to obtain further details.

In addition to providing the analyzed information in a visual form (such as a topic dashboard icon) to individuals previously defined in operation 2210, the corresponding portions of audio from each call (termed an "audio snippet") may be provided upon request as well. If such a request is received in operation 2240, then the corresponding audio snippet is reviewed in operation 2250. If there are additional calls to review in operation 2260, then the process returns to operation 2250 where additional audio snippets may be retrieved and reviewed. If no audio snippets are to be reviewed at operation 2240 or there are no more audio snippets to review in operation 2260, then the process 2200 is completed.

A typical use case involves presenting results for a particular agent to an agent and/or supervisor in operation 2230. This may include, e.g., reporting an indication that a particular agent did not comply with a particular requirement (e.g., reporting the agent stated a prohibited keyword or did not state a required keyword). This visual indication may motivate the agent or supervisor to review the call(s) that contributed to these results. Selection of the topic dashboard icon may allow the agent or supervisor to easily review the appropriate snippets of audio related to the keyword being measured.

Review of audio snippets is not always required, but in many instances the agent or supervisor may desire to confirm or review the exact audio circumstances leading to that keyword being detected. Thus, if the agent believes they actually did comply with a particular requirement and that a mistake was made, the corresponding audio can be quickly retrieved. This allows the agent to verify whether the system correctly detected the keyword in question for that call.

In some embodiments, another icon (a so-called "dispute icon") can be displayed on the screen of the agent in the audio player window, wherein the agent could select the dispute icon in real-time while playing the audio to dispute the detection of the topic. This could also be used to report disputed instances of reported alerts through the aforementioned alert indications. Invoking the dispute icon would allow subsequent verification of the accuracy of the RTSA system with respect to that agent and potential fine tuning of the audio model to improve accuracy. Certain agents may simply have vocal characteristics that result in a higher level of mis-detection by the RTSA system.

Exemplary Architecture

Figure 23:
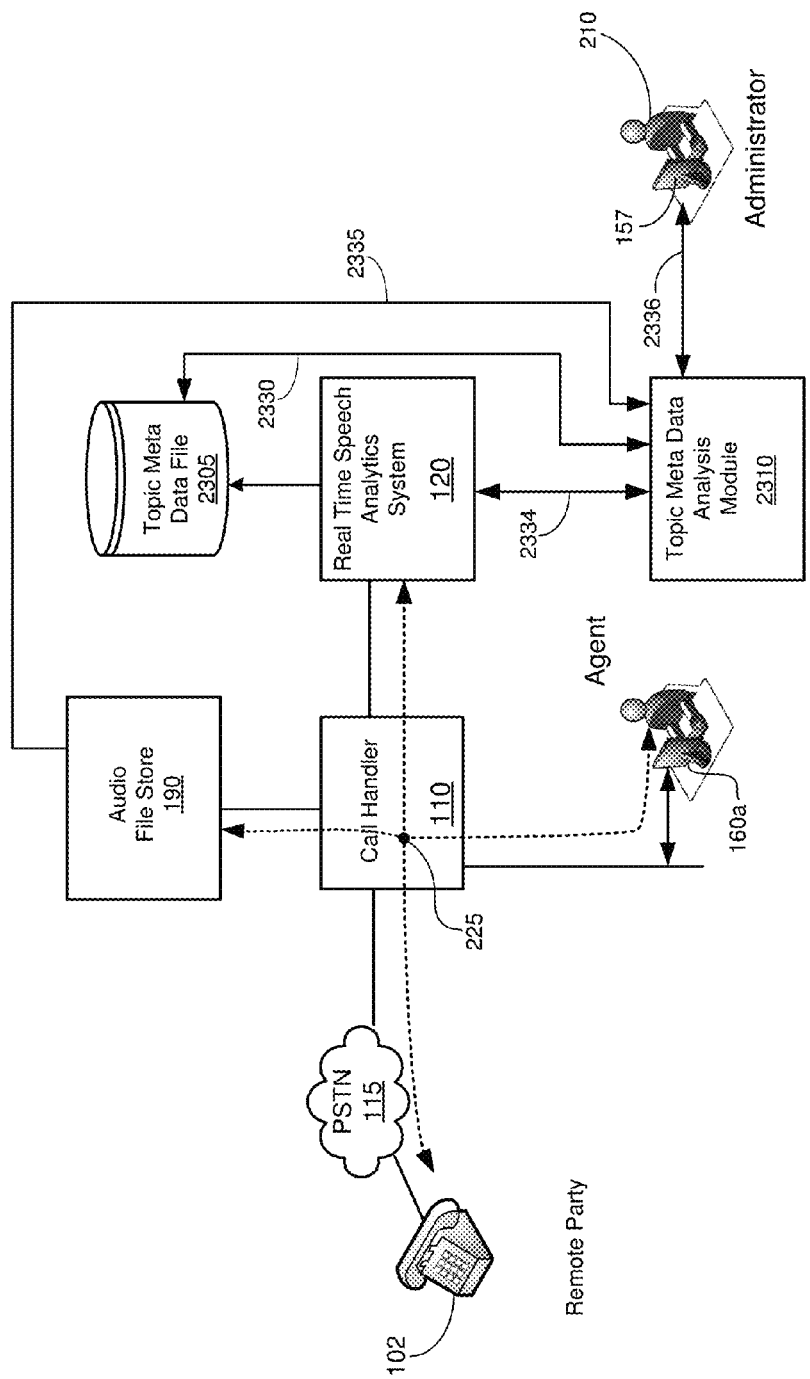
FIG. 23 represents one embodiment of an architecture for processing a call wherein topic meta-data records are generated in response to detecting the topic by a real-time speech analytics system.

An exemplary contact center architecture for performing the topic file analysis is shown in FIG. 23. This incorporates aspects of FIG. 2, but with some distinctions. Turning to FIG. 23, the remote party, represented by a telephone 102 is shown. It is connected via the public switched telephone network ("PSTN") 115 to the call handler 110. This may be for outgoing or incoming calls relative to the call handler 110.

A bridge function 225 is shown in the call handler 110, although the function of providing a real-time copy of the audio data may be accomplished in various ways. A call leg is established to the audio file store 190, which maintains a copy of the audio of the call. The call handler also establishes another call leg to the agent's workstation computer 160a. Another call leg is established from the call handler 110 to the real time speech analytics system ("RTSA") 120.

The call leg established by the call handler to the RTSA system may involve a single or dual audio streams. The call handler may be configured to provide both agent and party audio on one audio stream, or separate out the agent audio on one stream and the party audio on another stream (hence, the call leg may have dual audio streams). This may facilitate detection of certain keywords spoken by the agent, as opposed to the party.

During a call, the RTSA will analyze the audio (whether the one audio stream or one of the dual audio streams) and note the occurrence of one or more keywords that are associated with a topic. This information about the topic occurrence is ultimately stored in the topic meta-data file 2305 via signaling connection 2330. An example of the various information that is stored in the topic meta-data file will be discussed later.

Also shown is an administrator 210 that uses a computer workstation 157 to access a topic meta-data analysis module ("TMDAM") 2310 via data connection 2336. The administrator can use this interface to the TMDAM 2310 to perform the administrative setup, execute the analysis, and view the results as needed. Thus, the TMDAM is configured to instruct the RTSA via connection 2334 to monitor keyword and report the speech events. At this point, the RTSA knows what information is to be monitored on the audio call leg between it and the call handler.

The TMDAM may then write records to the topic meta-data file in response to receiving the event notifications. In other embodiments, the RTSA system may generate the records directly in the topic meta-data file. (The administrator may also interact with the RTSA directly, in other embodiments, to do this function.) The administrator also configures the TMDAM for analyzing the topic meta-data records. For example, the TMDAM may be configured to periodically retrieve topic meta-data records from the topic meta-data file 2305 every 5-10 minutes for a particular agent, analyze the data and determine whether a threshold was exceeded for the number of times a topic was detected during a call. This requires the TMDAM interface to the topic meta-data file via connection 2330. The topic meta-data file may be a database, e.g., a set of structured records holding topic meta-data file. Thus, the TMDAM performs the analysis of the data retrieved from the topic meta-data file 2305.

The last operation that needs to be performed is providing the results to the indicated individuals. This is performed by the TMDAM based on how the administrator configured the administrative setup in the TMDAM. The TMDAM may present the results periodically by sending updates to the agent's workstation 160a and/or to the supervisor's workstation 157. These results may be displayed or provided via reports, tables, charts, widgets, etc. The results could also be provided on demand, according to a schedule, or in response to other events.

The individual reviewing the results may desire at some point to actually hear the snippets of the particular calls that were analyzed, and which may contain the detected keyword(s). The individual may request that the TMDAM retrieve and play the corresponding snippets of audio, which requires the TMDAM to retrieve the specific stored audio via connection 2335 and play them.

The TMDAM is similar in function compared to the CARM 180 of FIG. 2. In some embodiments, these two modules may be integrated. In other embodiments, the TMDAM and CARM are separate and distinct. Still yet, in other embodiments, only one or the other module is present. While there are some similarities in the functions performed by these two, one distinction is that the TMDAM provides results in a different manner than the CARM. The CARM provides a graphical user interface for reporting event messages in the form of checkpoints and alerts, whereas the TMDAM provides other mechanisms for reporting event messages, including topic dashboard indications.

Topic Meta-Data File Record Structure

As described above, the topic meta-data file 2305 is populated by the RTSA system as a result of detecting keywords. This information may then be retrieved by the TMDAM and analyzed as appropriate. Each topic meta-data record stores information about the keyword detected during a call. Audio of the call itself may be stored separately, though it may be housed in a common processing system. The topic meta-data records contain information to provide the desired analysis of the keywords detected and also allow the appropriate snippets to be retrieved and played. A sample record structure is shown in FIG. 24.

Figure 24:
FIG. 24 represents one embodiment of a record in the topic meta-data file, wherein the record comprises various elements.

Turning to FIG. 24, the record structure 2400 begins with the call detail record ("CDR") 2402, which is an identifier of the particular call involved. There may be more than one record generated per call, though each record would then reference the same CDR value. The next field is the "topic_name" field 2404, which is the human-readable name given for the particular topic that is associated with the alert. The next field is the "alert_id" field 2406, which is a numerical identifier of this particular alert. There may be more than one alert reported during a call, which accounts for there being more than one record per call. The next field is the "alert_count" field 2408 which indicates how many times alerts corresponding to the topic_name were received. The next field is the "phrase_id" field 2410 which identifies which one of several particular phrases that is associated with the topic was detected. (The "phrase_id" correlates to the aforementioned "keyword.")

An example can illustrate the relationship between the topic_name, alert_id, and phrase_id. For the sake of simplicity, this is illustrated based on the RTSA detecting the presence of curse words by an agent. In practice, the RTSA is typically used for more sophisticated applications for ensuring compliance rather than merely detecting a prohibited word. First of all, the RTSA must be configured to detect uttered curse words. It is recognized that there are numerous types of curse words, but assume that only three such words are configured to be recognized by the RTSA system. These are simply referred to herein as "curse-word #1", "curse-word #2", and "curse-word #3". Each of these keywords falls within the topic of "curse_word" and each word is assigned a unique phrase_id value. Thus, if an agent utters a keyword which is a curse word, the corresponding phrase_id of that word will be recorded in the topic meta-data record. The agent may utter the word multiple times during a call, and if so, the alert_count will be incremented. If the agent utters another curse word, that too, will be recorded under the topic name of "curse word" in another record which would have a different phrase_id, but the same CDR value. There may be multiple records generated for this call under the same topic_name (if the agent happens to have a tendency to use different words during the same call). Thus, a variety of keywords can me mapped to a particular topic name, and the individual keyword spoken for that topic name can be determined. This structure retains a level of simplicity, since the procedures for acting upon detecting a keyword that is a curse word are the same, regardless of the particular instance. That is, the same thresholds/warnings/notifications/responses by the system may occur regardless of which any one of the defined phrases that is defined as a curse word is uttered by the agent.

Continuing with the record fields, the next field is the "scan_host" field 2412 which is the name of the particular RTSA server detecting the keyword. The next field is the "omit_phrase" field 2414, which indicates whether a particular phrase was detected or omitted (not detected) during the call. This can be used to determine if the agent did not say something there were required to say.

The next field is the "appl" field 2416, which is the particular application (a.k.a. campaign) that the call is associated with. For example, the call could be associated with a particular outbound or inbound campaign. The "trs" field 2418 is the particular agent identifier that handled the call. The "alert_trigger" field 2420 indicates whether the presence of the particular topic should trigger an alert of some form. For example, certain keywords may cause an immediate alert notification to be sent.

The next field is the "pos_idx" (positivity index) field 2422 which indicates a desirability value (score) associated with the detection of the topic. The next field is the "comp_idx" (compliance index) field 2424 which indicates a score value reflecting the level of compliance.

The "call_date" field 2426 indicates the date of the call and the "call_time" field 2428 indicates the time of the call. Similarly, the "event_date" field 2440 and the "event_time" field 2442 indicate the alert date and time, assuming an alert was generated. The "listid" field 2444 identifies a list used in the campaign for the particular call, and the "nex_id" field 2446 identifies the particular topic via a numerical value (as opposed to the name). The "major_alert" field 2448 indicates whether a significant type of alert notification occurred, e.g., a major alert notification.

The various fields in the topic meta-data record may be used by the TMDAM to ascertain what keywords were detected during a call and in order to analyze the current query. Specifically, the records can be searched and analyzed in different ways to determine what topics were spoken by an agent, which calls were involved for those topics, when the topics were detected during a particular call, and the particular phrase spoken that is associated with that topic. With such information, the TMDAM can analyze, e.g., how many times an agent complied with a particular policy, or violated a given policy. The TMDAM can ascertain how the agent met the criteria relative to other agents on the same campaign. Sufficient information is provided in the records to allow the TMDAM to analyze the information in various ways to meet the business needs of the contact center.

The TMDAM could analyze each record for each agent in near-real time and update the metrics for an agent, and display this to the agent. Thus, the agent could see a running status (e.g., via a dashboard indicator icon) of how well they are conforming to a policy which requires them to utter a particular keyword in a certain context or not utter another keyword in a different context. If certain thresholds are exceeded, then the agent's supervisor could be notified as well.

Alternatively, the TMDAM could analyze all the agent's records at the end of a shift and automatically present certain results to the agent (e.g., via a pop-up window) when the agent logs off. Or, the TMDAM could analyze all the records at the end of the shift or at some other time period, and provide a summary to a manager of the cumulative results. Further, the records contain sufficient information so that if a particular topic on a call is to be investigated further, the time during the call when the topic was detected is indicated. This allows the corresponding audio snippet for that call to be retrieved and played back for manual review.

Exemplary Process Flow

Figure 25:
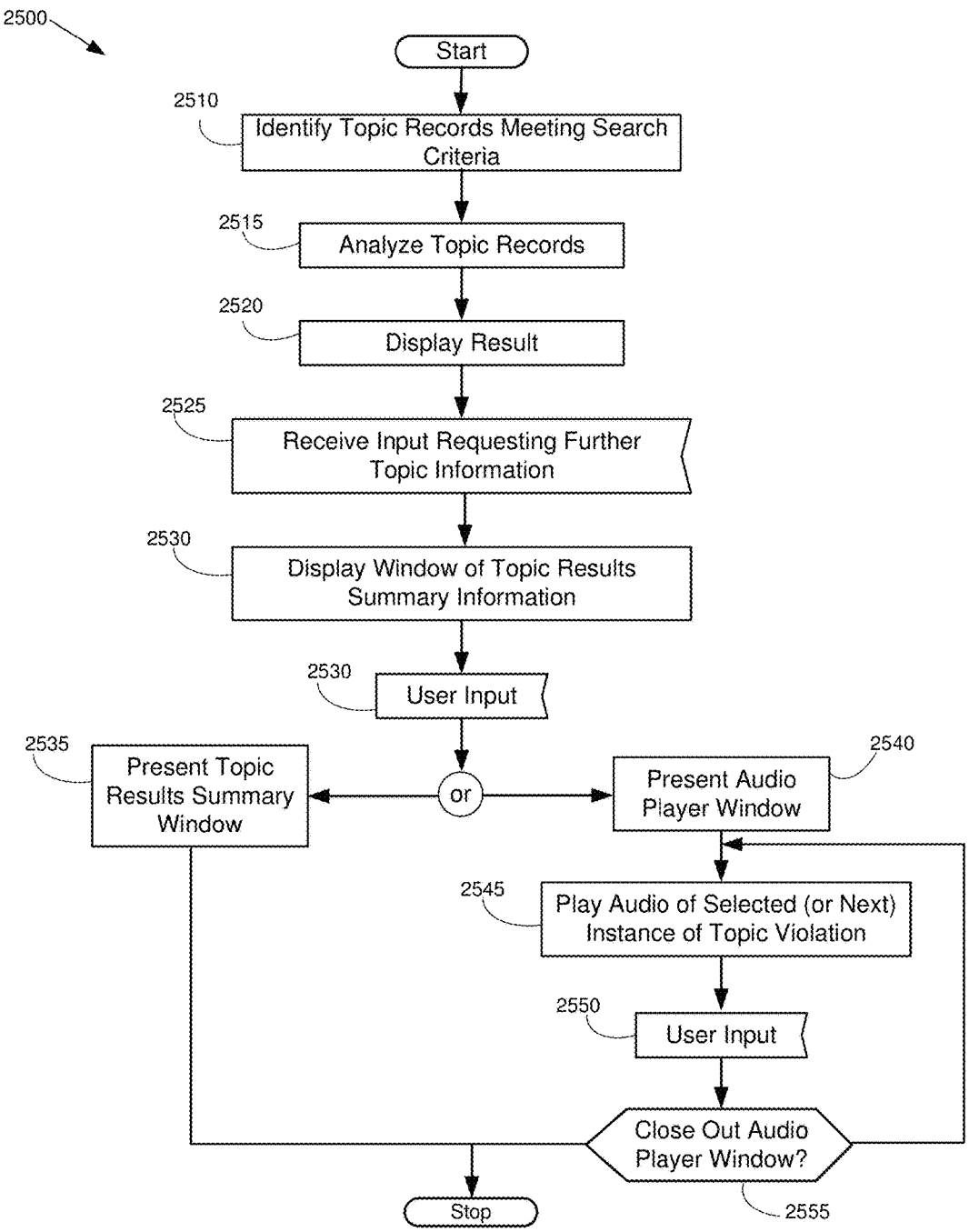
FIG. 25 represents one process flow for processing topic records in the topic meta-data file in order to present information to a user.

An exemplary process flow for how the meta-data records may be used is shown in FIG. 25. This shows the processing of records after the administrative setup 2210 of FIG. 22 has occurred. In this flow in FIG. 25, the topic meta-data records meeting a particular search criteria are identified in operation 2510. For example, the search criteria may have been for monitoring the performance of a group of agents on a particular shift with respect to whether they did (or did not) utter a particular keyword from a keyword set. Thus, the meta-data records for these agents are searched and retrieved for whether a particular topic was reported. In operation 2510, the relevant records are identified.

Next, in operation 2515, the topics records identified are analyzed. Continuing with the above example, all the records associated with the relevant agents may be analyzed to determine whether they did, or did not, utter the particular phrase for the identified topic. A variety of techniques for analyzing the frequency of occurrence can be defined at this point. Once this is determined, the results may be displayed in operation 2520 to the appropriate person.

The display of the results could be a real-time indicator to the agent, and/or an end-of shift summary for the manager. Assuming that the manager is presented with a summary of all the agents, then the manager could provide further input to filter, qualify, or otherwise limit the results in operation 2525, which are displayed to the manager in operation 2530.

The manager may decide to investigate certain individual calls. For example, the report could indicate a frequency of use for each agent that a phrase associated with a keyword was reported. The manager may decide to select a particular call associated with a particular meta-data record. Selecting a particular record could result in presenting text-based information to the manager in operation 2535. This could be a summary of the information found in the relevant meta-data records, presented in various formats.

After reviewing the text-based results for a particular record, the user may then decide to review the audio associated with the topic. If so, the process flow then proceeds to operation 2540 where the user is presented with an audio player window. Upon appropriate selection, the audio corresponding to the topic could be played in operation 2545. If the user provides additional input at operation 2550, the input is analyzed in operation 2555 to determine whether it is to review the next snippet of audio. This allows the user to quickly review all instances of where the topic was detected in a call or in a series of calls. If the next instance exists and is to be reviewed, the process then loops back to operation 2540. Otherwise, the process terminates.

Displaying Real Time Dashboard Indications

As mentioned earlier, the informing the user of an occurrence of a topic is different from using the aforementioned alert bubbles. The alert bubbles only indicate a numerical value that indicates a number of alerts that have occurred, which may include a number of various types. In reporting the analysis of a topic, output may be presented in various forms, such as via a topic dashboard indicator. The topic dashboard indicator is more specific in that it is tailored for a particular topic and may be defined to provide a persistent visual indication of a number of topics that have been reported. Further, the numerical value is also defined to report instances of keywords detected within a particular time period, call, or shift. Other logic may be involved that further qualifies or limits the topic dashboard indicator. For example, the analysis of the topic meta-data records may incorporate logic that only reports agents that exceed a certain threshold in uttering a keyword.

Figure 26A:
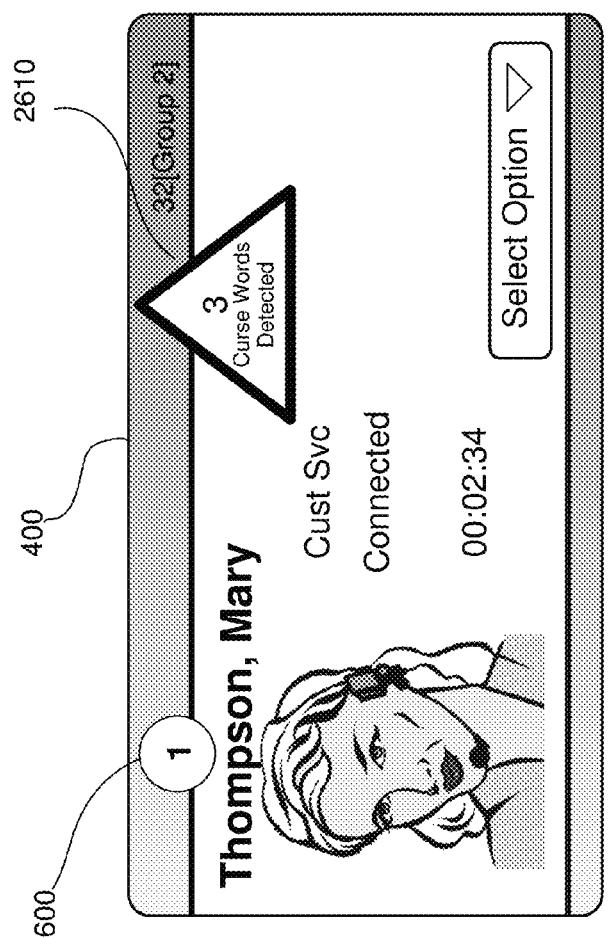
FIGS. 26A and 26B represent embodiments of a topic dashboard indicator presented to a user on a graphical user interface.

Turning to FIG. 26A, an example shows how the topic dashboard indicator 2610 may be displayed to a supervisor in conjunction with the agent icon 400. In this case, the topic dashboard indictor 2610 is defined to indicate a number of detected topics along with a text-based label indicating the topic. In this case, the label indicates "curse words detected." The topic dashboard indicator 2610 thus provides more tailored information to a manager, and avoids the manager having to select the alert bubble 600 in order to know the nature of the alert being reported.

Figure 26B:
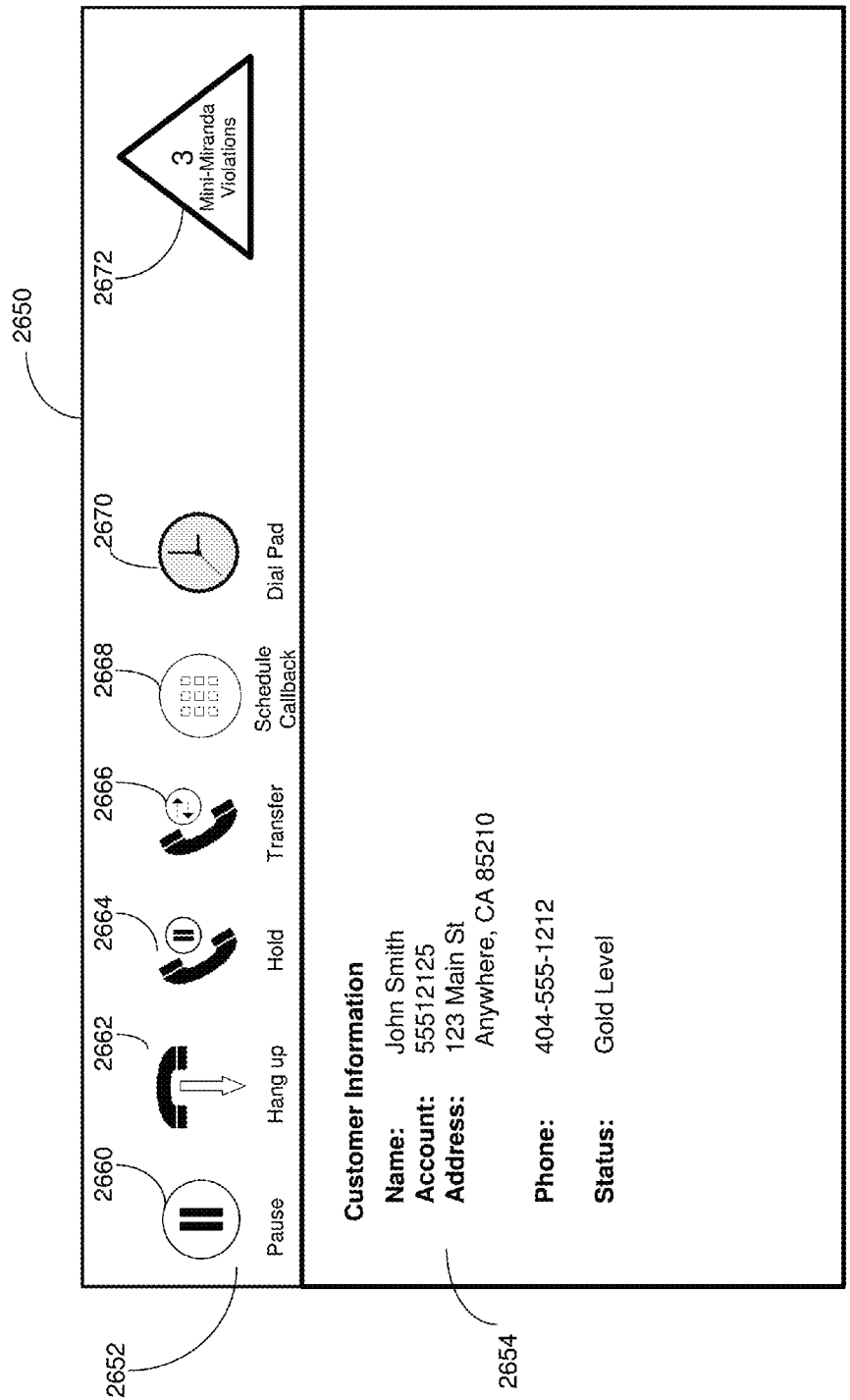

The topic dashboard indicator 2672 shown in FIG. 26B reflects another embodiment, where again, there is text indicating the nature of the topic detected. This topic dashboard indicator 2672 could be presented on the agent's computer display, as opposed to a manager's display. Turning to FIG. 26B, an embodiment of an agent work screen 2650 is shown that may be presented to an agent handling calls. In this embodiments, the screen 2650 has a first portion 2652 with various control icons that allow the agent to control the call. These may include a pause icon 2660, a hang-up call icon 2662, a hold icon 2664, a transfer icon 2666, a schedule callback icon 2668, and a dial pad icon 2670. The screen 2650 may also have a second portion 2654, which includes account information for the current call.

The presentation of the topic dashboard indicator 2672 may be displayed on an area of the screen 2650 and may be dedicated for a particular for topic that is being reported. The topic dashboard indicator 2672 may provide relevant information to the agent without the agent having to select another icon in order to see more detailed topic information in order to ascertain the nature of the indication. The topic dashboard indicator 2672 may include a number and a label of the particular condition being reported. Because the topic dashboard indicator is defined for a particular context and may be configured to be displayed in a static manner (e.g., it is not displayed in a transient manner), the agent can always look at their screen 2650 and easily and quickly view the topic dashboard indicator 2672 to ascertain their status.

If the agent or supervisor does select the topic dashboard indicator to obtain further details, further information may be displayed to the user regarding the nature of the topic and the attendant conditions that caused its display. In this regard, similar to the alert bubble, additional information may be presented to the user upon selecting the topic dashboard indicator. However, unlike the alert bubble which may provide additional details on a variety of topics, typically only one topic is addressed by the topic dashboard indicator 2672.

Although not shown in the topic dashboard indicator 2672, it may further include another number reflecting a score. This could be a cumulative value that provides a weight of the detected speech events. For example, in some embodiments the topic dashboard indicator may report the number of instances where a prohibited curse word is detected. Each different curse word may have a severity score associated with it, even though all are associated with a single topic. Thus, even though topic dashboard indicator 2672 may report three violations, the score could vary based on the specific keywords detected, reflecting that some prohibited words are worse than others.

Turing to FIG. 27A, one embodiment of additional topic detection details are shown. The pop-up window 2700 may be displayed over another screen image, but it is shown here by itself for simplicity. In one embodiment, the window 2700 may identify the agent's name 2705, the name of the topic 2710 and the conditions which caused the triggering of the topic 2715. In this embodiment, the triggering criteria may be each instance a keyword is detected. In other embodiments, a threshold may be defined or a comparative criteria could be defined. For example, only the top 5% of agents meeting a certain criteria could result in triggering a topic dashboard indicator (or altering the number displayed therein). A variety of other triggering criteria could be defined by those skilled in the art in light of the present disclosure.

Other information displayed in the pop-up window 2700 may include information about the relative number of instances that were detected 2720 and the corresponding relevant call 2725. Thus, in this example, two instances of curse words were detected in "call #1" and another in call #2. In addition, the times each keyword was detected in that call is indicated as well 2730. Finally, a corresponding column of radio buttons 2735 allows the relevant speech portion of the audio to be replayed.

In the embodiment shown in FIG. 27A the "Time Detected" 2730 value represents an absolute time at which the event occurred. If calls are not placed on hold with respect to recording the call, then this method of marking where speech event occurred may be acceptable. However, calls may be placed on hold by the agent, and this portion of the call may not be recorded. (Recall that the agent could invoke the "hold" icon 2664 in the control portion of the agent's screen in FIG. 26B.) Not recording the call while on hold may save storage space, since no audio is being spoken. However, if the portion of the call while on hold is not recorded, then using the absolute time may not provide an accurate indication of where the speech event occurred. For example, consider a call that starts exactly at 2:00 p.m. and lasts three minutes and includes a 60 second pause beginning at the second minute. Thus, the call begins at 2:00 and encounters one minute of audio, then at 2:01 begins one minute of silence while the call is on hold, and then at 2:02 begins another minute of audio. However, if the hold time is not recorded, then there will only be two minutes of recording. If the speech event is detected at 2 minutes and 30 seconds into the call, then using an absolute time or an offset time from the beginning may be inaccurate since the recording is only 2 minutes long. However, if the call recording does record the hold time, then the audio recording would be 3 minutes long. In this case, the absolute time could be used. However, since many audio recording systems do not record the hold time, an offset time from the beginning of the call to identify the occurrence of the speech event should be used.

Another situation that may preclude use of absolute time to tag occurrence of speech events is when the system may automatically silence part of the audio. For example, in some contact center systems, the caller may be connected to an automatic voice response system to enter credit card payment or other sensitive information. The system will automatically not record sensitive information. As such, this will present similar issues as discussed above if the call were placed on hold. That is, the length of the audio recording may be shorter than the actual call.

Figure 30:
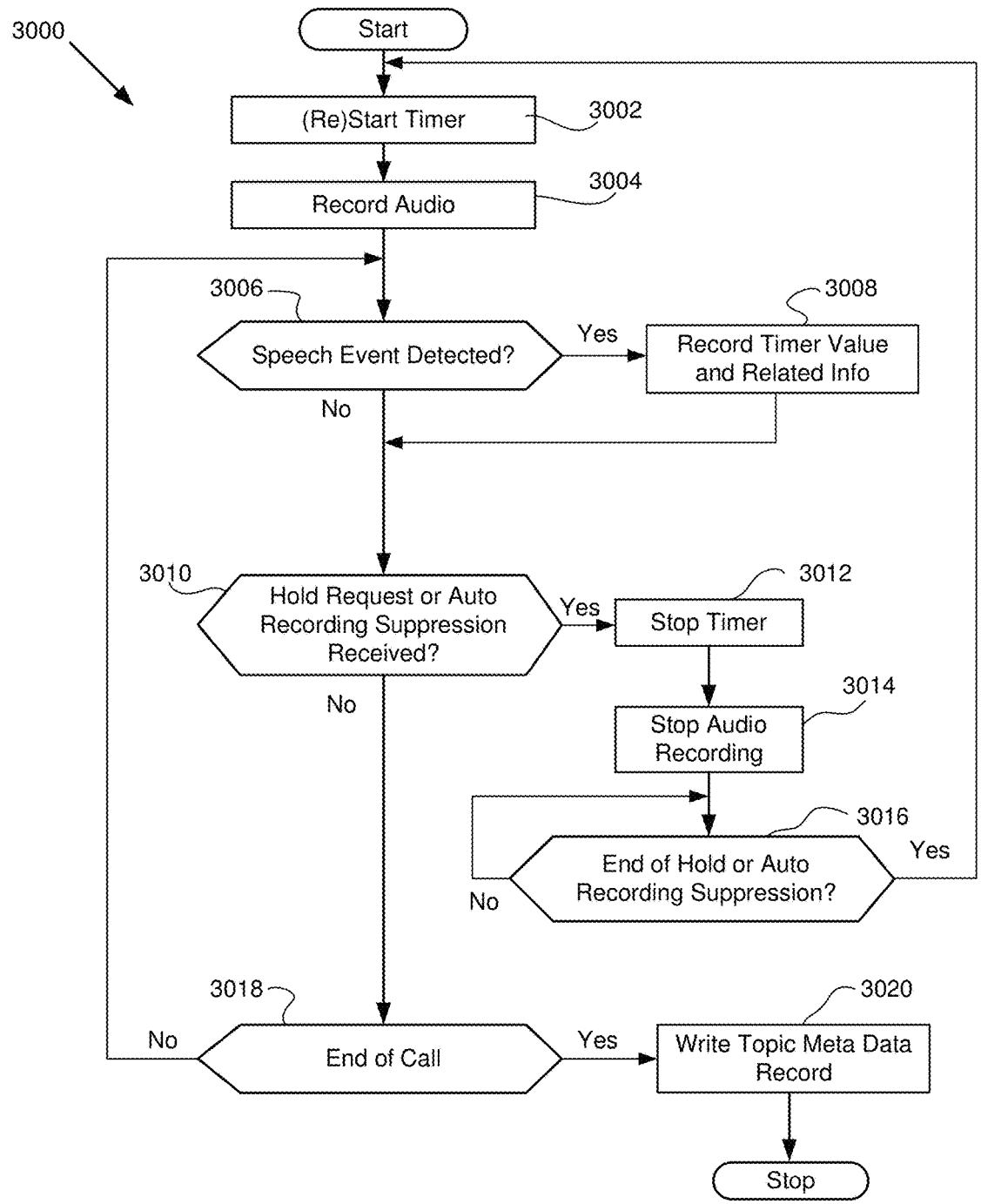
FIG. 30 illustrates one embodiment of a process flow for determining time offsets associated with detecting speech events, where the time offsets are used to retrieve portions of audio recordings containing the detected speech events.

Thus, if the call recording does not include all the audio of the call, the offset should be the offset of the recorded audio only, e.g., not including any pause time that occurred during the call. To reflect this alternative form of tagging or marking such offsets, the "Time Detected" value could reflect an offset from the beginning of the recorded audio. One such embodiment for implementing these scheme is shown in FIG. 30. Turning briefly to FIG. 30, the process flow 3000 is based on first starting a timer in operation 3002. If this is the first pass through (which would be the case at the beginning of a new call), then the timer is started and it would reflect the beginning of the call. Next, in operation 3004, the audio recording is started.

If a speech event is detected in operation 3006, then the timer value is read and recorded, along with related speech event information, in operation 3008. In addition to the timer value, information such as the call identifier, keyword, topic, etc. may be noted. As evident, the timer value represents the passage of time from the beginning of the audio recording for that call.

Next, a test is made to see whether there is any occurrence of an event, such as a hold request from the agent or an indication of suppression of call recording in operation 3010. This latter indication is generated by the system, and hence is referred to as an auto recording suppression indication. This may be generated if the system detects, e.g., a remote party has entered sensitive information which should not be recorded and automatically temporarily ceases call recording. This condition can be detected by a variety of means, including using a speech analytics system or determining the context of what the user is entering by an interactive voice response system. Regardless of how this is detected, when the indication is received, it causes recording to be paused.

If such conditions are detected in operation 3010, then the process proceeds to operation 3012 where the timer is stopped and then continues to operation 3014 where the recording is stopped. These steps could be reversed as compared to what is shown, as they occur virtually simultaneously. The process then continues in operation 3016 where it waits for an indication signifying an end of the hold condition or the end of the auto recording suppression. If the pause in recording is to be terminated, then the process returns to operation 3002 where the timer is restarted and the audio is recorded in operation 3004. Thus, the timer is stopped when audio recording ceases and is restarted when audio recording resumed.

Returning to operation 3010, if there is no hold request or auto recording suppression indication received, then the next test occurs in operation 3018 where a determination is made whether the call has ended. If so, then the topic meta-data is written as a record into the topic meta-data file in operation 3020. If the call has not ended in operation 3018, the process loops back to monitoring whether a speech event has been detected in operation 3006.

As can be seen, the process 3000 in FIG. 30 runs a timer while the call is being recorded, and notes when any speech events are reported. If the call is paused for whatever reason, the timer and call recording is stopped. Thus, the timer tracks the time when the call is recorded, and the time of when the speech events are detected is always in synchronization with the audio recording. Thus, the recorded times of when the speech events are detected are referred to an "offset time" since it refers to a time offset from when the call recording began.

Turning next to FIG. 27B, this figure illustrates another embodiment of providing further information about topics that were expected, but which were not detected for the agent. In this case, there are three instances, 2755, 2760, and 2765, in which the "mini-Miranda" phrase was not stated by the agent, but each of these instances corresponds to a detected condition for a different call. Again, an offset time is shown when the absence of the topic was determined, along with an icon to cause the corresponding audio of that call to be played. This time reflects an offset from the beginning of the recorded call audio, so that it correctly accounts for any pause time which occurred during the call, but was not recorded.

Further, for instances where detection of a missing speech event is reported, the determination that it has not been detected may be based on the timer expiring when the speech event is expected to occur or the detection of a subsequent event, which must occur after the missing speech event. Finally, the user can select any one or all of the radio button(s), which will retrieve the appropriate portion of the audio, play it to the user, allowing them to hear the relevant portion of audio for each of the calls.

Although the details shown in FIG. 27B do not show a respective severity as determined by a score (e.g., negative compliance score or some other type of score), such scores could be implemented and displayed as well. In other embodiments, the cumulative score could be displayed in the topic dashboard indicator. Further, other information other than, or in addition to, could be displayed in the topic dashboard indicator, such as the relative standing for other agents being measured and monitored.

A number of distinctions are evident with respect to the operation of the topics and checkpoints/alerts, even though both report detection of a particular utterance in the speech of the agent and/or party on the call. The alert bubbles simply report a numerical value of all the defined alerts that occurred for the relevant time period. The topic dashboard indicator reports information about a particular type of keyword set or topic is detected, even if that topic is not defined as an alert. If multiple types of topics need to be reported, then multiple dash board indicators can be defined, each associated with a particular topic. In contrast, the alert bubble integrates all the different types of keyword sets together.

Further, the information provided upon selection of the alert bubble and the topic dashboard indicator are different. Selecting the alert bubble provides information on all forms of alerts reported for all topics, whereas selecting a topic dashboard indicator provides additional detail typically only about that one type of topic. Thus, whereas with the alert bubble a user may have to search and identify various instances associated with additional information, the topic dashboard indicator conveniently defines only a particular type of topic that is reported and so the additional information provided when selecting it only pertains to that particular type of topic. This may save a lot of time for the user when reviewing a particular topic.

For example, assume that the alert bubble records the number of alerts during a call. The agent would be required at the end of each call to review the detailed information and manually maintain a running total to ascertain their status from the beginning of their shift to the current time. On the other hand, a topic dashboard indicator could display in real time the cumulative status information. The agent only has to merely look at the topic dashboard indicator to get a relevant summary of information. Thus, the topic dashboard indicator may be much more useful in facilitating the goal of encouraging agents to be cognizant of a single particular performance metric during their shift. Thus, by defining a topic that is reported via a topic dashboard indicator, an agent may be much more likely to be aware of the intended condition that is being monitored by the RTSA system.

Audio Players

Figure 28A:
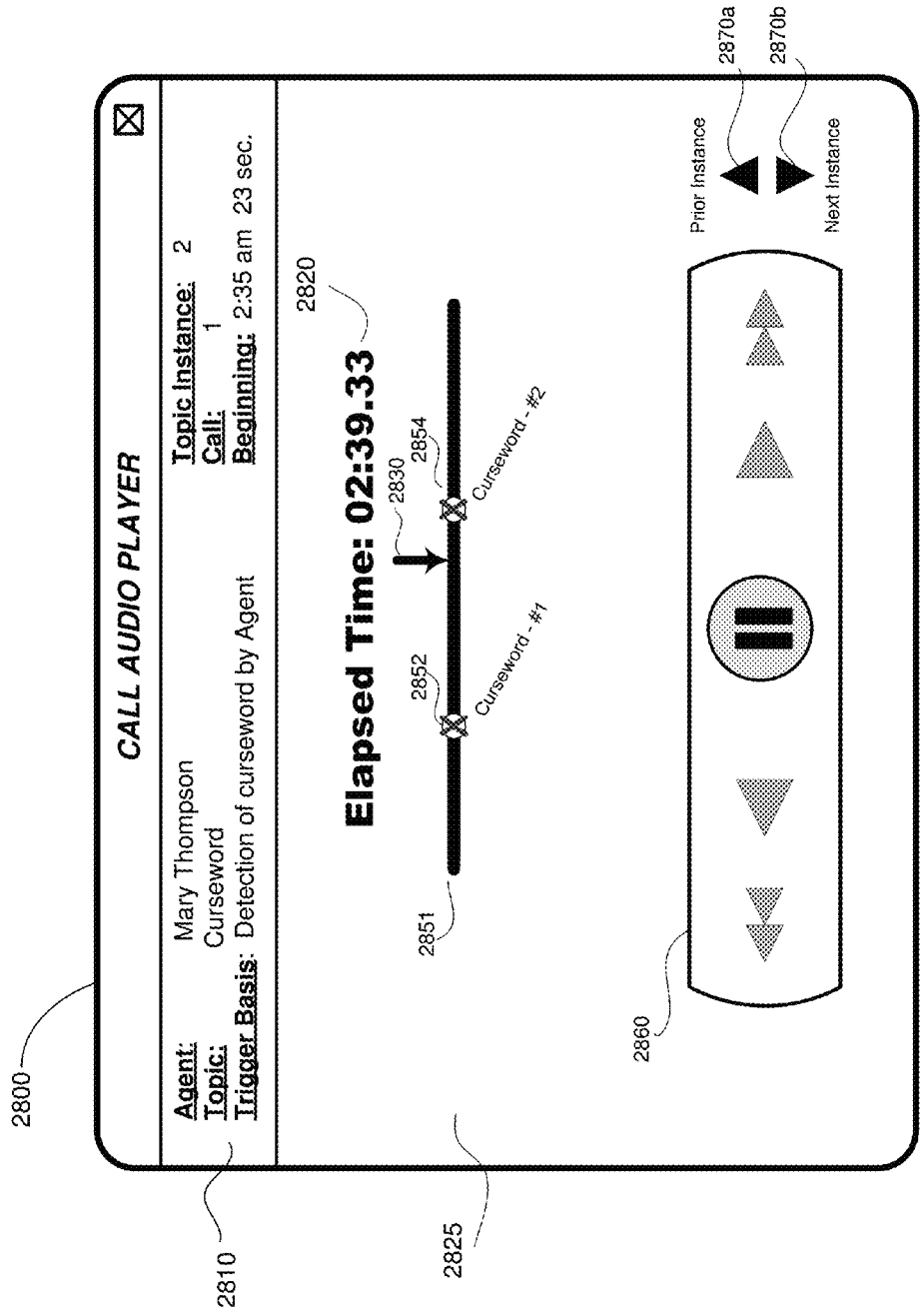
FIGS. 28A and 28B represent embodiments of a call audio player user interface used to play audio associated with a call associated with detection of a topic.
Figure 28B:
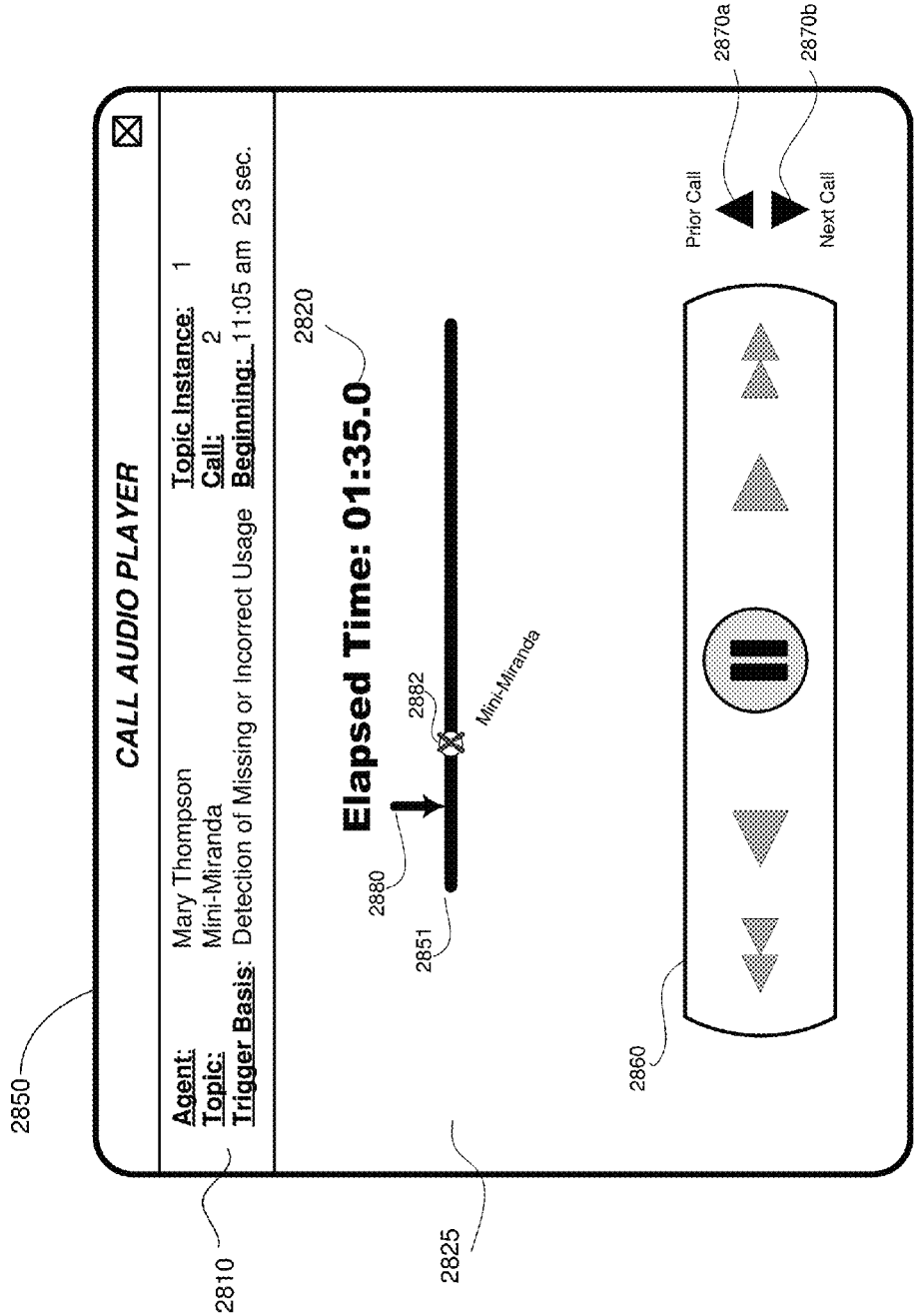

Upon a user selecting a particular icon to review the audio associated with a reported topic, an audio player may be presented to the user, such as those shown in FIG. 28A and FIG. 28B. These may be similar to the audio players shown for providing audio for an alert. These audio players are tailored for playing audio information associated with a topic. Turning to FIG. 28A first, the pop up window 2800 shows the audio player with a first portion 2810 which contains various information, such as the agent invoked, the name of the topic ("curse word"), and the trigger basis. The information further indicates that this is the second topic instance in a given call in which the topic was been detected. A start time of where the first instance was detected is indicated. For simplicity, this format does not show the date/time of each call, but that could be shown, or made available upon the user selecting an icon.

The cursor 2830 shows the current playback location relative to the duration of the call, and an elapsed time indicator 2820 shows the current elapsed time. The timeline 2851 shows the relative location of the two instances of curse words detected, 2852 and 2854. The control panel 2860 allows the user to replay, fast forward, etc. The instance controls 2870a, 2870b, allow the user to select the prior or next call instance where the topics were detected. Other controls allows the user to jump to the next instance or to the next call. Thus, if an agent has been involved in 500 calls over the week, and there are several calls during the week for which curse words have been detected, then these calls can be easily reviewed using the instance controls 2870a, 2870b which allow the user to quickly jump to the next relevant call instance. If calls across multiple days are involved, then the first portion 2810 of the pop-up window 2800 may include date and time information for the relevant calls.

FIG. 28B shows another embodiment of the audio player, wherein the window 2800 also has a first portion 2810 and a second portion 2825. The first portion 2810 indicates contextual information, such as the agent, topic, triggering basis, the topic instance, call, and beginning time. In this case, the triggering basis indicates that topic reported (the 'mini-Miranda') is reported upon its detection of missing or being used incorrectly. This is shown via an indicator 2882 on the timeline 2851. The audio control panel 2860 and other controls 2870a-2870b function as shown in FIG. 28. In this embodiment, the nature of reporting of a single topic typically manifests itself via a single indicator 2882 on the timeline of the call.

Figure 29:
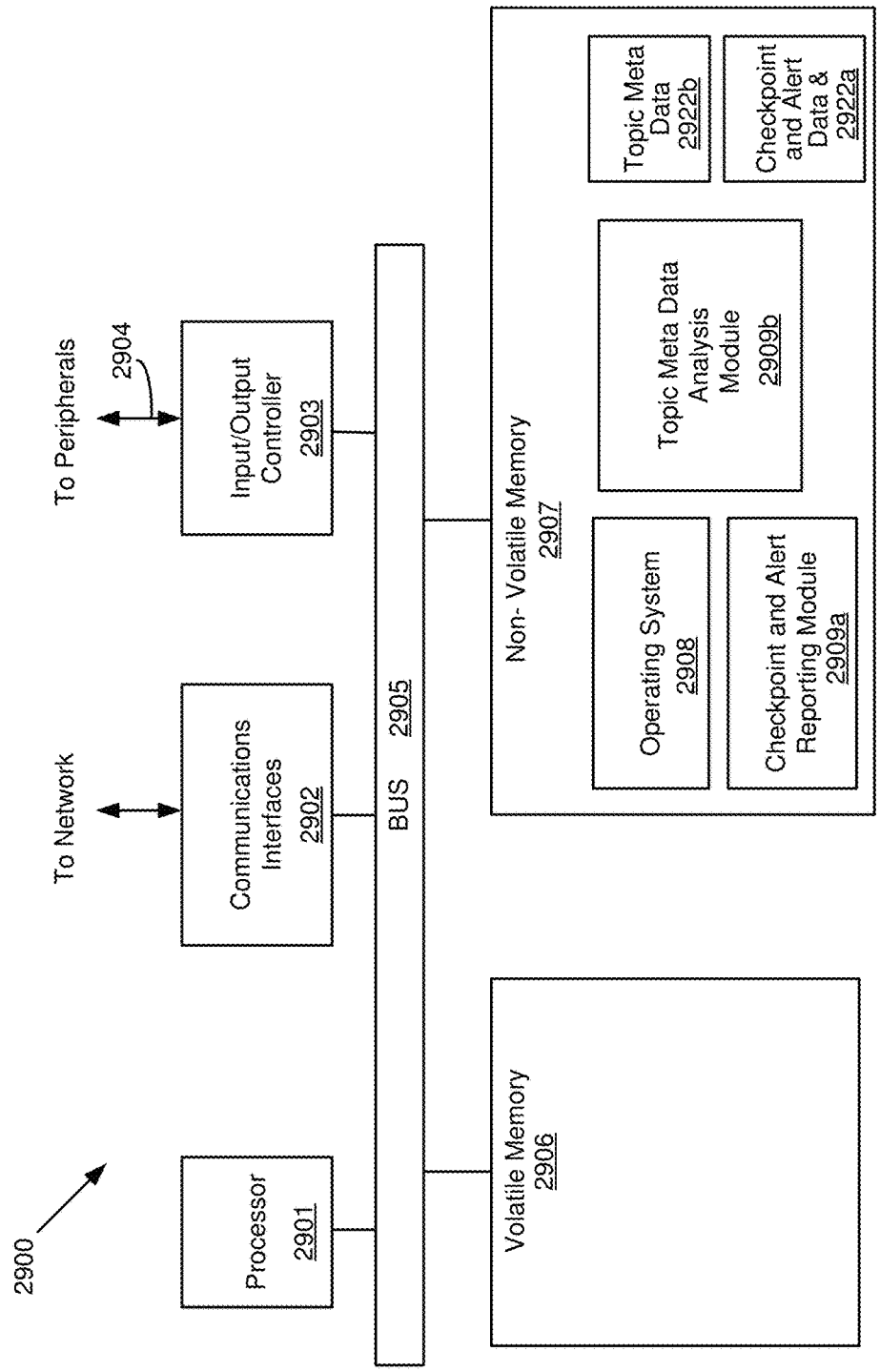
FIG. 29 illustrates one embodiment of a processing system for practicing the concepts and technologies disclosed herein.

Exemplary Component Architecture—FIG. 29

FIG. 29 is an exemplary schematic diagram of a computer processing system that may be used in an embodiment for any one of the components used in the contact center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. Specifically, the schematic diagram of FIG. 29 may represent a system executing the checkpoint and alert module, the TMDAM, the workstation, the call handler, or the RTSA system. There are various potential embodiments, and the system shown in FIG. 29 may be modified to accommodate any one of the above components. Further, in various embodiments, a common processing platform may be used to run software for providing various functions in an integrated manner.

As shown in FIG. 29, the processing system 2900 may include one or more processors 2901 that may communicate with other elements within the processing system 2900 via a bus 2905 or some other form of communication facility. The processor 2901 may be implemented as one or more complex programmable logic devices ("CPLD"), microprocessors, Von Neumann based microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like. Each of these must be programmed accordingly to perform the functions disclosed herein.

In one embodiment, the processing system 2900 may also include one or more communications interfaces 2902 for communicating data via the local network with various external devices, including those shown in FIGS. 1-2. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

An input/output controller 2903 may also communicate with one or more input devices or peripherals using an interface 2904, such as, but not limited to: a keyboard, a mouse, a touch screen/display input, microphone, pointing device, etc. The input/output controller 2903 may also communicate with output devices or peripherals, such as displays, printers, speakers, headsets, banner displays, other components in the contact center, etc. These may be used, in part, to receive data, such as alert and checkpoint widget related data retrieved from an external database.

The processor 2901 may be configured to execute instructions stored in volatile memory 2906, non-volatile memory 2907, or other forms of computer readable storage media accessible to the processor 2901. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 2907 may store program code and data, which also may be loaded into the volatile memory 2906 at execution time. Specifically, the non-volatile memory 2907 may store code associated with an checkpoint and alert reporting module 2909a and the Topic Meta-Data Analysis Module 2909b that may perform the above mentioned process flows and/or operating system code 2908 containing instructions for performing the process and/or functions associated with the technologies disclosed herein. The checkpoint and alert reporting module 2909a may also access various checkpoint and alert data 2922a disclosed above (including agent alert data, event tables, etc.) and process the related information described above. Similarly, the Topic Meta-Data Analysis Module 2909*b* may access and process various Topic Meta-Data 2922*b*. The volatile memory 2906 and/or non-volatile memory 2907 may be used to store other information including, but not limited to: alerts, alert mapping tables, floor plan maps, agent icons, agent pictures, records, audio records, meta-data, event tables, applications, programs, scripts, source code, object code, byte code, compiled code, interpreted code, machine code, executable instructions, or the like. These may be executed or processed by, for example, processor 2901. These may form a part of, or may interact with, the CARM 2909*a*. In some embodiments, the CARM 2909*a* may be integrated or located in another component. Similarly, the TMDAM 2909*b* may be integrated with another component or be a stand-alone module. Although the embodiments herein have described the CARM or TMDAM as a single module, in other embodiments these may be multiple modules. Further, these modules do not necessarily have to execute in the same component. Similar, the checkpoint and alert data 2922*a* or the topic meta-data 2922*b* may be segregated and stored as separate data files or structures on separate components.

The technologies described herein may be implemented in various ways, including as computer program products comprising memory storing instructions causing a processor to perform the operations associated with the above technologies. The computer program product comprises a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory nor propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation, except for the terms defined in the glossary herein.

The invention claimed is:

1. A system for providing information of a call involving an agent of a contact center and a party, the system comprising:
   a call handler subsystem configured to provide audio of the call on a first call leg;
   a real-time speech analytics ("RTSA") subsystem configured to:
      receive the audio of the call on the first call leg from the call handler subsystem, and
      generate an event message in response to detecting a keyword spoken by the agent in the audio of the call, wherein the event message comprises:
         a topic name of a topic associated with one or more keywords including the keyword detected by the RTSA subsystem during the call,
         a time indicating when the keyword was detected by the RTSA subsystem during the call, and
         a call detail record identifier identifying the call; and
   a topic meta-data analysis component comprising a processor configured to:
      generate a record that is stored in a topic meta-data file in response to receiving the event message, wherein the topic meta-data file comprises a plurality of records corresponding to a plurality of calls involving the agent, wherein each of the plurality of records is generated based on receiving a corresponding event message from the RTSA subsystem detecting the one or more keywords associated with the topic from the plurality of calls involving the agent,
      analyze a subset of the plurality of records including the record, wherein each of the subset of the plurality of records including the record comprises the topic name and an agent identifier corresponding to the agent, and
      present a topic dashboard icon to a user on a display of a computer, wherein the topic dashboard icon comprises text reflecting the topic associated with the one or more keywords detected, and wherein the topic dashboard icon reflects a frequency of occurrence of the topic associated with the one or more keywords detected during the plurality of calls involving the agent.

2. The system of claim 1, wherein the topic meta-data analysis component is further configured to:
   receive a request from the user indicated by selecting the topic dashboard icon on the display of the computer; and
   in response to receiving the request, provide text-based information for presentation on the display regarding detection of the topic for the plurality of calls involving the agent, wherein each of the plurality of calls has a corresponding record in the topic meta-data file, and wherein the text-based information comprises an identification of each of the plurality of calls and one or more corresponding times when the topic was reported during each of the plurality of calls.

3. The system of claim 2, wherein the topic meta-data analysis component is further configured to:
   receive a second request from the user indicated by selecting one of the plurality of calls comprising the call;
   in response to receiving the second request, use the call detail record identifier associated with the call and an offset time in the record to retrieve at least a portion of recorded audio of the call; and cause at least the portion of the recorded audio of the call to be played to the user.

4. The system of claim 3 further comprising:
a workstation used by the agent, wherein the user is the agent and the second request originates from the workstation.

5. The system of claim 1, wherein the call handler subsystem is configured to provide the audio on a second call leg, and the system further comprises:
a call recording subsystem, wherein the call recording subsystem is configured to:
receive the audio of the call on the second call leg from the call handler subsystem, and
store the audio of the call in a memory store, wherein the memory store comprises further audio of the plurality of calls involving the agent.

6. The system of claim 1, wherein the topic meta-data analysis component is further configured to:
receive one or more inputs from a workstation used by a manager of the agent, wherein the one or more inputs indicates the agent identifier, the topic, and a time period; and
in response to the one or more inputs, provide for display on the workstation a plurality of indications corresponding to the plurality of calls, wherein each of the plurality of calls occurred during the time period.

7. The system of claim 1, wherein the topic meta-data analysis component comprising the processor is further configured to:
alter a visual attribute of the topic dashboard icon based on an analysis of the frequency of occurrence of the topic detected during the plurality of calls.

8. The system of claim 1, wherein the time indicating when the keyword was detected by the RTSA subsystem during the call comprises an offset time from when audio of the call was recorded.

9. A non-transitory computer readable medium storing instructions that when executed by a processor in a topic meta-data analysis component cause the processor to:
generate a record in response to receiving an event message from a real time speech analytics ("RTSA") component, wherein the event message indicates detection of one or more keywords associated with a topic by the RTSA component in audio of a call involving a party and an agent;
store the record in a topic meta-data file comprising a plurality of records, wherein each of the plurality of records was generated in response to receiving a corresponding event message from the RTSA component indicating detection of the one or more keywords associated with the topic in a corresponding call of a plurality of calls involving the agent;
analyze a subset of the plurality of records in the topic meta-data file including the record, wherein the record and each of the subset of the plurality of records comprise a topic name corresponding to the topic and an agent identifier corresponding to the agent;
present a topic dashboard icon to a user on a display of a computer in response to analyzing the subset of the plurality of records, wherein the topic dashboard icon comprises text identifying the topic;
receive a request from the user indicated by selecting the topic dashboard icon on the display of the computer; and
in response to receiving the request, provide text-based information for presentation on the display of the computer regarding a plurality of calls involving the agent, wherein the text-based information comprises a corresponding relative time when the topic was reported during each of the corresponding call of the plurality of calls involving the agent.

10. The non-transitory computer readable medium of claim 9, wherein the instructions further cause the processor to:
receive a second request from the computer for playing recorded audio of the call;
in response to receiving the second request, use a call detail record identifier from the record associated with the call and an offset time to retrieve a portion of the recorded audio of the call; and
cause the portion of the recorded audio of the call to be played to the user.

11. The non-transitory computer readable medium of claim 10, wherein the instructions further cause the processor to:
play the portion of recorded audio of the call to the user in response to the user selecting a play function on an audio player control screen.

12. The non-transitory computer readable medium of claim 9, wherein the instructions further cause the processor to:
present the topic dashboard icon to the user on the display of the computer, wherein the topic dashboard icon reflects a numerical value reflecting a frequency of occurrence of the topic corresponding to the subset of the plurality of records.

13. The non-transitory computer readable medium of claim 9, wherein the instructions further cause the processor to:
alter a visual attribute of the topic dashboard icon based on an analysis of a frequency of occurrence of the topic associated with the one or more keywords detected during the subset of the plurality of calls.

14. The non-transitory computer readable medium of claim 9, wherein the instructions further cause the processor to:
present the topic dashboard icon to the user of the display of the computer along with an alert bubble, wherein the topic dashboard icon and the alert bubble are presented at least partially within an agent icon.

15. The non-transitory computer readable medium of claim 9, wherein the record comprises:
a keyword identifier data element identifying a particular keyword from among the one or more keywords associated with the topic, and
a corresponding offset time of the particular keyword used to retrieve a portion of an audio recording of the call associated with the topic.

16. A method for displaying information about a call involving an agent of a contact center and a party, the method comprising:
generating a record in response to receiving an event message from a real time speech analytics ("RTSA") component, wherein the event message indicates detection of a topic comprising one or more keywords by the RTSA component in audio of the call involving the party and the agent;
storing the record in a topic meta-data file comprising a plurality of records wherein each of the plurality of records was generated based on receiving a prior event message reporting detection of the topic in a corresponding one of a plurality of calls involving the agent;
analyzing a subset of the one or more records in the topic meta-data file including the record, wherein each of the subset of the one or more records and the record comprise a topic name corresponding to the topic and an agent identifier corresponding to the agent;

presenting a topic dashboard icon to a user of a display of a computer, wherein the topic dashboard icon comprises text indicating the topic, and wherein the topic dashboard icon is based on analyzing the subset of the one or more records;

receiving a request for further text-based information from the user indicated by selecting the topic dashboard icon on the display of the computer; and provide, in response to receiving the request, the further text-based information for presentation on the display of the computer, wherein the further text-based information comprises an identification of each of the plurality of calls and one or more corresponding relative times when the topic was reported during for each of the corresponding one of the each of the plurality of calls involving the agent.

17. The method of claim 16, wherein the user is the agent, the computer is a workstation used by the agent, and the request for the further text-based information originates from the workstation.

18. The method of claim 16, wherein the user is a supervisor of the agent, the computer is a workstation used by the supervisor, and the topic dashboard icon is displayed in a manner that overlays, at least in part, on an agent tile corresponding to the agent presented on the display.

19. The method of claim 16, further comprising:

receiving a second request from the user for playing at least a portion of recorded audio of the call associated with the topic, wherein the second request is received from the computer of the user by selecting the call involving the agent; and in response to receiving the second request:
  use a call detail record identifier data element from the record associated with the call to identify the recorded audio of the call,
  use an offset time associated with the topic to determine a beginning of a portion of the recorded audio of the call, and
  play the portion of the recorded audio of the call to the user.

20. The method of claim 16, wherein a score determined based on a frequency of detection of the topic by the RTSA is further displayed within the topic dashboard icon.

21. The method of claim 16, further comprising:

modifying a visual attribute associated with the topic dashboard icon on the display of the computer in response to an analysis of a frequency of detection of the topic in the plurality of calls by the RTSA.

\* \* \* \* \*